(12) United States Patent
Chan

(10) Patent No.: US 8,646,560 B2
(45) Date of Patent: Feb. 11, 2014

(54) MOTOR HAVING AN INTEGRATED TORQUE SENSOR

(75) Inventor: Yet Chan, Kowloon (HK)

(73) Assignee: Foster Assets Corporation, Kwun Tong (HK)

( * ) Notice: Subject to any disclaimer, the term of this patent is extended or adjusted under 35 U.S.C. 154(b) by 482 days.

(21) Appl. No.: 12/977,862

(22) Filed: Dec. 23, 2010

(65) Prior Publication Data
US 2011/0183805 A1 Jul. 28, 2011

(51) Int. Cl.
*B62M 6/50* (2010.01)
*B62M 6/55* (2010.01)

(52) U.S. Cl.
USPC .................................. 180/206.3; 180/206.4

(58) Field of Classification Search
USPC ............... 180/206.3, 206.2, 206.4, 206.5
See application file for complete search history.

(56) References Cited

U.S. PATENT DOCUMENTS

| | | | |
|---|---|---|---|
| 6,012,538 A * | 1/2000 | Sonobe et al. | 180/220 |
| 6,196,347 B1 * | 3/2001 | Chao et al. | 180/206.2 |
| 2010/0051373 A1 * | 3/2010 | Lee et al. | 180/205 |
| 2011/0180341 A1 * | 7/2011 | Chan | 180/206.4 |
| 2013/0075176 A1 * | 3/2013 | Chan | 180/206.4 |
| 2013/0092464 A1 * | 4/2013 | Gu et al. | 180/206.4 |

* cited by examiner

*Primary Examiner* — Tony Winner
(74) *Attorney, Agent, or Firm* — Renner Kenner Greive Bobak Taylor & Weber

(57) ABSTRACT

A motor unit comprises a housing for containing a motor, a motor shaft for receiving a motor provided driving force, a torque sensor mechanism for detecting torque, and a controller for controlling power to the motor in response to a detected amount of torque. An actuator couples the torque sensor to a sensor of the controller. The actuator is configured to move relative to the controller sensor thereby causing the sensor to produce a signal indicative of the detected level of torque. The controller is contained within the housing of the motor. The motor unit may also have an auxiliary shaft for receiving an externally provided driving force with a first torque transmission path for transferring the externally provided driving force to a drive mechanism and a second torque transmission path for transferring the motor provided driving force to said drive mechanism. A first one way drive means is provided in the first torque transmission path between the auxiliary shaft and the drive mechanism such that when the drive mechanism is being driven by the motor provided driving force through the second torque transmission path, the auxiliary shaft is able to freewheel. The motor unit can drive any apparatus, but may be used in a pedal driven apparatus such as a bicycle where an externally provided driving force is provided by manually operable pedals of said apparatus which are fixed for rotation with the auxiliary shaft. In this case, the auxiliary shaft comprises a pedal spindle of the bicycle and the drive mechanism comprises a sprocket or belt drive.

42 Claims, 48 Drawing Sheets

SEC B-B

MOTOR HAVING AN INTEGRATED TORQUE SENSOR

CROSS-REFERENCE TO RELATED APPLICATIONS

This application claims the benefit of U.S. patent application Ser. No. 12/691,991, filed Jan. 22, 2010, and published as US2011/0180341, on Jul. 28, 2011, and further claims the benefit of U.S. patent application Ser. No. 12/692,044, filed Jan. 22, 2010, and published as US2011/0183794, on Jul, 28, 2011.

FIELD OF THE INVENTION

The invention relates to a motor having an integrated torque sensor for use particularly, but not exclusively, in a pedal driven apparatus which can be manually propelled, but which includes a motor unit for also causing forward propulsion of the apparatus. The invention also relates particularly, but not exclusively, to pedal driven wheeled apparatuses or vehicles such as bicycles having an electric motor powered by a battery pack carried on the vehicle.

BACKGROUND OF THE INVENTION

It is known to provide some manually propellable wheeled vehicles or apparatuses such as bicycles with a motor unit to assist a user in powering the apparatus, especially up sloping terrain, e.g. hills, although the motor unit may sometimes be used by itself to power the bicycle over any terrain.

It is also known to utilize an in-wheel motor in an electric motor assisted bicycle such that a transmission can be omitted and the resulting apparatus is easy and simple to manufacture. For such a known electric motor assisted bicycle using an in-wheel motor, it can be manufactured by simply replacing a hub of one wheel with an in-wheel motor, while the pedals drive the rear wheel through a sprocket and a chain in a generally conventional manner. In such an arrangement, no motor drive force need be transferred through the bicycle chain. Therefore, a pedal driving force and a motor driving force are delivered quite separately from each other.

One consequence of the known in-wheel motor arrangement is that it is not feasible for an in-wheel electric motor assisted bicycle to be developed with additional functions such as gear shifting, operating with a clutch, functioning as an exercise bicycle, or using the motor to generate power, i.e. it does not afford easy expansion of its functions. It also creates production and assembly problems as well as replacement parts problems. Where an in-wheel motor fails or requires maintenance, for example, it requires the wheel to be removed thus disabling the bicycle. Under some motor failure or maintenance conditions, it may no longer be possible to rotate the wheel accommodating the in-wheel motor such that it is not even possible to propel the bicycle under manually applied pedal power.

In addition to the known electric bicycle using an in-wheel motor, there is at least one other type of electric bicycle which uses a wheel-driving motor. However, in this type of electric bicycle, a motor driving force and a pedal driving force are also separately delivered from each other. This type of electric bicycle has similar disadvantages in that gear shifting can not be easily realized using a rear wheel transmission when the electric bicycle is being propelled using the wheel-driving motor.

The foregoing are just some of the common problems encountered with conventional hybrid motor assisted pedal driven apparatuses such as bicycles.

SUMMARY OF THE INVENTION

An object of the invention is to provide an improved motor unit.

Another object of the invention is to provide an improved electric motor for a motor assisted bicycle.

Another object of the invention is to mitigate or obviate to some degree one or more problems associated with known motor units.

One skilled in the art will derive from the following description other objects of the invention. Therefore, the foregoing statements of object are not exhaustive and serve merely to illustrate some of the many objects of the present invention.

In a first main aspect of the invention, there is provided a motor unit comprising: a housing for housing a motor; a motor shaft for receiving a motor provided driving force; a torque sensor mechanism for detecting torque; a controller for controlling power to the motor in response to a detected amount of torque to change the amount of motor provided driving force provided to the motor shaft; and an actuator coupling the torque sensor to a sensor of the controller; wherein the actuator is configured to move relative to the sensor controller thereby causing the sensor to produce a signal indicative of the detected level of torque and wherein the controller is contained within the housing of the motor.

Preferably, the controller is located at one end of the motor housing and the torque sensor connected to an opposite end of the motor housing.

Preferably, the actuator the torque sensor to a sensor of the controller is accommodated in a hollow bore of the motor shaft to thereby couple the torque sensor at one end of the motor housing to the controller at another end of the motor housing.

Preferably, the motor unit further comprises: an auxiliary shaft for receiving an externally provided driving force; a first torque transmission path for transferring the externally provided driving force to a drive mechanism; a second torque transmission path for transferring the motor provided driving force to said drive mechanism; wherein a first one way drive means is provided in the first torque transmission path between the auxiliary shaft and the drive mechanism such that when the drive mechanism is being driven by the motor provided driving force through the second torque transmission path, the auxiliary shaft is able to freewheel. The externally provided driving force may be provided by another motor or any other suitable drive means coupled to impart drive to said auxiliary shaft.

Preferably, the motor shaft is arranged concentrically around the auxiliary shaft such that the auxiliary shaft is freely accommodated through a hollow bore of the motor shaft and such that their axes of rotation are parallel. The auxiliary shaft and the motor shaft may share the same axis of rotation.

Preferably, the first torque transmission path comprises the auxiliary shaft for receiving an externally provided driving force and the first one way drive means, wherein the first one way drive means mechanically couples the auxiliary shaft to the drive mechanism such that the first one way drive means transfers the externally provided driving force to the drive mechanism and wherein the first one way drive means allows the auxiliary shaft to freewheel when the drive mechanism is being driven by the motor shaft. The first one way drive means may comprise a freewheel device.

Preferably, the second torque transmission path comprises the motor shaft and a gear mechanism mechanically coupling the motor shaft to the drive mechanism, wherein the gear mechanism has a reduction gear ratio and operates to transfer the motor provided driving force from the motor shaft to the drive mechanism at said reduction gear ratio.

Preferably, the gear mechanism comprises a planetary gear mechanism having a planet gear whose axis of rotation is offset by a predetermined amount with respect to the axis of rotation of the motor shaft. The planet gear may be rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centred on the axis of rotation of the motor shaft, said circle having a radius equal to the predetermined offset amount. Furthermore, the planet gear may have a smaller diameter than an internal ring gear within which it locates for rotation therewithin, the internal ring gear being fixed in position and having a central axis co-incident with the axis of rotation of the motor shaft, the planet gear having a smaller number of teeth than the internal ring gear. The planet gear may be rotatably supported on the eccentric wheel by a bearing.

Preferably, a planet gear carrier of the planetary gear mechanism is configured to transfer the motor provided driving force to the drive mechanism. The planetary gear mechanism may include a counterbalance member which is configured to counterbalance an imbalance of weight caused by the offsetting of the planet gear with respect to the axis of rotation of the motor shaft. The counterbalance member may comprise a generally semi-circular weighted member which is arranged to rotate with the planet gear so as to counterbalance the planet gear when the planet gear is rotating.

Alternatively, the planetary gear mechanism does not include a weighted counterbalance member, but comprises first and second identical planet gears arranged half a revolution out of phase with each other such that said first and second planet gears counterbalance each other on rotation. The first and second planet gears may be located for rotation half a revolution out of phase with each other within a common, single internal ring gear. Each of the first and second planet gears may be supportably mounted on respective first and second eccentric wheels.

Preferably, the planet gear carrier is affixed to the drive mechanism for rotation therewith. The planet gear carrier may also be affixed to an output member of the first one way drive means for rotation therewith, whereby the externally provided driving force is transferred via the first torque transmission path to the motor shaft through the planetary gear mechanism as well as to the drive mechanism.

Alternatively, the gear mechanism comprises a toothless planetary gear mechanism having a toothless planet gear whose axis of rotation is offset by a predetermined amount with respect to the axis of rotation of the motor shaft and wherein the reduction gear ratio of the toothless planetary gear mechanism is defined by a relationship between the respective diameters of the toothless planet gear and a toothless internal ring gear within which the planet gear is located for rotation, the toothless planet gear having a smaller diameter than the toothless internal ring gear. The toothless planet gear may be rotatably supported on an eccentric wheel whereby the toothless planet gear is made to rotate as the eccentric wheel rotates and whereby the position of the axis of rotation of the toothless planet gear changes relative to the axis of rotation of the motor shaft as the toothless planet gear rotates such that the varying position of the axis of rotation of the toothless planet gear defines a circle centred on the axis of rotation of the motor shaft, said circle having a radius equal to the predetermined offset amount. The toothless internal ring gear may be fixed in position and has a central axis co-incident with the axis of rotation of the motor shaft. The toothless planet gear may be rotatably supported on the eccentric wheel by a bearing.

Preferably, a planet gear carrier of the toothless planetary gear mechanism is configured to transfer the motor provided driving force to the drive mechanism.

Preferably, the toothless planetary gear mechanism includes a counterbalance member which is configured to counterbalance an imbalance of weight caused by the offsetting of the toothless planet gear with respect to the axis of rotation of the motor shaft. The counterbalance member may comprise a generally semi-circular weighted member which is arranged to rotate with the toothless planet gear so as to counterbalance the toothless planet gear when the toothless planet gear is rotating.

Alternatively, the toothless planetary gear mechanism does not include a weighted counterbalance member, but comprises first and second identical toothless planet gears arranged half a revolution out of phase with each other such that said first and second toothless planet gears counterbalance each other on rotation. The first and second toothless planet gears may be located for rotation half a revolution out of phase with each other within a common, single toothless internal ring gear. Each of the first and second toothless planet gears may be supportably mounted on respective first and second eccentric wheels.

Preferably, the planet gear carrier is affixed to the drive mechanism for rotation therewith. The planet gear carrier may also be affixed to an output member of the first one way drive means for rotation therewith, whereby the externally provided driving is transferred via the first torque transmission path to the motor shaft through the toothless planetary gear mechanism as well as to the drive mechanism.

Preferably, the toothless planet gear is rotatably supported on the eccentric wheel with its axis of rotation is offset by a predetermined amount with respect to the axis of rotation of the motor shaft and located within the toothless internal ring gear to engage a toothless inner ring gear surface by heating the toothless internal ring gear and shrink fitting it over the toothless planet gear. The first and second toothless planet gears may be rotatably supported respectively on the first and second eccentric wheels with their axes of rotation offset by a predetermined amount with respect to the axis of rotation of the motor shaft and located within a common, single toothless internal ring gear for rotation half a revolution out of phase with each other to engage a toothless inner ring gear surface by heating the toothless internal ring gear and shrink fitting it over the first and second toothless planet gears.

Preferably, a second one way drive means is provided in the second torque transmission path between the motor shaft and the drive mechanism such that when the drive mechanism is being driven by the externally provided driving force through the first torque transmission path, the motor shaft is not caused to rotate. The second one way drive means may comprise at least one ratchet member moveably disposed on the planet gear carrier and arranged to engage a rack of a ratchet wheel fixed to rotate with the drive mechanism. The at least one ratchet member may have associated therewith means for resiliently biasing a free end of said ratchet member outwardly from a surface of the planet gear carrier such that said free end of the ratchet member engages a tooth in the rack of the ratchet wheel.

Preferably, the torque sensor comprises: a first driving member mounted for rotation about an axis of rotation of the motor shaft; a second driven member mounted for rotation about said axis of rotation of the motor shaft; means for detecting movement of said first driving member relative to said second driven member in a rotational direction of said driven member about said motor shaft axis of rotation; and wherein the actuator comprises a means for conveying said detected movement to the sensor of the controller.

In another aspect of the invention, the motor unit comprises a part of a pedal driven apparatus.

In another aspect of the invention, the motor unit is an electric motor powered by a battery pack carried on a pedal driven apparatus.

In a second main aspect of the invention, there is provided a pedal driven apparatus having a motor unit according to the first main aspect, wherein said externally provided driving force is a manually provided driving force provided by manually operable pedals of said apparatus which are fixed for rotation with the auxiliary shaft, said auxiliary shaft comprising a pedal spindle; and wherein said drive mechanism comprises a sprocket, said first torque transmission path being arranged to transfer the manually provided driving force to said sprocket and said second torque transmission path being arranged to transfer the motor provided driving force to said sprocket; and wherein the first one way drive means is provided in the first torque transmission path between the pedal spindle and the sprocket such that when the sprocket is being driven by the motor provided driving force through the second torque transmission path, the pedal spindle is able to freewheel.

In another aspect of the invention, there is provided a pedal driven apparatus having a motor unit according to the foregoing aspect, wherein said externally provided driving force is a manually provided driving force provided by manually operable pedals of said apparatus which are fixed for rotation with the auxiliary shaft, said auxiliary shaft comprising a pedal spindle; and wherein said drive mechanism comprises a sprocket, said first torque transmission path being arranged to transfer the manually provided driving force to said sprocket and said second torque transmission path being arranged to transfer the motor provided driving force to said sprocket; and wherein the first one way drive means is provided in the first torque transmission path between the pedal spindle and the sprocket such that when the sprocket is being driven by the motor provided driving force through the second torque transmission path, the pedal spindle is able to freewheel.

In another aspect of the invention, there is provided a pedal driven apparatus comprising: manually operable pedals fixed for rotation with a pedal spindle for receiving a manually provided driving force; a motor having a shaft for receiving a motor provided driving force; a first torque transmission path for transferring the manually provided driving force to a sprocket of the pedal driven apparatus; a second torque transmission path for transferring the motor provided driving force to said sprocket of the pedal driven apparatus; wherein a first one way drive means is provided in the first torque transmission path between the pedal spindle and the sprocket such that when the sprocket is being driven by the motor provided driving force through the second torque transmission path, the pedal spindle is able to freewheel.

In another aspect of the invention, there is provided a motor for a pedal driven apparatus comprising: a shaft for receiving a motor provided driving force; and a gear mechanism mechanically coupling the motor shaft to a sprocket of the pedal driven apparatus, wherein the gear mechanism has a reduction gear ratio and operates to transfer the motor provided driving force from the motor shaft to the sprocket at said reduction gear ratio and wherein the motor is arranged concentrically around a pedal spindle of the pedal driven apparatus such that the pedal spindle is freely accommodated through a hollow bore of the motor shaft and such that their axes of rotation are parallel.

In another aspect of the invention, there is provided a sprocket assembly for a pedal driven apparatus, comprising: a sprocket; first means for mechanically coupling the sprocket to a pedal driven pedal spindle; and second means for mechanically coupling the sprocket to an output shaft of a motor, wherein the first mechanical coupling means includes a first one way drive means coupling the pedal spindle and the sprocket such that the first one way drive means transfers a manually provided driving force applied to the pedals of the pedal driven apparatus to the sprocket to cause rotation of the sprocket and allows the pedal spindle to freewheel when the sprocket is being driven by the motor output shaft.

In another aspect of the invention, there is provided a pedal driven apparatus comprising: a first member mounted for rotation about an axis of rotation of a pedal spindle; a drive sprocket mounted for rotation about said axis of rotation of a pedal spindle; means for detecting movement of said first member relative to said drive sprocket in a rotational direction of said drive sprocket about said pedal spindle axis of rotation; and means for converting said detected movement to a control input for another component on said pedal driven apparatus. The pedal driven apparatus may comprise a bicycle, although the invention is applicable to other pedal driven apparatuses such as pedalos, for example. The control input may comprise any of an electrical control input, an electronic control input or a mechanical control input In another aspect of the invention, there is provided a control system for generating a control input for a component on a pedal driven apparatus, said control system comprising: a first member mounted for rotation about an axis of rotation of a pedal spindle; means for detecting movement of said first member relative to a drive sprocket in a rotational direction of said drive sprocket about said pedal spindle axis of rotation; and means for converting said detected movement to a control input for said another component on said pedal driven apparatus.

In another aspect of the invention, there is provided a drive sprocket assembly for a pedal driven apparatus, said drive sprocket assembly comprising: a first member rotatable about an axis of rotation of a pedal spindle; a drive sprocket rotatable about said axis of rotation of a pedal spindle, said drive sprocket being loosely coupled to said first member and moveable by a limited amount relative thereto in a rotational direction of said drive sprocket; and a mechanism for detecting movement of said first member relative to said drive sprocket in said rotational direction of said drive sprocket.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
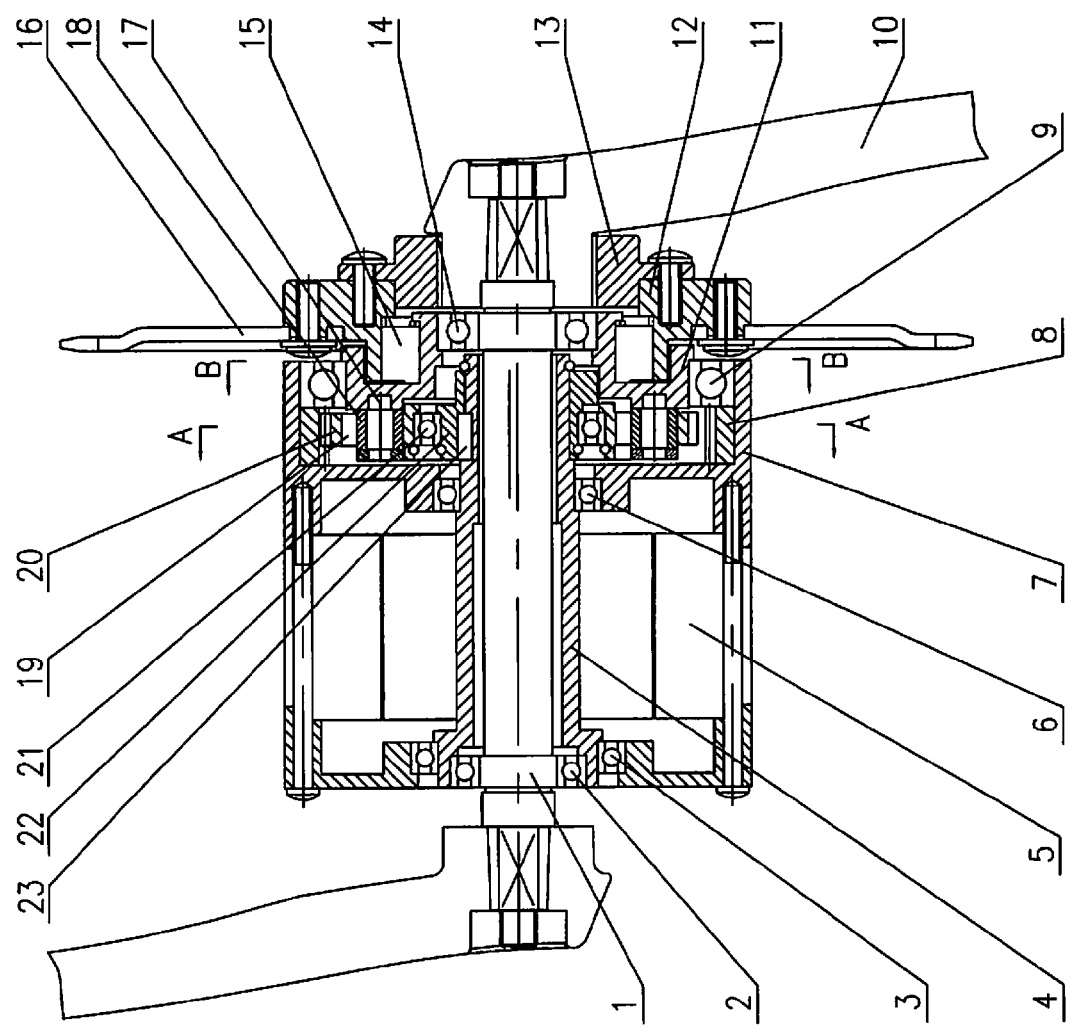
FIG. 1 is a structural schematic view of a first embodiment of a motor and sprocket assembly for a pedal driven apparatus according to the invention.
Figure 2:
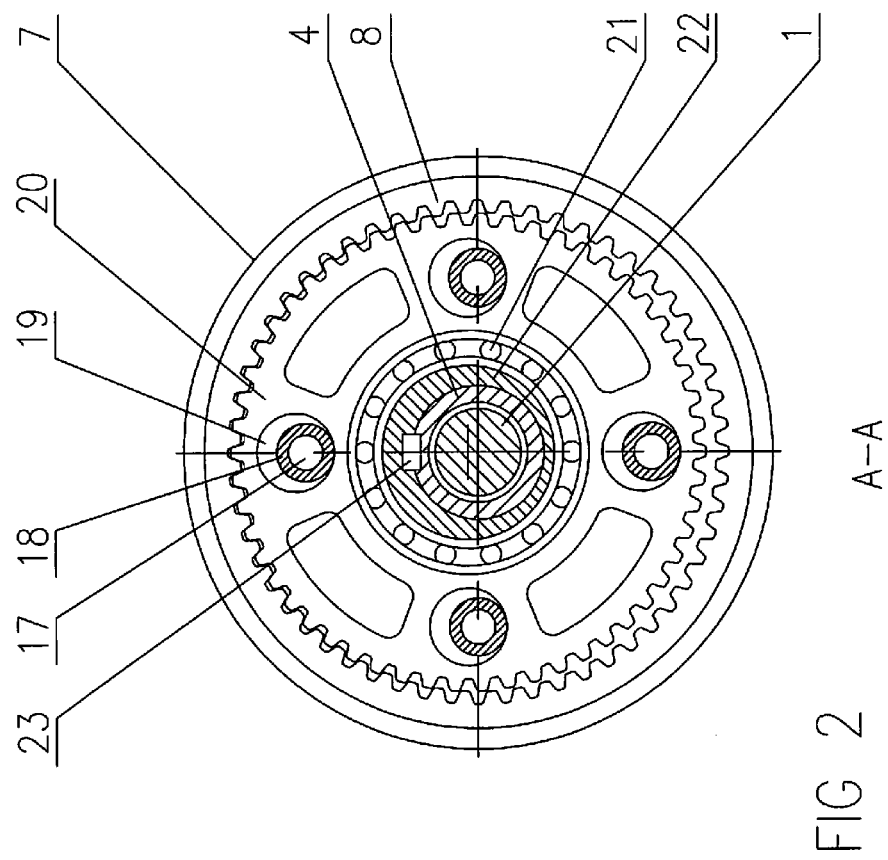
FIG. 2 is a sectional view taken along the line A-A of FIG. 1.

The invention primarily concerns motorized bicycles, although the invention is applicable to any hybrid apparatus having pedals to provide a human power input and a motor to provide a mechanical power input. A motorized bicycle is a bicycle with an attached motor used to power the vehicle, or to assist with pedaling. Sometimes classified as a motor vehicle, or a class of hybrid vehicle, motorized bicycles may be powered by different types of engines. Motorized bicycles are distinguished from motorcycles by being capable of being powered by pedals alone if required. The actual usage of the pedals varies widely according to the type of vehicle. Some can be propelled by the motor alone if the rider chooses not to pedal. Those known as power-assist bikes have the pedals as the main form of propulsion with the motor used to give a bit of extra power, especially uphill. Many motorized bicycles are based on standard bicycle frame designs and technologies.

In a parallel hybrid motorized bicycle, human and motor inputs are mechanically coupled either in the bottom bracket, the rear or the front wheel, whereas in a (mechanical) series hybrid cycle, the human and motor inputs are coupled through differential gearing. In a (electronic) series hybrid cycle, human power is converted into electricity and is fed directly into the motor and mostly additional electricity is supplied from a battery.

"Pedelec" is a European term that generally refers to an electric bicycle that incorporates a torque and/or a speed sensor and/or a power controller that delivers a proportionate level of assist and only runs when the rider pedals.

The present invention is applicable to all of the above forms of bicycle having both a motor unit and pedals, but where the motor is arranged in close proximity to the sprocket assembly, preferably with the motor being arranged concentrically with the pedal spindle such that the pedal spindle is accommodated within a hollow shaft of the motor.

It is to be understood in the following description that the terms "sprocket" or "drive sprocket" are to be taken to mean any rotational component capable of transferring a driving force to another rotational component and includes, but is not limited to, toothed sprockets for engaging drive chains, belt pulleys for engaging drive belts, or gear wheels for engaging other gear wheels or gear trains.

In the following description, reference will be made to a bicycle as an example of a pedal driven apparatus, but it will be understood that the invention is not limited to bicycles and the following description is equally applicable to other types of pedal driven apparatuses such as tricycles, pedalos (pedal boat), or the like or to other devices or appliances driven by a motor unit.

Referring to FIGS. 1 to 4, shown is a first embodiment of a motor and sprocket assembly according to the invention. A bicycle having said motor and sprocket assembly comprises means for providing an externally provided driving force in the form of manually operable pedals 10 fixed for rotation with an auxiliary shaft comprising a pedal spindle 1 for receiving a manually provided driving force and a motor 5 having a shaft 4 for receiving a motor provided driving force. A first torque transmission path is provided for transferring the manually provided driving force to a drive mechanism comprising a sprocket 16 of the pedal driven apparatus and a second torque transmission path is provided for transferring the motor provided driving force to said sprocket 16 of the pedal driven apparatus. A first one way drive means 13 is provided in the first torque transmission path between the pedal spindle 1 and the sprocket 16 such that, when the sprocket is being driven by the motor provided driving force through the second torque transmission path, the pedal spindle 1 is able to freewheel.

An advantage of this arrangement is that it is not necessary to provide a freewheel sprocket on the rear wheel of the bicycle. This is because the first one way drive means 13 provides this function in addition to enabling the pedal spindle 1 to freewheel when the motor drive is operating.

The first torque transmission path comprises the manually operable pedals 10, the pedal spindle 1 to which the pedals 10 are affixed for rotation therewith, and the first one way drive means 13. The first one way drive means 13 mechanically couples the pedal spindle 1 to the sprocket 16 such that the first one way drive means 13 transfers the manually provided driving force applied to the pedals 10 to the sprocket 16 to cause rotation of the sprocket. The first one way drive means 13 also allows the pedal spindle 1 to freewheel when the sprocket 16 is being driven by the motor shaft 4. The first one way drive means 13 may comprise a freewheel device such as an over-running bearing or an over-running clutch or any device suitable for enabling drive to be applied through an output member of the one way drive means, but for an input member to freewheel when no drive is being transferred through said first one way drive means 13.

The second torque transmission path comprises the motor shaft 4 and a gear mechanism housed in a casing 7 mechanically coupling the motor shaft 4 to the sprocket 16. The gear mechanism has a reduction gear ratio and operates to transfer the motor provided driving force from the motor shaft 4 to the sprocket 16 at said reduction gear ratio. The gear mechanism may comprise a planetary gear mechanism having a planet gear 20 whose axis of rotation is offset by a predetermined amount with respect to the axis of rotation of the motor shaft 4.

This allows a high speed motor to be employed whereby the gear mechanism applies a suitable reduction gear ratio to the output shaft of the motor to rotate the sprocket at high torque and low speed (relatively speaking when compared to the motor shaft speed of rotation).

As shown more explicitly in FIGS. 1 to 4, the motor and sprocket assembly comprises: the motor 5, the motor rotor hollow shaft 4 supported by bearings 3 and 6, an end cover at one end of the motor 5, i.e. the casing 7 of the planetary gear mechanism, an internal gear ring 8 fixed within the casing 7 of the planetary gear mechanism; an eccentric wheel 22 fixed around the hollow shaft 4 of the motor 5, and a flat key 23 disposed between the hollow shaft 4 and the eccentric wheel 22 for transmitting torque. The planet gear 20 is fit around the outer circumference of the eccentric wheel 22 by means of a bearing 21, for rotation with the eccentric wheel 22, and engaged with the teeth of the internal gear ring 8. Four circular holes 19 are provided on a side surface of the planet gear 20. A planet gear carrier 11 is supported within the casing 7 by means of a bearing 9, and is provided with four pins 17 on a side surface facing the planet gear 20. Bushings 18 are provided around the pins 17 and inserted into the four circular holes 19 on the side surface of the planet gear 20. The function of the four pins 17 and the bushings 18 inserted into the four circular holes 19 on the planet gear 11 is to transfer drive from the planet gear 20 to the planet gear carrier 11 as the planet gear 20 rotates. The bushings 18 revolve around the pins 17 to accommodate rotation of the planet gear 20. The holes have a diameter larger than the diameter of the pins 17 to accommodate eccentric movement of the planet gear 20 with respect to the axis of rotation of the motor shaft 4.

To effect the transfer of a motor driving force from the planet gear 20 to the planet gear carrier 11, ratchet seats are arranged on an outer side of the planet gear carrier 11 and ratchets 15 moveably disposed on the ratchet seats and engaged with an inner surface of a ratchet wheel 12 which is affixed to the sprocket 16. The pedal central spindle 1 is freely disposed in the hollow shaft 4 of the motor 5 and is mounted coaxially with the motor shaft 4. The pedal central spindle 1 is supported in the hollow shaft 4 of the motor and the planet gear carrier 11 by means of bearings 2 and 14 respectively. The pedal cranks 10 are disposed at the ends of the pedal central spindle 1. Associated with the pedal crank 10 on a sprocket side of the assembly is the first one way drive means comprising a one-way freewheel 13 fixed on said pedal crank 10. A side surface of the ratchet wheel 12 is fixed on a flange of the one-way freewheel 13, and the sprocket 16 is fixed on the other side surface of the ratchet wheel 12.

In operation of this embodiment, during pedal driving, the pedal crank 10 drives the ratchet wheel 12 to rotate through the one-way freewheel 13, so that the sprocket 16 fixed on the ratchet wheel 12 rotates simultaneously, and propels the bicycle to move forward through a chain drive (not shown) of the sprocket 16.

A second one way drive means comprising the ratchet members 15 and the ratchet wheel 12 is provided in the second torque transmission path between the motor shaft 4 and the sprocket 16 such that, when the sprocket 16 is being driven by the manually provided driving force through the first torque transmission path, the motor shaft 4 is not caused to rotate. The ratchet members 15 moveably disposed on the planet gear carrier 11 engage a rack of the ratchet wheel 12. The ratchet members 15 may have associated therewith means (not shown) for resiliently biasing free ends of said ratchet members 15 outwardly from a surface of the planet gear carrier 11 such that said free ends of the ratchet members 15 engage teeth in the rack of the ratchet wheel 12.

Because of the one-way transmitting function of the second one-way drive means 12, 15, the rotation of the ratchet wheel 12 by the pedal 10 will not drive the planet gear carrier 11 or the motor shaft 4 to rotate. During motor driving, the hollow shaft 4 of the motor rotates the eccentric wheel 22 of the planetary gear mechanism, and then the eccentric wheel 22 drives the planet gear 20 to revolve around the motor axis. According to the angular position of the eccentric 22 at any time during rotation, the teeth of the planet gear 20 engage with the corresponding teeth of the internal gear ring 18, so as to make the planet gear 20 rotate in relation to the motor axis and this rotation will be outputted by the planet gear carrier 11. The planet gear carrier 11 rotates the ratchet wheel 12 by means of the ratchets 15 disposed on the ratchet seats, and then the ratchet wheel 12 rotates the sprocket 16 which is fixed together with the ratchet wheel 12, so as to propel the bicycle to move forward by the chain. At this time, because of the one-way transmitting function of the first one-way transmitting means, (i.e. the one-way freewheel 13), the rotation of the sprocket 16 will not make the pedal crank 10 or the pedal spindle 1 rotate.

In this embodiment, the motor 5 is arranged concentrically around the pedal spindle 1 such that the pedal spindle 1 is freely accommodated through the hollow bore of the motor shaft 4 and such that their axes of rotation are parallel and preferably coaxial, i.e. the pedal spindle 1 and the motor shaft 4 share the same axis of rotation.

This arrangement results in a neat and compact integration of the motor with the pedal spindle and sprocket assembly.

Also in this embodiment, the planet gear 20 is rotatably supported on the eccentric wheel 22 whereby the planet gear 20 is made to rotate as the eccentric wheel 22 rotates and whereby the position of the axis of rotation of the planet gear 20 changes relative to the axis of rotation of the motor shaft 4 as the planet gear 20 rotates such that the varying position of the axis of rotation of the planet gear 20 defines a circle centred on the axis of rotation of the motor shaft 1, said circle having a radius equal to the predetermined offset amount. The planet gear 20 has a smaller diameter than the internal ring gear 8, the internal ring gear 8 having a central axis coincident with the axis of rotation of the motor shaft 4. The planet gear 20 has a smaller number of teeth than the internal ring gear 8.

The planet gear 20 rotates around the inner toothed surface of the inner ring gear 8 such that the outer toothed surface of the planet gear 20 meshes with only a small number of teeth of the inner ring gear 8 at any point of time.

The planet gear carrier 11 of the planetary gear mechanism transfers the motor provided driving force to the sprocket 16 and, in doing so, provides a neat and efficient way of mechanically transferring the motor driving force to the sprocket 16.

The planetary gear mechanism includes a counterbalance member 24 which is configured to counterbalance an imbalance of weight caused by the offsetting of the planet gear 20 with respect to the axis of rotation of the motor shaft 4. The counterbalance member 24 comprises a generally semi-circular weighted member which is arranged to rotate with the planet gear 20 so as to counterbalance the planet gear when the planet gear is rotating.

The motor 5 comprises an electric motor powered by a battery pack carried on the pedal driven apparatus.

Figure 5:
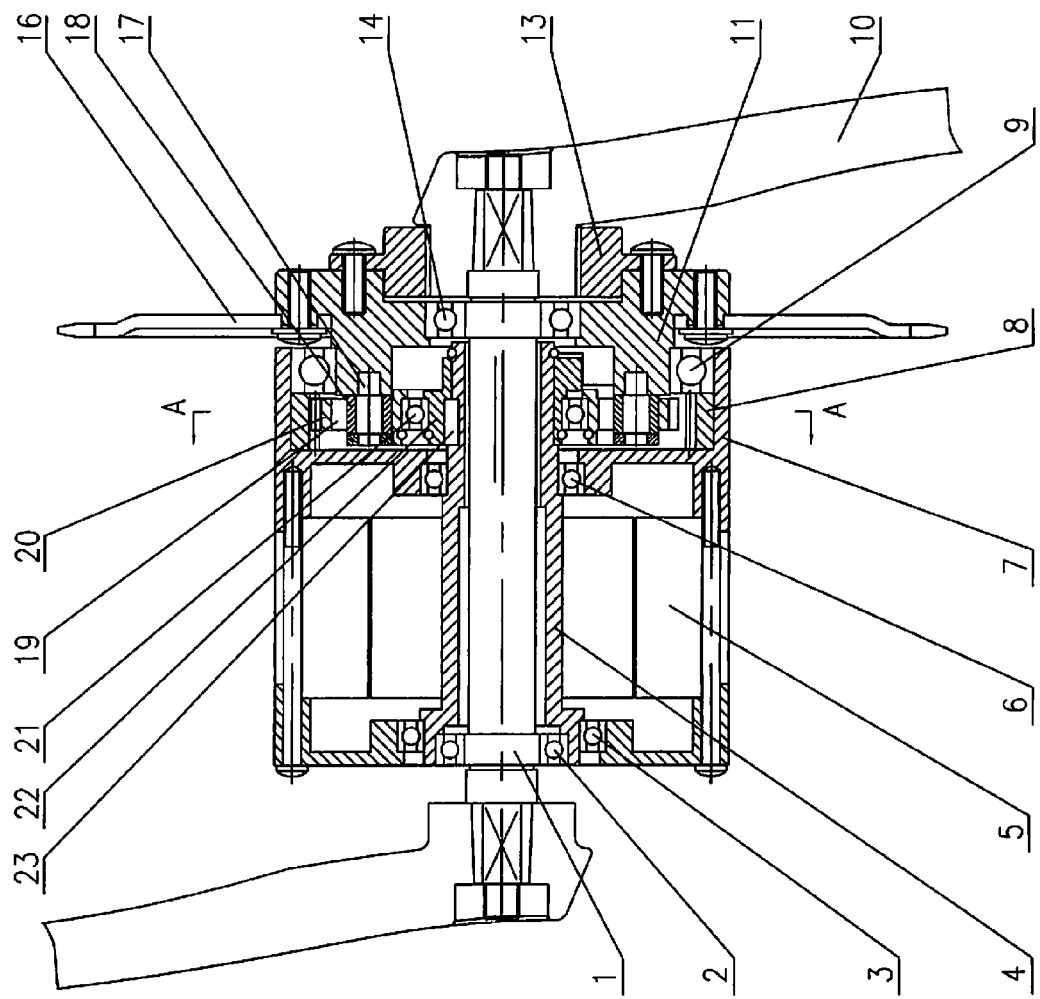
FIG. 5 is a structural schematic view of a second embodiment of a motor and sprocket assembly for a pedal driven apparatus according to the invention.

FIG. 5 depicts a second embodiment of the motor and sprocket assembly according to the invention. In the description of this embodiment, like numerals to those used in FIGS. 1 to 4 are used to denote like parts, although any differences in the parts are described in the following.

In this embodiment, the second one-way drive or transmitting means, (i.e. the ratchet wheel 12 and ratchets 15), is omitted, so that the planet gear carrier 11' of the planetary gear mechanism is fixedly coupled to the sprocket 16 for rotation therewith. The planet gear 20 and the sprocket 16 are directly and fixedly connected with the (output member of) one-way freewheel 13 of the first one-way drive/transmitting means. As such, the planet gear carrier 11' is modified compared to its configuration in the first embodiment of FIGS. 1 to 4 to enable it to be directly and fixedly connected with the one-way freewheel 13. In this embodiment, the direct coupling of the planet gear carrier 11' to the freewheel 13 enables the bicycle function to be altered. In this embodiment, the motor 5 can function as a power generating device driven by pedaling or forward motion of the bicycle, i.e. the bicycle freewheeling down a slope, for example.

In operation of this embodiment, during pedal driving, the pedal crank 10 drives the planet gear carrier 11' and the sprocket 16 to rotate simultaneously through the one-way freewheel 13, and then propels the bicycle to move forward through the chain. At this time, since the planet gear carrier 11' rotates along with the sprocket 16, it drives the planet gear 20 and the eccentric wheel 22 to rotate, which in turn drives the hollow shaft 4 of the motor 5 to rotate. Under this circumstance, if the rider intends to increase the load applied on the pedals to do exercise using the bicycle, or intends to use the motor to function as a brake for decelerating the bicycle when going downhill or to use the motor to generate power for lights or recharging the motor battery pack, the rider can control a switch installed on, for example, a handlebar of the bicycle to switch the circuit of a controller so as to transform the motor 5 to a power generating device, the power generated by which can be utilized by a load or for charging a battery. During normal riding, the controller can be switched to be in a normal riding state, so that no additional load is applied on pedals. During motor driving, the hollow shaft 4 of the motor 5 drives the eccentric wheel 22 of the planetary gear mechanism to rotate, which in turn drives the planet gear 20 to revolve around the axis of the motor. Consequently, torque will be outputted by the planet gear carrier 11' which drives the sprocket 16 to rotate, and then propels the bicycle to move forward through the chain drive. At this time, due to the one-way transmitting function of the one-way freewheel 13, the rotation of the sprocket will not drive the pedal crank 10 to rotate, i.e. the pedal crank and the pedal spindle can freewheel.

In this example, when moving forward, the bicycle can drive the motor to generate power through the transference of power transferring from the chain drive, whilst no one-way freewheel having the one-way drive/transmitting function is provided at the rear wheel hub.

Figure 6:
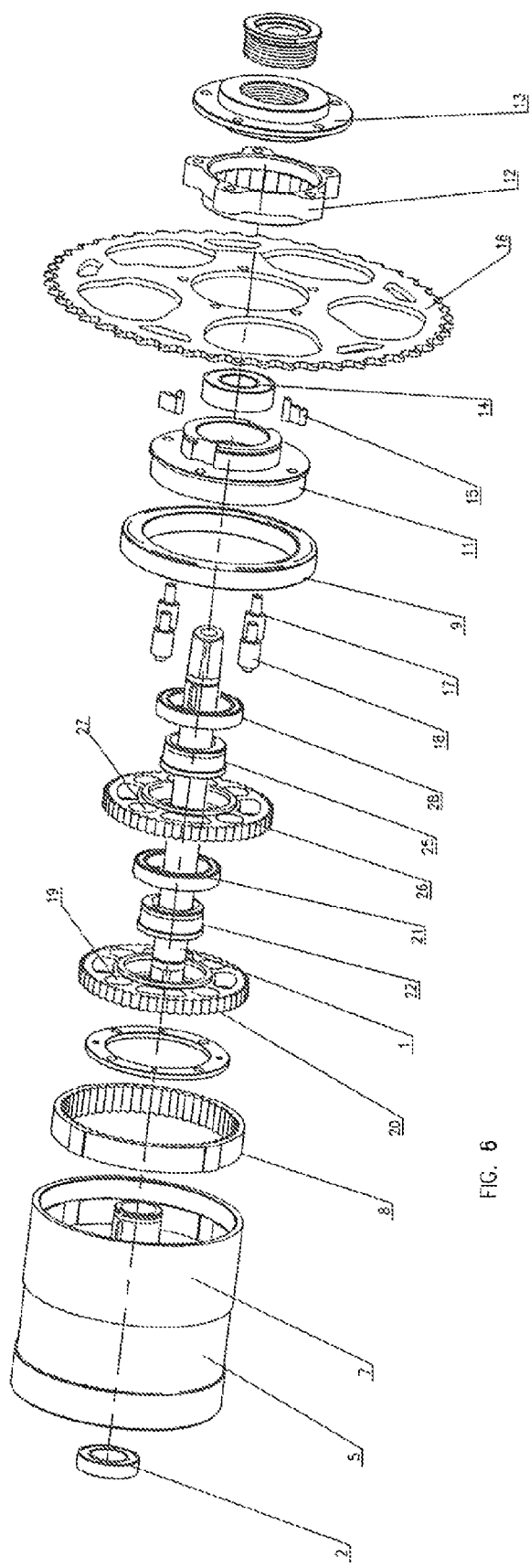
FIG. 6 is an exploded perspective view of a third embodiment of a motor and sprocket assembly for a pedal driven apparatus according to the invention.

FIG. 6 depicts a third embodiment of the motor and sprocket assembly according to the invention. In the description of this embodiment, like numerals to those used in FIGS. 1 to 5 are used to denote like parts, although any differences in the parts are described in the following.

In this embodiment, the planetary gear mechanism does not include a weighted counterbalance member, but comprises first and second identical planet gears 20, 26 arranged half a revolution out of phase with each other such that said first and second planet gears 20, 26 counterbalance each other on rotation. The first and second planet gears 20, 26 may be located within respective internal ring gears, but are preferably located for rotation half a revolution out of phase with each other within a common, single internal ring gear 8' of double width compared to the internal ring gear of the first or second embodiments. The first and second planet gears 20, 26 are supportably mounted on respective first and second eccentric wheels 22, 25. The second planet gear 26 is mounted on the second eccentric wheel 25 by a bearing 28. The pins 17 are made longer than in other embodiments and extend through respective sets of apertures 19, 27 in both of the planet gears 20, 26.

The use of two out of phase planet gears 20, 26 negates the need to provide a weighted counterbalance member and provides a balanced system which transfers motor driving force to the sprocket 16 more efficiently and quietly than the foregoing arrangement including a weighted counterbalance.

This embodiment in like manner to the second embodiment depicted by FIG. 5 includes a second one way drive means 12, 15. However, it will be understood that the described arrangement of first and second planet gears 20, 26 of this embodiment (FIG. 6) can be employed within either of the first (FIGS. 1 to 4) or second (FIG. 5) embodiments with minimal modification. Furthermore, the operation of this embodiment is otherwise the same in all respects to the second embodiment save for the fact that counterbalancing of the (first) planet gear 20 is provided by the second planet gear 26.

In the foregoing embodiments of the invention, the teeth on the gears of the planetary gear mechanism are depicted as comprising spur or straight cut gears in which the edge of each tooth is straight and aligned parallel to the axis of rotation of the gear. However, in preferred embodiments, the gears comprise helical gears.

Helical gears offer a refinement over spur gears. The leading edges of the teeth are not parallel to the axis of rotation, but are set at an angle to said axis of rotation of the gear. Since the gear is curved, this angling causes the tooth shape to be a segment of a helix. The angled teeth engage more gradually than do spur gear teeth causing them to run more smoothly and quietly. With parallel helical gears, each pair of teeth first make contact at a single point at one side of the gear wheel; a moving curve of contact then grows gradually across the tooth face to a maximum then recedes until the teeth break contact at a single point on the opposite side. In spur gears teeth suddenly meet at a line contact across their entire width causing stress and noise. Spur gears make a characteristic whine at high speeds and can not take as much torque as helical gears. A disadvantage of helical gears is a resultant thrust along the axis of the gear, which normally needs to be accommodated by appropriate thrust bearings, but in the present invention, other components of the motor transmission system act to oppose any thrust along the axis of the gear caused by meshing helical gears and so thrust bearings may not be necessary in some embodiments. In all other respects, the planetary gear mechanism having helical gears is the same as the embodiments of the planetary gear mechanism hereinbefore described.

Figure 7:
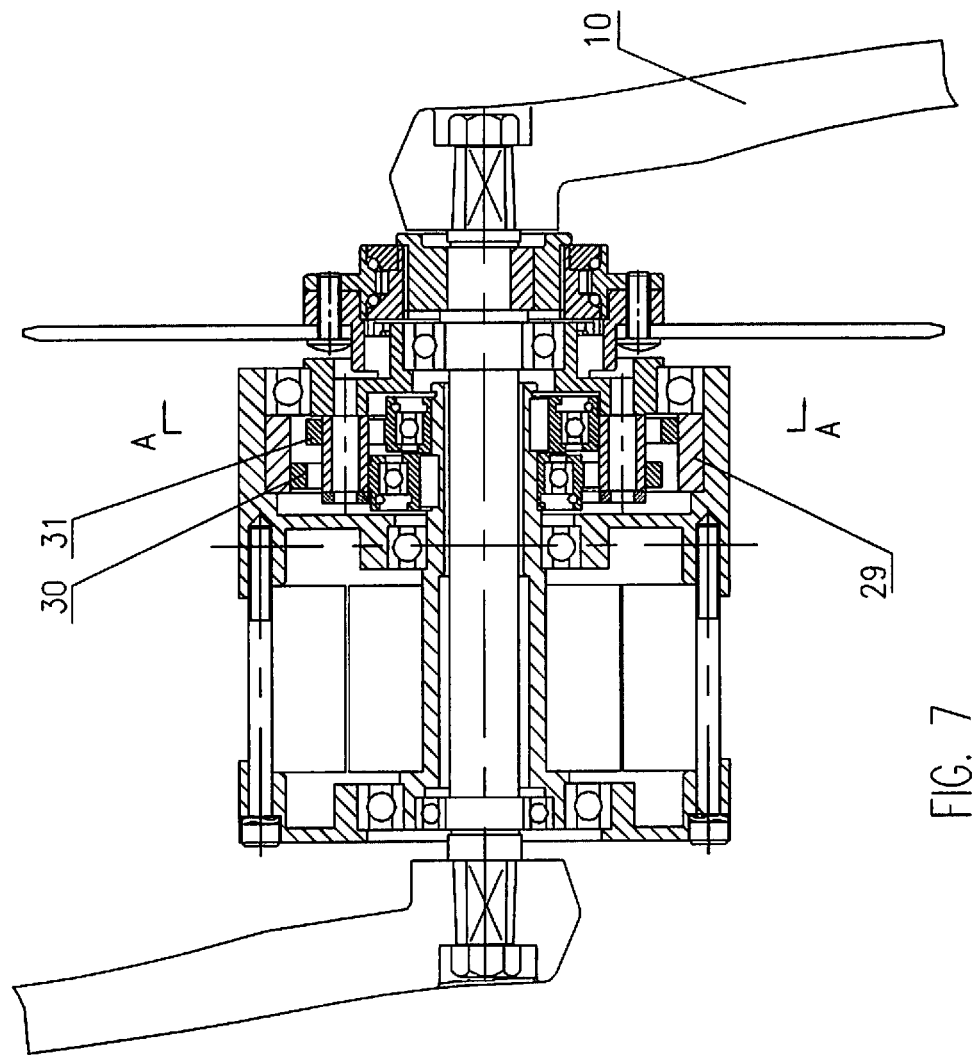
FIG. 7 is a structural schematic view of a fourth embodiment of a motor and sprocket assembly for a pedal driven apparatus according to the invention.
Figure 8:
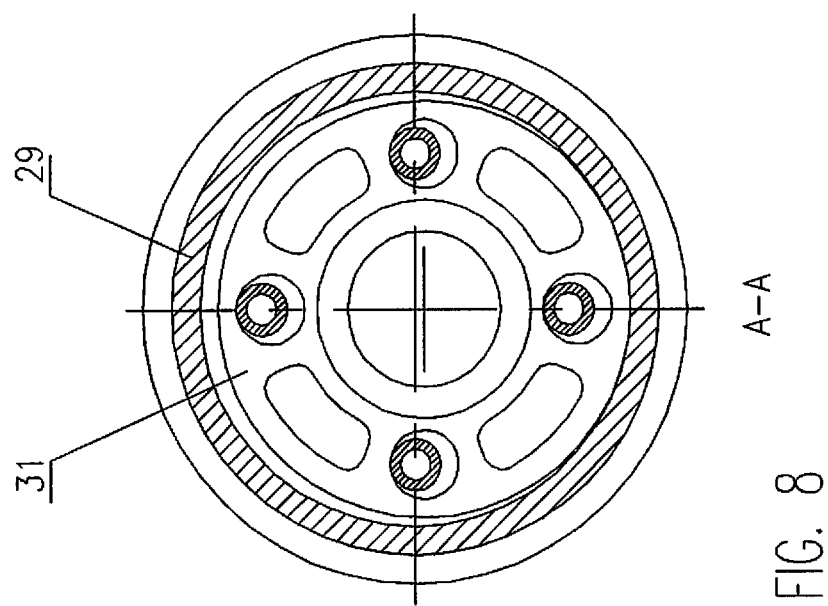
FIG. 8 is a sectional view taken along the line A-A of FIG. 7.
Figure 9:
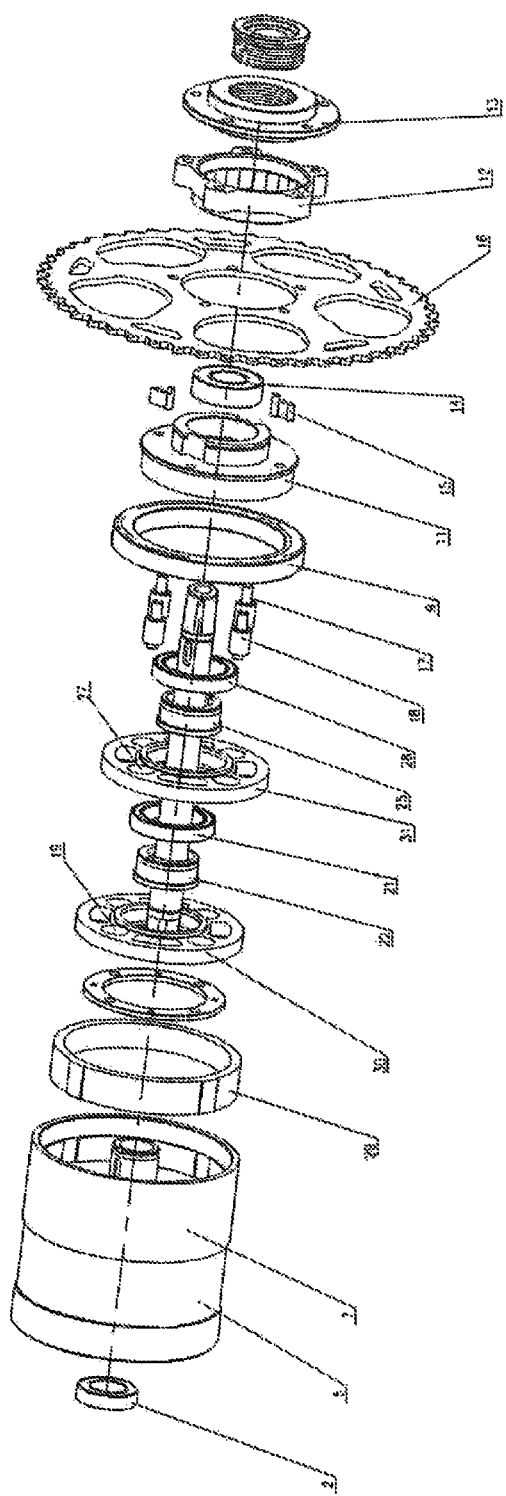
FIG. 9 is an exploded perspective view of the embodiment of FIG. 7.

FIGS. 7 to 9 depict a fourth embodiment of the motor and sprocket assembly according to the invention. In the description of this embodiment, like numerals to those used in FIGS. 1 to 6 are used to denote like parts, although any differences in the parts are described in the following.

In this embodiment, the arrangement of components is generally identical to that of the third embodiment save for the gear mechanism comprising a toothless planetary gear mechanism.

The toothless planetary gear mechanism has first and second toothless planet gears 30, 31 whose axes of rotation are offset by a predetermined amount with respect to the axis of rotation of the motor shaft 4. The reduction gear ratio of the toothless planetary gear mechanism is defined by a relationship between the respective diameters of the toothless planet gears 30, 31 and a single, common toothless internal ring gear 29 within which the first and second planet gears 30, 31 are located for rotation. The toothless planet gears 30, 31 have smaller diameters than the toothless internal ring gear 29. The first and second toothless planet gears 30, 31 are rotatably supported respectively on first and second eccentric wheels 22, 25 and located within the common, single toothless internal ring gear 29 half a revolution out of phase with each other to each counterbalance the other. The second planet gear 31 is mounted on the second eccentric wheel 25 by a bearing 28. The pins 17 are made longer than in other embodiments and extend through respective sets of apertures 19, 27 in both of the planet gears 30, 31. Outer surfaces of the first and second planet gears 30, 31 engage an inner surface of the toothless inner ring gear 29. The inner surface of the internal ring gear and/or the outer surfaces of the planet gears 30, 31 may be roughened to enhance the coefficient of friction acting between said engaged surfaces at their lines of contact. The friction fit between the first and second planet gears 30, 31 and the toothless internal ring gear 29 is achieved by heating the toothless internal ring gear 29 and shrink fitting it over the first and second toothless planet gears 30, 31.

One advantage of a toothless planetary gear mechanism is quietness. The lack of gear teeth and the reliance on contact between generally smooth, although possibly roughened, surfaces to effect a transfer of power from the motor to the sprocket results in very quiet operation and more efficient power transfer as there is no slippage or chatter between gear teeth as can occur in toothed gear mechanisms.

It will be understood that this embodiment could be modified to provide only a single toothless planet gear in a similar manner to the first embodiment depicted by FIGS. 1 to 4. In such a case, the toothless planetary gear mechanism would include a counterbalance member configured to counterbalance an imbalance of weight caused by the offsetting of the toothless planet gear with respect to the axis of rotation of the motor shaft.

It will also be appreciated that, whilst this embodiment includes a second one way drive means 12, 15 in a similar manner to the first and third embodiments, it could be modified in a similar manner to the second embodiment to omit the second one way drive means and directly and fixedly couple the planet gear carrier 11 to the first one way drive means 13. In such case, the planet gear carrier 11 may be affixed to an output member of the first one way drive means 13 for rotation therewith, whereby the manually provided driving force applied to the pedals 10 is transferred via the first torque transmission path to the motor shaft 4 through the toothless planetary gear mechanism as well as to the sprocket 16.

Figure 10:
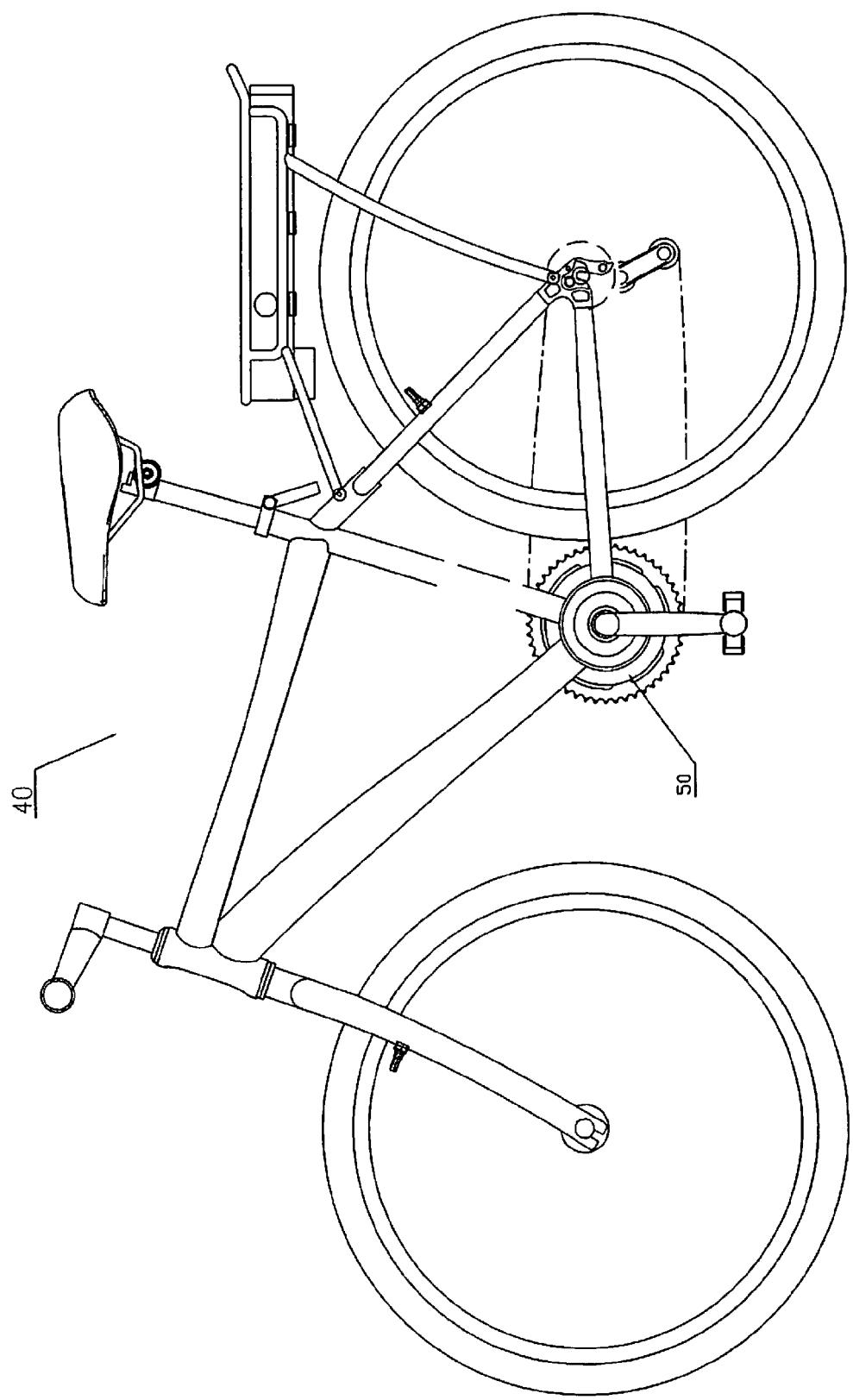
FIG. 10 is a schematic view of a pedal driven apparatus having a motor and sprocket assembly according to any of the embodiments of the invention.

FIG. 10 depicts a bicycle 40 having a motor and sprocket assembly 50 according to any of the foregoing embodiments. The bicycle body may be provided with a recess at the position of the central spindle for receiving the motor and the gear mechanism. The assembly of the motor and the gear mechanism, together with the central pedal spindle, are received tightly in the recess.

Figure 11:
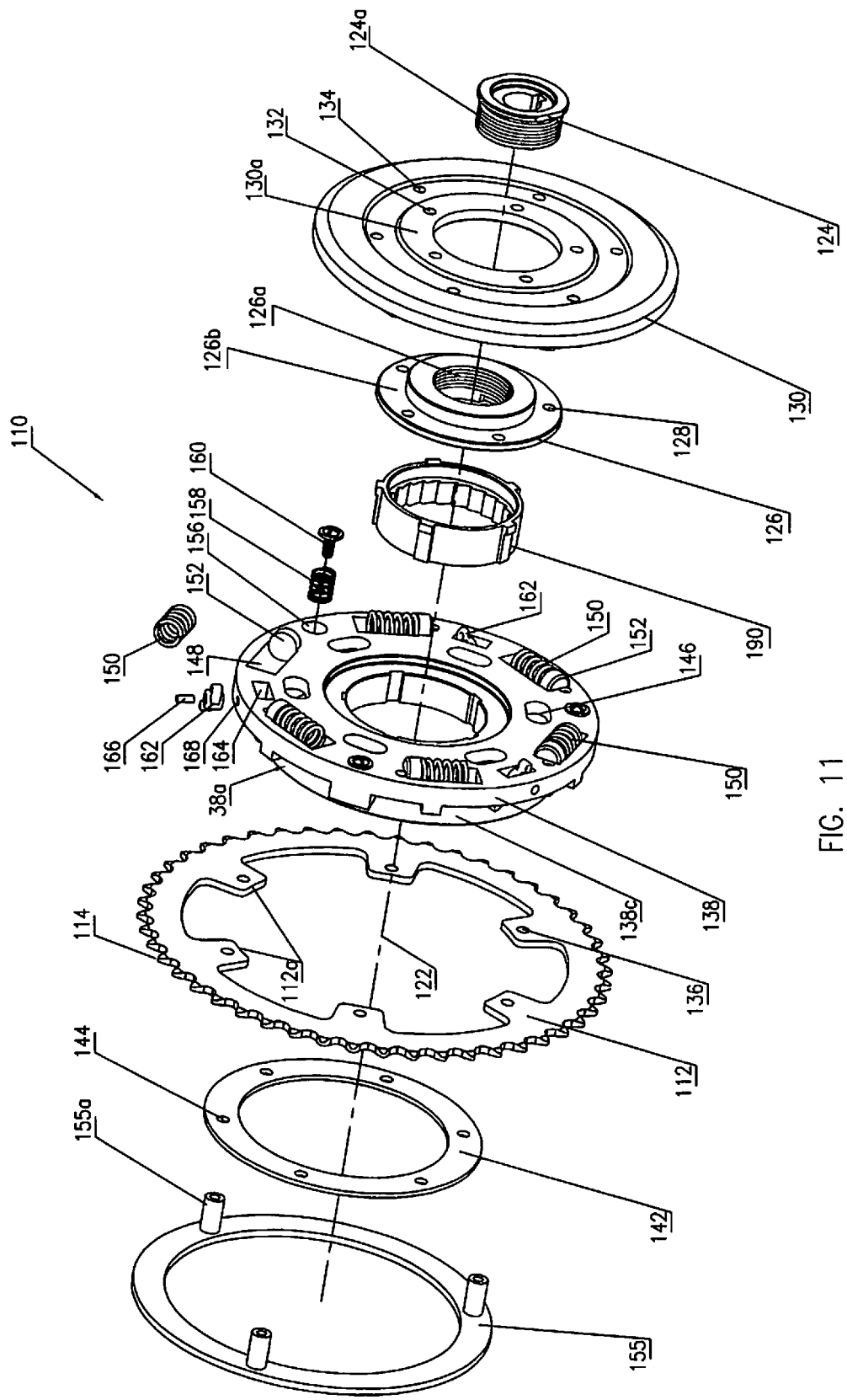
FIG. 11 is an exploded perspective view of a drive sprocket assembly in accordance with an embodiment of the invention.

FIG. 11 is an exploded perspective view of a drive sprocket assembly 110 for a pedal driven apparatus such as a bicycle including parts of a controller or adjuster or torque sensor for increasing a driving force provided by a motor mounted on said pedal driven apparatus. In the following description, reference will be made to a bicycle as an example of a pedal driven apparatus, but it will be understood that the invention is not limited to bicycles and the following description is equally applicable to other types of pedal driven apparatuses such as tricycles, pedalos (pedal boat), or the like.

Referring to the figures, the drive sprocket mechanism 110 comprises a drive sprocket 112 which receives a manual drive force applied to the pedals of the bicycle by a cyclist. The outer periphery of the drive sprocket has teeth 114 which engage a chain drive (not shown) to transfer a driving force to a wheel of the bicycle to cause forward motion of the bicycle. Conventionally, this is the rear wheel. It will be understood that in other pedal driven apparatuses the manual drive applied to the pedals may be conveyed through a suitable drive system to some other drive device for causing motion of the apparatus. For example, in a pedalo, the drive may be transferred to one or more paddles. Furthermore, the drive sprocket in the pedal driven apparatus may engage a belt drive rather than a chain. In such a case, the sprocket may not have teeth, but instead comprises a belt pulley or the like. Alternatively, the drive sprocket may comprise a gear wheel arranged to engage a gear chain for transferring manual force applied to the pedals through the gear train to a forward motion drive system of the apparatus. The invention is applicable to any type of motor unit such as electric motors or even internal combustion engines and to any positioning of the motor on the bicycle as mentioned above.

Figure 13:
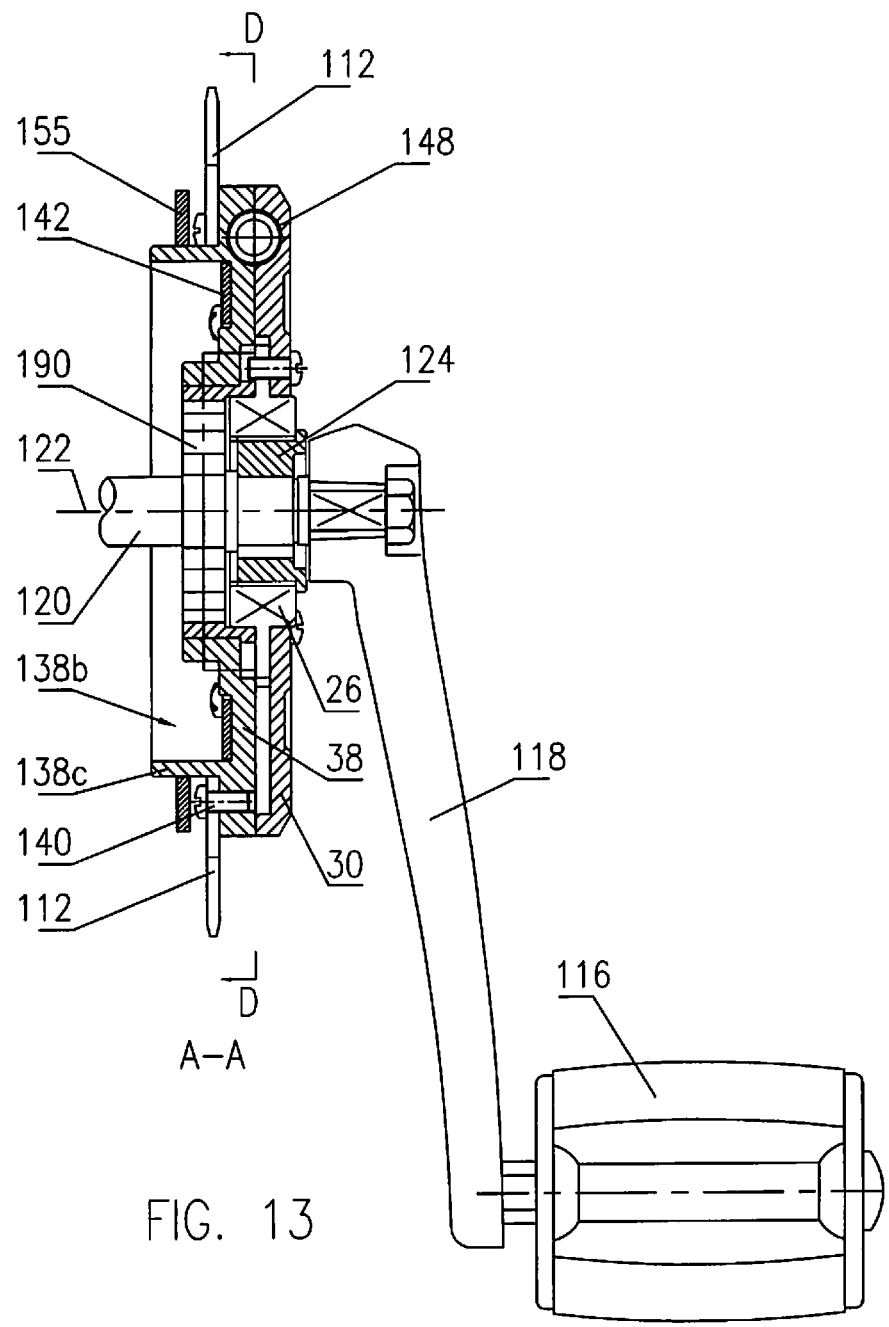
FIG. 13 is a side sectional view along line A-A of FIG. 12.

As shown in FIG. 13, pedals 116 including crank arms 118 are fixedly secured to either end of a pedal spindle 120 in a conventional manner whereby a cyclist can manually drive the pedals 116 to rotate the drive spindle or shaft 120 about the pedal spindle axis of rotation 122 in order to provide a driving force to the sprocket 112. Provided adjacent to one of the pedals (the right side pedal as viewed in FIG. 13) is a collar 124 which is keyed onto the pedal spindle 120 for fixed rotation therewith. The collar 124 has an external screw-threaded portion 124a which is screw-threadedly engaged inside an internal screw-threaded portion 126a of a generally annular mounting plate 126 which, by virtue of it being screw-threadedly fixed to the collar 124 is also fixed for rotation with the pedal spindle 120. Arranged around a peripheral edge portion or flange 126b of the mounting plate is a plurality or set of bolt or screws holes 128. In other not shown embodiments, the mounting plate 126 may be fixed to the collar 124 by other securing means. For example, the mounting plate 126 may be keyed to the collar 124 to secure it to the collar 124 for fixed rotation therewith. Or, the mounting plate 126 may be welded to the collar 124. However, providing a screw-threaded connection between the mounting plate 126 and the collar 124 provides a convenient manner of securing the mounting plate 126 to the collar 124 whilst also enabling subsequent maintenance of the parts in that said parts can be readily separated for maintenance, replacement or the like.

A first member in the form of an annular plate member 130 having two rows 132, 134 of concentric bolt holes is provided. A first inner row 132 of the two rows of concentric bolt holes is provided on an inner annular portion or flange 130a of the plate member 130 which extends axially by a short distance in a direction parallel to the axis of rotation of the pedal spindle 120. This set 132 of bolt holes is complementary to the set 128 of bolt holes provided on the mounting plate 126 and enable the plate member 130 to be bolted to the mounting plate 126 by screws or bolts as best seen in FIG. 13. Thus, the plate member 130 is fixedly secured to the mounting plate 126 and is thereby also mounted for fixed rotation with the pedal spindle 120. In other not shown embodiments, the plate member 130 may be secured to the mounting plate 126 by any suitable means including welding. However, by using a set of bolts or screws to secure the plate member 130 to the mounting plate 126 enables subsequent maintenance of the parts in that said parts can be readily separated for maintenance, replacement or the like. In yet other embodiments, the plate member 130 may be formed integrally with the mounting plate 126 and the collar 124 as a single piece unit in which case the inner row 132 of fixture apertures (inner row of screw holes) is not required.

Figure 3:
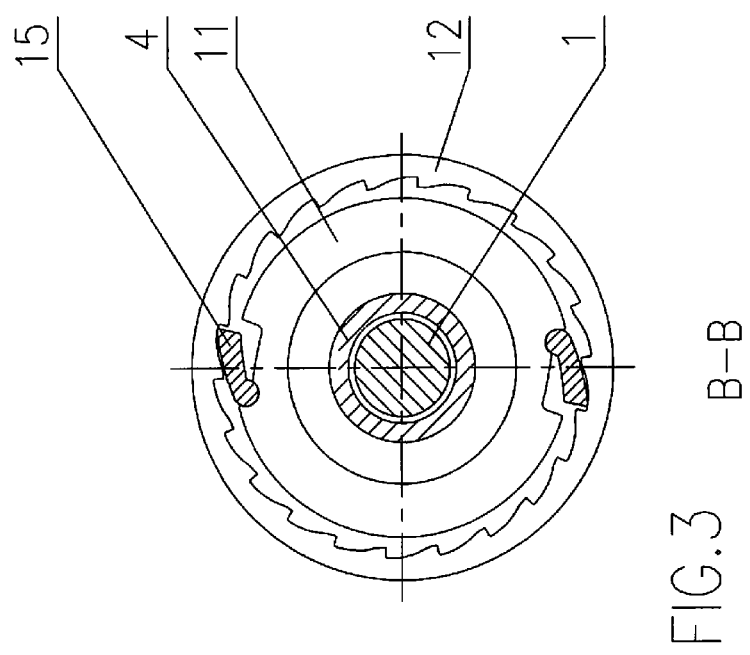
FIG. 3 is an enlarged sectional view taken along the line B-B of FIG. 1.
Figure 4:
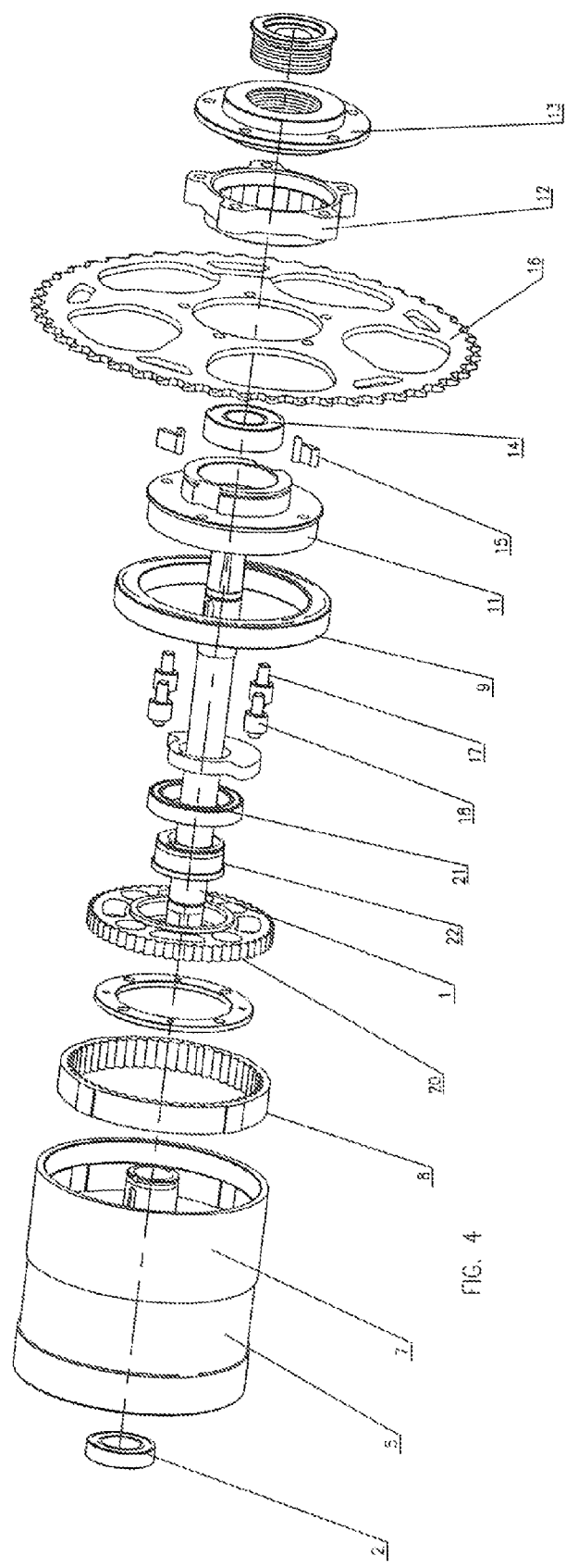
FIG. 4 is an exploded perspective view of the embodiment of FIG. 1.

The drive sprocket 112 has an annular form with inwardly depending splines 112a arranged around an inner peripheral edge thereof. Each spline 112a carries a respective bolt or screw aperture 136. The splines 112a of the sprocket 112 engage in complementary slots 138a in a rear surface of a sprocket mounting member 138. The apertures 136 on the splines 112a allow the sprocket 112 to be fixed to the mounting member 138 using bolts or screws 140 as best seen in FIG. 3. The sprocket 112 is secured to the mounting member 38 for fixed rotation therewith. In other not shown embodiments, the sprocket 112 may be secured to the mounting member 138 by any suitable means including welding. However, by using a set of bolts or screws to secure the sprocket 112 to the mounting member 138 enables subsequent maintenance of the parts in that said parts can be readily separated for maintenance, replacement or the like. In yet other embodiments, the sprocket mounting member 138 may be formed integrally with the sprocket 112 as a single piece unit.

A securing ring 142 is provided which in use is located within a recessed portion 138b on the rear surface of the sprocket mounting member 138. The securing ring 142 has a plurality of screw or bolts holes 144 around its peripheral edge portion. This set of screw holes 144 is complementary to an outer set 134 of the two sets of concentric bolt holes on the plate member 130 such that the plate member 130 and securing ring 142 can be secured to each other through complementary elongated apertures 146 formed in the sprocket mounting member 138 as is best seen in FIG. 13. Consequently, the securing ring 142 and the plate member 130 sandwich the sprocket mounting member 138 and the securing ring 142 holds the plate member 130 in a position closely adjacent a front surface of the sprocket mounting member 138 and loosely coupled to the sprocket mounting member 138, i.e. loosely coupled in the sense that plate member 130 and sprocket mounting member 138 are not fixedly secured to each other but such that they are move relative to each other a limited distance in the rotational direction of the sprocket 112. The elongation of the complementary elongated apertures 146 in the sprocket mounting member 138 allow the plate member 130 and securing ring 142 combination to move relative to the sprocket mounting member 138 and drive sprocket 112 combination in a direction of rotation of the drive sprocket 112. The amount of possible relative movement between the plate member 130 and the sprocket mounting member 138 is, however, limited by the length of the elongated apertures 146 in the sprocket mounting member 138.

Figure 14:
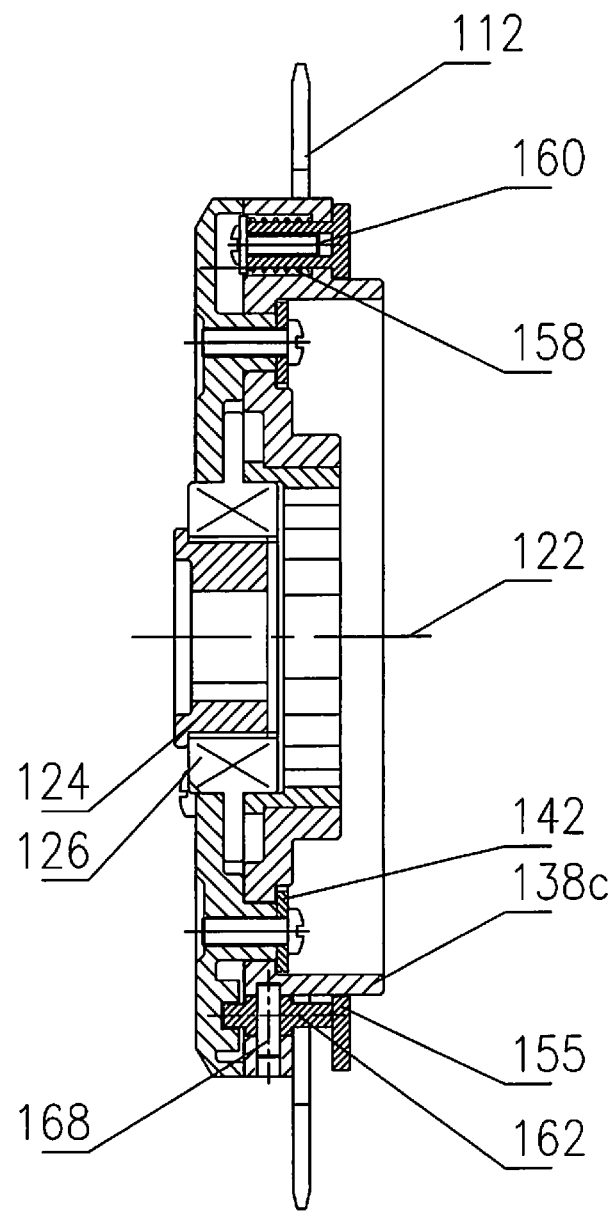
FIG. 14 is a side sectional view along line B-B of FIG. 12.
Figure 15:
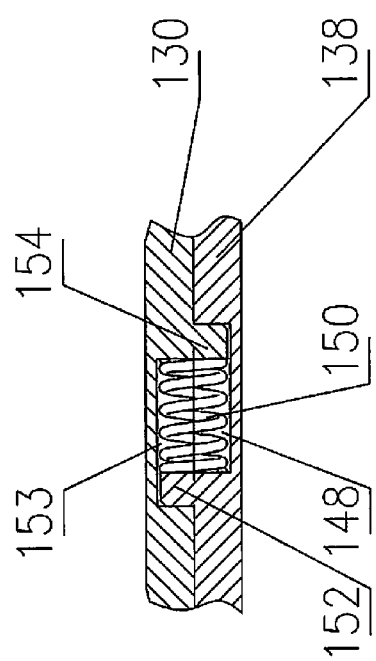
FIG. 15 is an enlarged partial sectional view of the plate member and sprocket mounting member of the sprocket assembly of FIG. 11.

Arranged around the front surface of the sprocket mounting member is a plurality of recesses 148. Each recess 148 contains a first biasing element 150 such as a spring. Preferably, the biasing elements 150 comprise compression springs, although any suitable biasing means or elements could be employed as will be apparent from the following description. The function of the biasing elements 150 is to maintain the plate member 130 in a first rotational position with respect to the sprocket mounting member 138 when no manual pressure is being applied to the pedals 116 of the bicycle, but to allow a small degree of movement of the plate member 130 in a rotational direction of the pedal spindle 120 with respect to the sprocket mounting member 138 when manual pressure is applied to at least one of the pedals 116, preferably a forward pedal when viewed in relation to a forward direction of motion of the bicycle. At a forward end of each recess 148, when viewed in a forward rotational direction of motion of the sprocket 112 and sprocket mounting member 138 combination as seen in FIG. 14, is provided a generally cylindrical boss 152 which extends outwardly beyond the front face of the sprocket mounting member 138 in an axial direction. The boss 152 may be formed integrally with the sprocket mounting member 138 or may comprise a separate component fixed within its recess 148. The boss 152 acts against an end of the biasing element 150 which in this arrangement comprises a compression spring. As can be best seen in FIG. 15, a similar set of bosses 154 is provided in recesses 153 on an inner surface of the plate member 130 which faces the front surface of the sprocket mounting member 138. The bosses 154 provided on the plate member 130 may also be integrally formed therewith or comprise separate components affixed thereto in respective recesses 153. The recesses 153 provided in the plate member 130 are adapted to partially accommodate the first biasing elements 150. Consequently, said recesses 153 in the plate member 130 in concert with said recesses 48 in the sprocket mounting member 138 accommodate the first biasing elements 150 therebetween. The bosses 154 provided on the plate member 130 are arranged to extend axially out from and beyond the inner facing surface of the plate member 130 as viewed in FIG. 11 such that, when the plate member 130 is mounted adjacent to the sprocket mounting member 138, the bosses 154 provided on the plate member 130 locate within respective recesses 148 in the sprocket mounting member 138 to engage opposing ends of the biasing elements 150 as can be best seen in FIG. 15. Similarly, the bosses 152 provided on the sprocket mounting member 138 extend into respective recesses 153 provided in the plate member 130. Consequently, when manual pressure is applied to at least one of the pedals 116 in a forward drive direction, it causes the plate member 130 to move fixedly in rotation with the pedal spindle 120. The sprocket mounting member 138 and sprocket 112 are not mounted such as to move in fixed rotation with the pedal spindle 120 but instead receive drive from the plate member 130, preferably via the biasing elements 150. Therefore, when pressure is applied to at least one of the pedals 116 in a forward direction of motion, the plate member 130 is rotated against the compression of the biasing elements 150 causing movement of the plate member 130 relative to the sprocket mounting member 138 and therefore also causing movement relative to the sprocket 112 in a forward direction of rotation of the pedal spindle 120. The amount of relative movement between the plate member 130 and the sprocket mounting member 138 is limited by the elongated length of the apertures 146 in the sprocket mounting member that loosely accommodate the screws or bolts used for coupling the securing ring 142 to the plate member 130.

Whilst the preferred embodiment is described as having a plurality of first biasing elements 150 preferably in the form of compression springs, it will be understood that in other arrangements there may be provided a single biasing element. This might comprise a coiled spring which is rotationally compressed in use or a torsional spring which is compressed in the axial direction of the pedal spindle 120 in use. It will also be understood that, rather than using compression springs, other types of springs or biasing elements or element may be used which uses extension of the biasing element(s) to maintain the plate member in its normal first position relative to the sprocket mounting member and sprocket.

Figure 12:
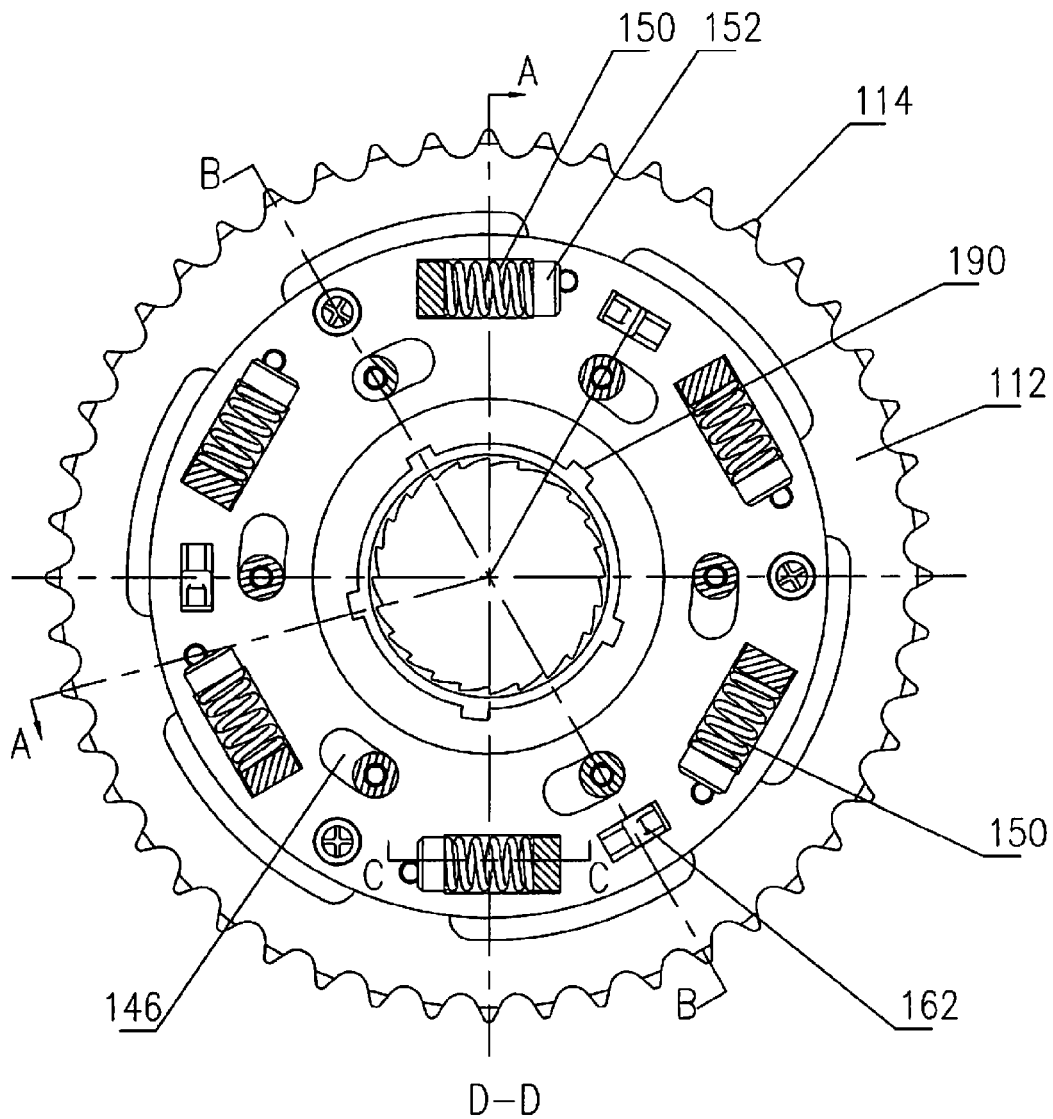
FIG. 12 is a front view of the drive sprocket assembly of FIG. 11.

Moveably mounted around an exterior surface of an annular wall 138c of the sprocket mounting member 138 which defines the recess 138b in the rear surface of the sprocket mounting member 138 is an actuator in the form of a ring member 155. The actuator ring member 155 is mounted on the sprocket mounting member 138 for movement in an axial direction parallel to the pedal spindle axis of rotation 122. The actuator ring member 155 is mounted to the sprocket mounting member 138 such that it is positioned outside the sprocket 112 on a back or rear side of the sprocket mounting member 138 as best seen in FIGS. 12 and 13. The actuator ring member 155 has three posts 155a arranged around its inner surface which are received through complementary apertures (not shown) in the rear surface of the sprocket mounting member 138. The posts 155a have inner screw-threaded portions adapted to receive a mounting screw or bolt 160. Formed in a front surface of the sprocket mounting member 138 are apertures 156 coaxial with the complementary apertures for receiving second biasing elements 158, preferably compression springs. Each of the second biasing elements 158 is positioned such that it surrounds at least a portion of a respective post 155a of the actuator ring member 155, but with its end nearest the actuator ring member 155 acting on an inner surface of the sprocket mounting member 138 with the ring part of the actuator ring member 155 being positioned on the rear side of the sprocket mounting member 138. A respective screw or bolt 160 is received in each of the posts 155a of the actuator ring member 155 such that the head of each screw acts against an opposing end of its respective second biasing element 158. In this arrangement, the actuator ring member 155 is mounted to the sprocket mounting member 138 such that the second biasing elements 158 bias said actuator ring member 155 to a normal position closely adjacent the rear surface of the sprocket mounting member 138. The actuator ring member 155 is moveable, in use, outwardly away from its normal position adjacent the rear surface of the clutch member 138 in an axial direction parallel to the axis of rotation 122 of the pedal spindle against the biasing of the second biasing elements 158.

Whilst the second biasing elements 158 are described as comprising compression springs, it will be appreciated that other types of springs or biasing elements or even only one spring or biasing element may be used to maintain the actuator ring member 155 in its normal position closely adjacent to the rear surface of the sprocket mounting member 138.

At least one lever member 162 is provided in the sprocket mounting member 138 for causing axial movement of the actuator ring member 155 away from the sprocket mounting member 138 when the plate member 130 moves relative to the sprocket mounting member 138 in opposition to the (first) biasing elements 150. The at least one lever member 162 comprises a central cylindrical portion with first and second end portions extending outwardly from said central portion in respective opposing directions. The at least one lever member 162 is mounted in the sprocket mounting member 138 such that a surface of the first end portion thereof engages the plate member 130 and a surface of a second end portion thereof engages the actuator ring member 155. The lever member 162 is preferably mounted to the sprocket mounting member 138 such that it pivots about a pivot axis which extends radially, i.e. perpendicular to the pedal spindle axis 122 through the central portion. The first and second end portions of the lever member 162 subtend an angle less that 180 degrees when viewed from a forward side of the sprocket assembly 110, i.e. when viewed from a forward directional side of the sprocket assembly 110 which is the right hand side as viewed in FIG. 11 or 12.

The sprocket mounting member 138 may have a plurality of such lever members 162 associated therewith. As seen in FIG. 11, each lever member 162 is received in a through hole 164 formed in an outer edge portion of the sprocket mounting member 138. Each lever member 162 is received in its respective through hole 164 such that its first end portion protrudes sufficiently to engage the plate member inner surface and such that its second end portion protrudes sufficiently to contact the actuator ring member inner facing surface. Each lever member 162 pivots about a pivot pin 166 which locates in a radially extending aperture 168 formed in a rim of the sprocket mounting member 138. The lever member 162 is assembled with the sprocket mounting member 138 by firstly presenting the lever member 162 in its through hole 164 in its normal orientation and driving the pivot pin 166 through the axially extending aperture 168 until said pin 166 passes through a pivot bore formed generally centrally of the lever member 162 in its cylindrical central portion. In use, as the plate member 130 moves in a forward rotational direction with respect to the sprocket mounting member 138, the plate member inner surface acts upon the first end of each lever member 162 causing the lever members to rotate. The plate member inner surface may be provided with catches (not shown) extending outwardly from its inner surface by an amount sufficient to engage the end surfaces of the first end portions of respective lever members 162. As each lever member 162 rotates, its second end portion is caused to extend outwardly from the rear surface of the sprocket mounting member 138 to a larger degree that when in its normal position such that it pushes against the inner surface of the actuator ring member 155. The second end portions of the lever members 162 cause the actuator ring member 155 to move axially away from the sprocket mounting member 138 against the biasing of the second biasing elements 150. Consequently, a small relative rotational displacement of the first plate member 130 with respect to the sprocket mounting member 138 (and thus the sprocket 112) results in an axial displacement of the actuator member 155, which axial displacement is proportional to the relative displacement of the plate member 130 to the sprocket 112 in the rotational direction of the sprocket.

In a not shown embodiment where the motor unit comprises an internal combustion engine, the actuator ring member 155 can be arranged to act on a mechanism that adjusts a throttle cable for said internal combustion engine whereby movement of the actuator ring member 155 is translated into a proportional movement of the motor throttle cable to thereby increase fuel supply to the motor and, by consequence, increase an amount of drive force exerted by the motor unit on a part of the bicycle to cause forward motion of the bicycle. The motor drive force may be provided to assist a cyclist in manually propelling the bicycle forward or may, if the cyclist chooses, replace the manual exertion of the cyclist.

In preferred embodiments, the motor comprises an electric motor powered from a battery pack carried on the pedal driven apparatus as will be better understood from the following.

Figure 16:
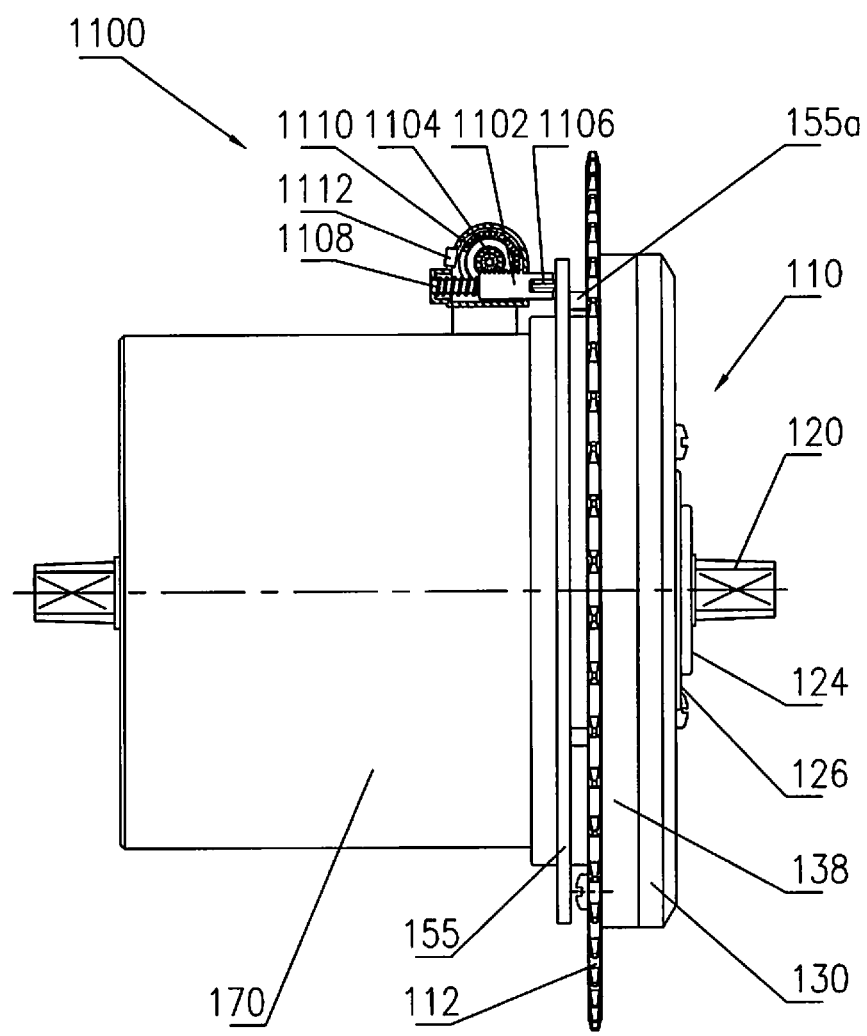
FIG. 16 is a side view of the sprocket assembly of FIG. 11 combined with a motor unit including an embodiment of a control signal apparatus.
Figure 17:
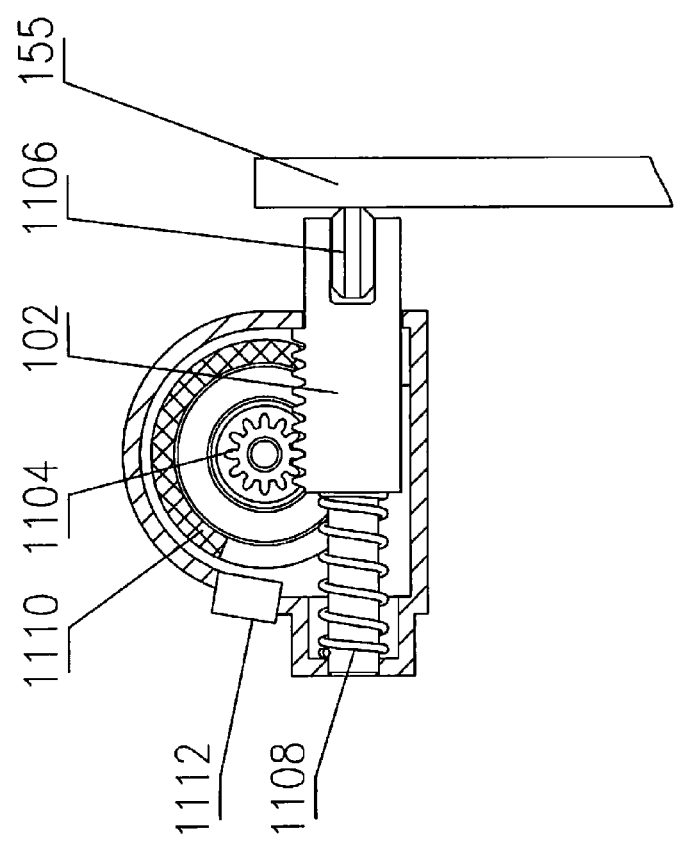
FIG. 17 is an enlarged view of the control signal apparatus shown in FIG. 16.
Figure 18:
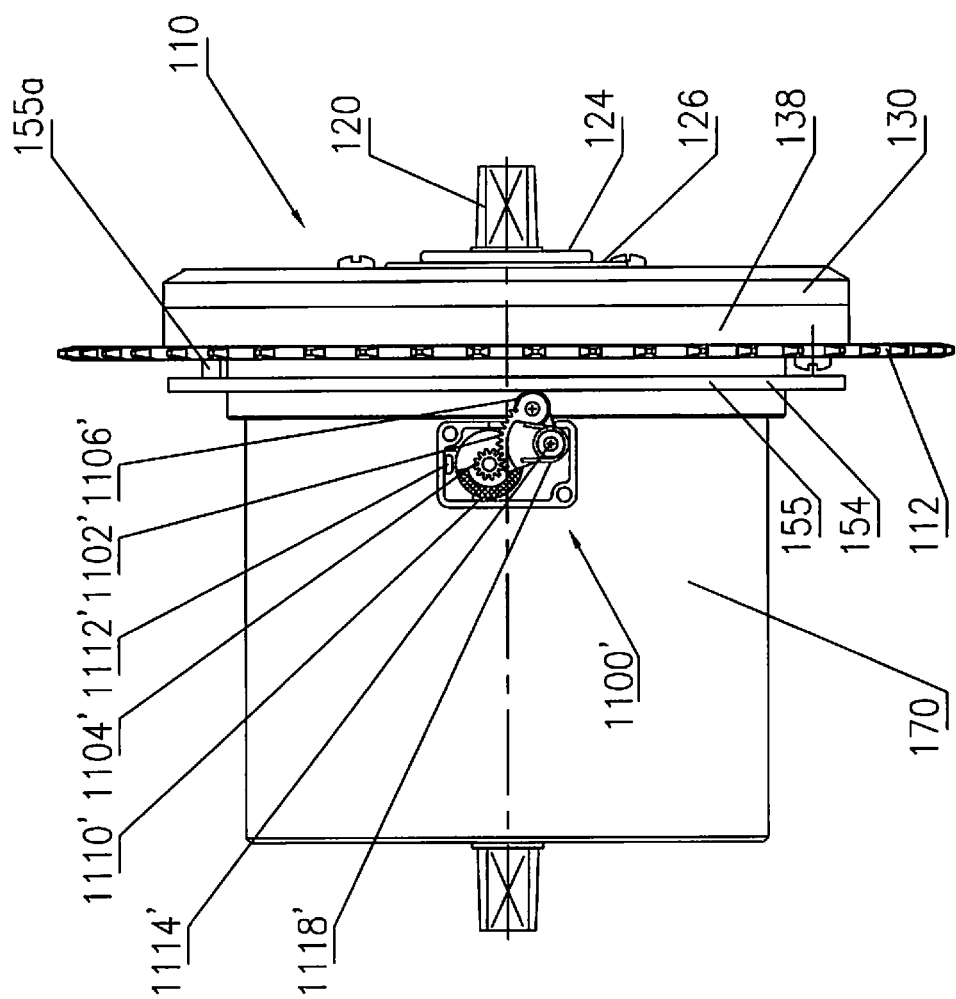
FIG. 18 is a top view of the sprocket assembly of FIG. 11 combined with a motor unit including another embodiment of a control signal apparatus.
Figure 19:
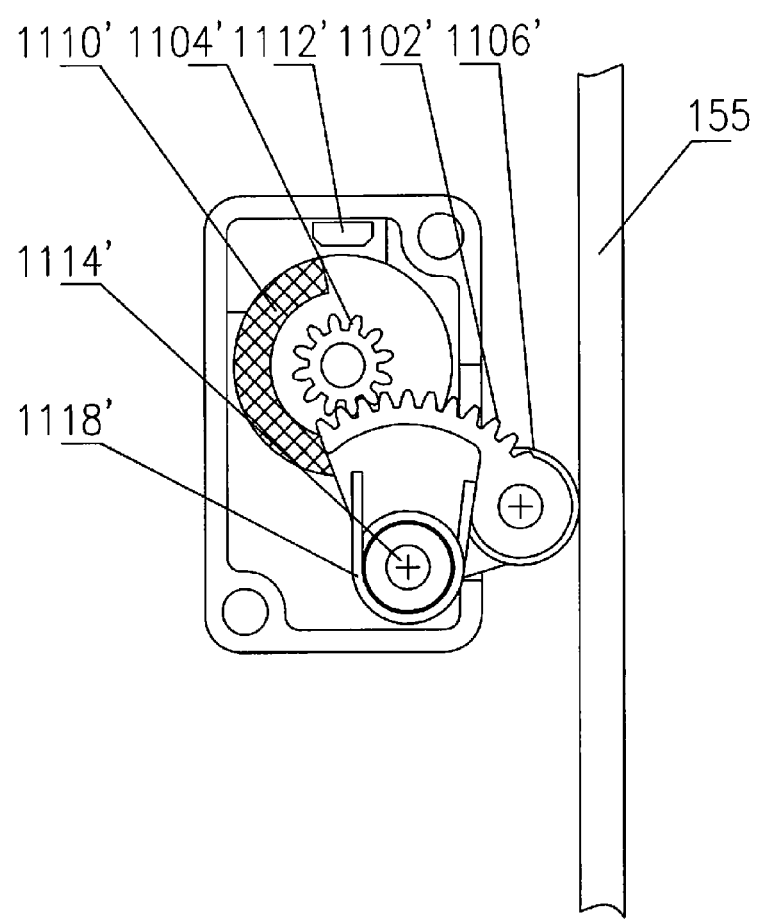
FIG. 19 is an enlarged view of the control signal apparatus shown in FIG. 18.

FIGS. 16 and 17 on the one hand and FIGS. 18 and 19 on the other hand depict alternative mechanisms for translating the axial movement of the actuator ring member 155 into a mechanical control input or an electromagnetic or electrical signal for another component such as the motor, e.g. for adjusting or increasing an amount of drive force delivered by an electric motor of the pedal driven apparatus.

In FIGS. 16 to 19, the motor 170 is mounted concentrically with the pedal spindle 120 such that a rotor part (not shown) of the motor 170 is coupled to the pedal spindle 120 in order to drive the spindle 120. As seen in FIG. 11, it is necessary in this arrangement to provide a one way drive means or overrunning bearing 190 (FIG. 11) by which drive from the motor 170 can be delivered to the pedal spindle 120 when the motor 170 is operating, but which allows the sprocket 112 to overrun the one way drive means 190 where the motor 170 is not being operated and drive is being provided manually through the pedals 116. The one way drive means 190 has a splined outer surface which engages in a complementary shaped internal bore of the sprocket mounting member 138. The motor rotor drive shaft (not shown) couples with the one way drive means 190 whereby the motor rotor drive shaft is received in a bore of the one way drive means 190. It will be understood that the one way drive means 190 of FIG. 11 is not an essential component of the sprocket assembly 110 when the motor 170 is not mounted about the pedal spindle 120, i.e. when the motor 170 is mounted to engage, for example, the rear wheel or some other part of the bicycle other than the pedal spindle or shaft 120.

FIG. 16 shows an arrangement where the sprocket assembly 110 of FIG. 11 including the one way drive means 190 is mounted about the pedal spindle 120 with the electric motor 170 also mounted concentrically with the pedal spindle 120 whereby the rotor of the motor is configured to deliver drive to the pedal spindle 120 through the one way drive means 190.

The motor 170 is mounted about the pedal spindle 120 such that the pedal spindle 120 passes through a hollow bore of the motor rotor drive shaft (not shown). The motor rotor drive shaft does not therefore couple directly with the pedal spindle 120 but instead is coupled to the sprocket 112 through the one way drive means 190. The motor 170 may be mounted or coupled to the sprocket mounting member 138 assembly by any suitable means.

Located on the housing of the motor 170 is a rack and pinion mechanism 1100 for translating a physical movement into a control input such as an electromagnetic signal for another component on the bicycle. The mechanism comprises a rack 1102 and a pinion 1104, whereby the rack 1102, in use, engages the outer surface of the ring actuator member 155. Consequently, the rack 1102 is positioned such that it is always in engagement with the actuator ring member 155 even when said actuator ring member 155 is rotating about the pedal spindle axis of rotation 122. The rack 1102 has a small wheel 1106 at its free end which facilitates moving contact between the rack 1102 and the rotating actuator ring member 155. The rack 1102 is biased to occupy a normal position with the wheel 1106 on its free end resting against the outer surface of the actuator ring member 155. The rack 1102 is mounted to move linearly.

When the actuator ring member 155 is caused to move axially away from the sprocket mounting member 138, it acts against the rack 1102 and causes the rack 1102 to move linearly in opposition to the rack's biasing component 1108 which preferably comprises a compression spring, although any suitable biasing component could be employed. Movement of the rack 1102 causes movement of the pinion 1104 in a generally conventional manner of a rack and pinion gear assembly.

The pinion 1104 carries a metal or magnetic strip 1110 which is arranged on movement of the pinion 1104 to pass a sensor 1112 such as a Hall effect sensor which measures the amount by which the pinion 1104 is rotated and which outputs an electromagnetic signal proportional to the amount of movement of the pinion 1104. This signal therefore comprises an electromagnetic signal that is proportional to the degree of relative movement of the plate member 130 relative to the sprocket mounting member 138 and thus sprocket 112 of the sprocket assembly 110. However, it will be appreciated that any means of detecting the amount by which the pinion 1104 is caused to move and outputting a control input for another component indicative of said amount of movement could be employed. In fact, it will be appreciated that the mechanism 1100 need not comprise a rack and pinion arrangement, but any means of detecting movement of the actuator ring member 155 in an axial direction and for converting said sensed movement into a mechanical or electrical and/or electromagnetic signal indicative of the amount by which the actuator ring member 155 has moved thereby providing, for example, a power control signal for the motor 170.

Associated with the motor 170 is control circuitry (not shown) which converts the signal received from the Hall effect sensor 1112 and converts it to a control input signal to control an amount of current supplied to the motor 170 in proportion to the detected amount of movement of the actuator ring member 155. Consequently, it is possible to use the actuator ring member movement as a means of controlling the electric motor 170 to deliver more power to the pedal driven apparatus in response to and in direct proportion to the amount of pressure applied by a user to at least one pedal of the apparatus to cause relative displacement of the first plate member with respect to the sprocket.

FIG. 18 also shows another arrangement where the sprocket assembly 110 of FIG. 11 including the one way drive means 190 is mounted about the pedal spindle 120 with the electric motor 170 also mounted concentrically with the pedal spindle 120 whereby the rotor of the motor 170 is configured to deliver drive to the pedal spindle 120 through the one way drive means 190.

Here also, the motor 170 is mounted about the pedal spindle 120 such that the pedal spindle passes through a bore of the motor rotor drive shaft (not shown). The motor rotor drive shaft does not therefore couple with the pedal spindle 120 but instead is coupled to the sprocket assembly 110 through the one way drive means 190. The motor 170 may be mounted or coupled to the sprocket mounting member assembly by any suitable means.

Located on the housing of the motor 170 is an alternative rack and pinion mechanism 1100' for translating a physical movement to an electromagnetic signal. The mechanism comprises a curved rack 1102' and a pinion 1104', whereby the rack 1102', in use, engages the outer surface of the ring actuator member 155. Consequently, the rack 1102' is positioned such that it is always in engagement with the actuator ring member 155 even when said actuator ring member 155 is rotating about the pedal spindle axis of rotation. The rack 1102' has a small wheel 1106' at its free end which facilitates moving contact between the rack 1102' and the rotating actuator ring member 155. The rack 1102' is biased to occupy a normal position with the wheel 1106' on its free end resting against the outer surface of the actuator ring member. The rack is mounted to pivot about a pivot point 1114'.

When the actuator ring member 155 is caused to move axially away from the sprocket mounting member 138, it acts against the rack 1102' and causes the rack to pivot in opposition to the rack's biasing component 1108' which preferably comprises a torsional spring, although any suitable biasing component could be employed.

The pinion 1104' carries a metal or magnetic strip 1110' which is arranged on movement of the pinion to pass a sensor 1112' such as a Hall effect sensor which measures the amount by which the pinion is rotated and which outputs an electromagnetic signal proportional to the amount of movement of the pinion. This signal therefore comprises an electromagnetic signal that is proportional to the degree of relative movement of the plate member 130 relative to the sprocket mounting member 38 and thus sprocket 112 of the sprocket assembly 110.

Associated with the motor 170 is control circuitry (not shown) which converts the signal received from the Hall effect sensor 1112' and converts it to a control signal to control an amount of current supplied to the motor in proportion to the detected amount of movement of the actuator ring member.

In the embodiments of FIGS. 16 to 19, the rack and pinion mechanism 1100, 1100' is mounted to the housing of the motor unit 170. It will be appreciated that this is a convenient location for said mechanism in these embodiments where the motor is positioned concentrically with the pedal spindle. These embodiments are advantageous in allowing the control circuitry for converting the movement displacement signal into an electrical control signal to be incorporated within the motor housing or within a suitable controller mounted to the housing of the motor. It also offers a neat and tidy solution to routing electrical signal wiring between the Hall effect sensor and the control circuitry as they are placed so close to each other on the apparatus. However, it will be appreciated that where the motor unit is positioned on another part of the bicycle, the mechanism or device for detecting movement of the actuator ring member may be mounted to the frame of the bicycle such that said mechanism or device is positioned so as to detect said movement of the ring actuator member. Suitable wiring for connecting the movement detection means to the motor control circuitry can be routed through the frame of the bicycle.

In use, a user wishing to take advantage of the motor can operate a switch or the like preferably provided on a handlebar of the bicycle to switch on the power supply to the motor, although in some embodiments no power switch is provided and the motor unit is in an always on mode, but supply of power is only effected when the user exerts sufficient force on at least the forward pedal such that it causes movement of the plate member relative to the sprocket. In this connection, it will be appreciated that the loading of the first biasing elements or means plays an important role in determining a threshold level of force to be applied to the pedals by a user to cause power to be supplied to the motor and thus assist the user in propelling the bicycle in a forward direction.

The power supply preferably comprises a rechargeable battery carried on the bicycle frame. Having switched on the power supply to the motor, the user can then control the amount of power (current) supplied by the power supply to the motor by pressing on at least the forward facing pedal to thereby cause the plate member to be rotationally displaced by a small amount relative to the sprocket. The amount of pressure applied by the user against the biasing means of the sprocket assembly determines the amount of power to be supplied over a permissible range. The novel arrangement taught by the invention removes the need for the cyclist to operate a handlebar mounted throttle control leaving the cyclist's hands free to operate other handlebar mounted controls such as brakes and gear change mechanisms. Furthermore, the use of a power supply control means associated with the pedals allows for a more intuitive control of power supply to the motor than can be achieved through hand actuated controls.

It will be understood that the loading of the first biasing elements or means may be chosen such that under normal cycling conditions such as cycling over flat terrain, normal manual pressure will not cause sufficient displacement between the plate member and the sprocket mounting member to cause axial movement of the actuator member and thus no power will be supplied to the motor unit. However, the biasing means loading may be selected such that where a user is cycling over difficult terrain such as up sloping terrain or where the user is seeking to quickly accelerate even on normal terrain, the increased pressure (compared to normal steady cycling conditions) exerted by the cyclist on the pedals will cause the actuator member to be moved and thus cause an power to be supplied to the motor unit to thereby provide an assistant propelling force to the bicycle.

In alternative embodiments, it will be appreciated that the first biasing means loading may be selected that a user, having switched on power to the motor unit through an appropriate motor power switch unit, needs only apply moderate forward pressure on the leading pedal in order to cause actuation of the actuator member and thus cause power to be supplied to the motor unit. This may be particularly useful in embodiments where the pedals are provided to enable a user to assist the motor unit in powering the bicycle in forward motion where the pedals are therefore only used occasionally. In such an arrangement, the normally not used pedals make a convenient motor torque sensor or motor power adjustment controller.

In the above arrangements, the modified sprocket assembly according to the invention acts as a type of torque sensor in that the pressure applied by a user to the pedals is dependent on the forces acting against the bicycle as it is being propelled whereby, as the resistant forces increase, a user may have to apply more pressure to the pedals making it more likely that the actuator member will be actuated. The actuation of the actuator member and its degree of actuation may be proportional to the torque required to propel the bicycle. It can therefore be envisaged that the modified sprocket assembly according to the invention could be embodied in a torque sensor apparatus or device for an electric bicycle or the like.

In any of the above arrangements of the present invention, control or adjustment of power being supplied to the motor unit is dependent on a user pressing on at least the forward pedal with the degree of pressure linked to the amount of adjustment in the motor unit power level. The invention provides a more convenient mans of controlling or adjusting the level of power being supplied to the motor and also provides a more intuitive means of making adjustments. This is partly because the user can use a back foot (when viewed in the forward direction of motion of the bicycle) as a counterbalance to the forward foot which presses on the forward pedal to cause adjustment of the motor unit power level.

FIGS. 20 to 24 depict another embodiment of the sprocket assembly and bicycle of the invention. In the following description like numerals as used in the description of FIGS. 11 to 19 preceded by the additional numerals "20" (i.e., increased by 2000) will be used to denote like parts with differences between the embodiments described for clarity. It will be understood that, unless otherwise stated, the construction and operation of this embodiment is generally the same as that described in connection with FIGS. 11 to 19 with at least the same variations in structure and configuration as already described.

Figure 20:
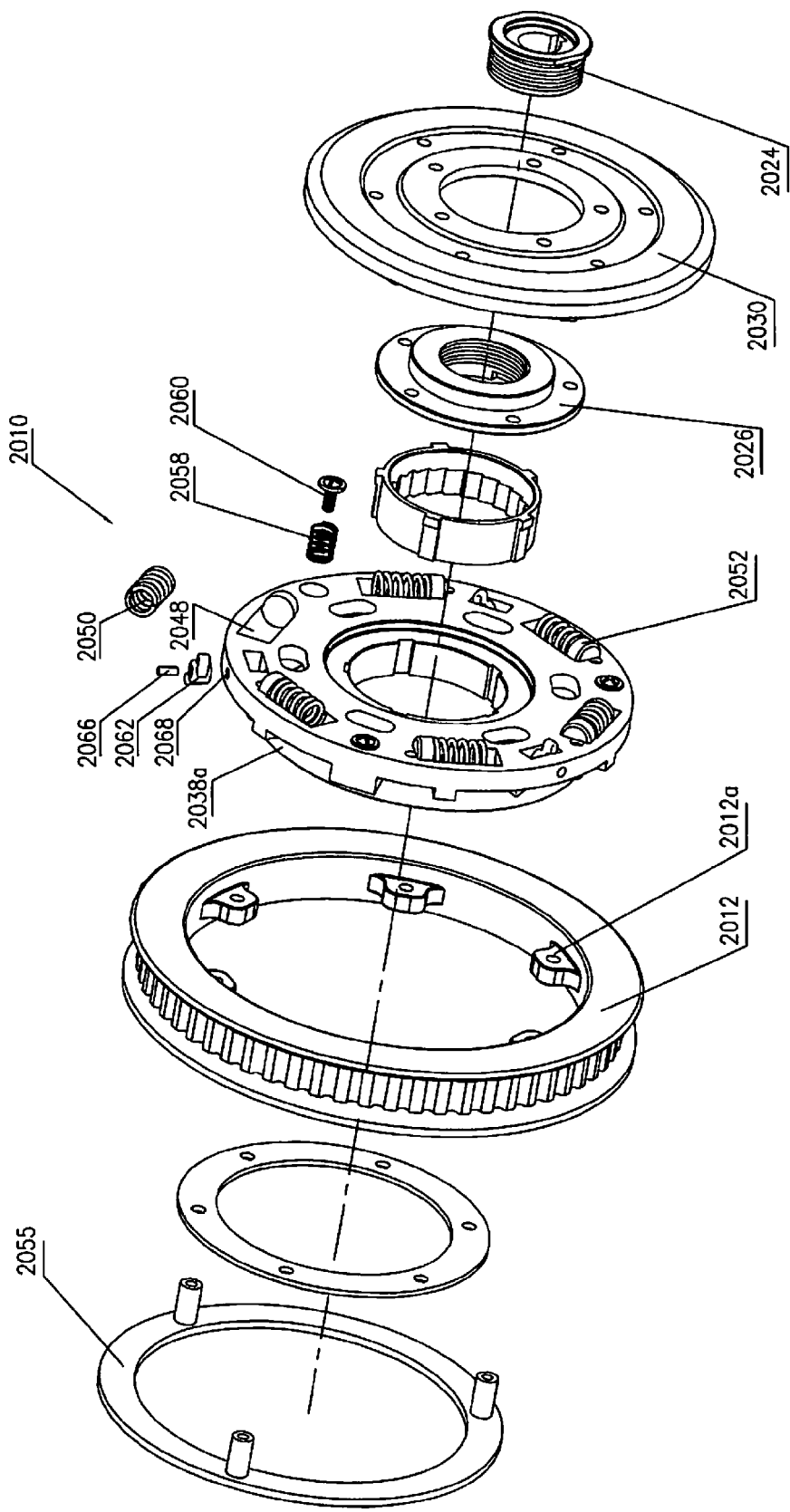
FIG. 20 is an exploded perspective view of a drive sprocket assembly in accordance with another embodiment of the invention.
Figure 21:
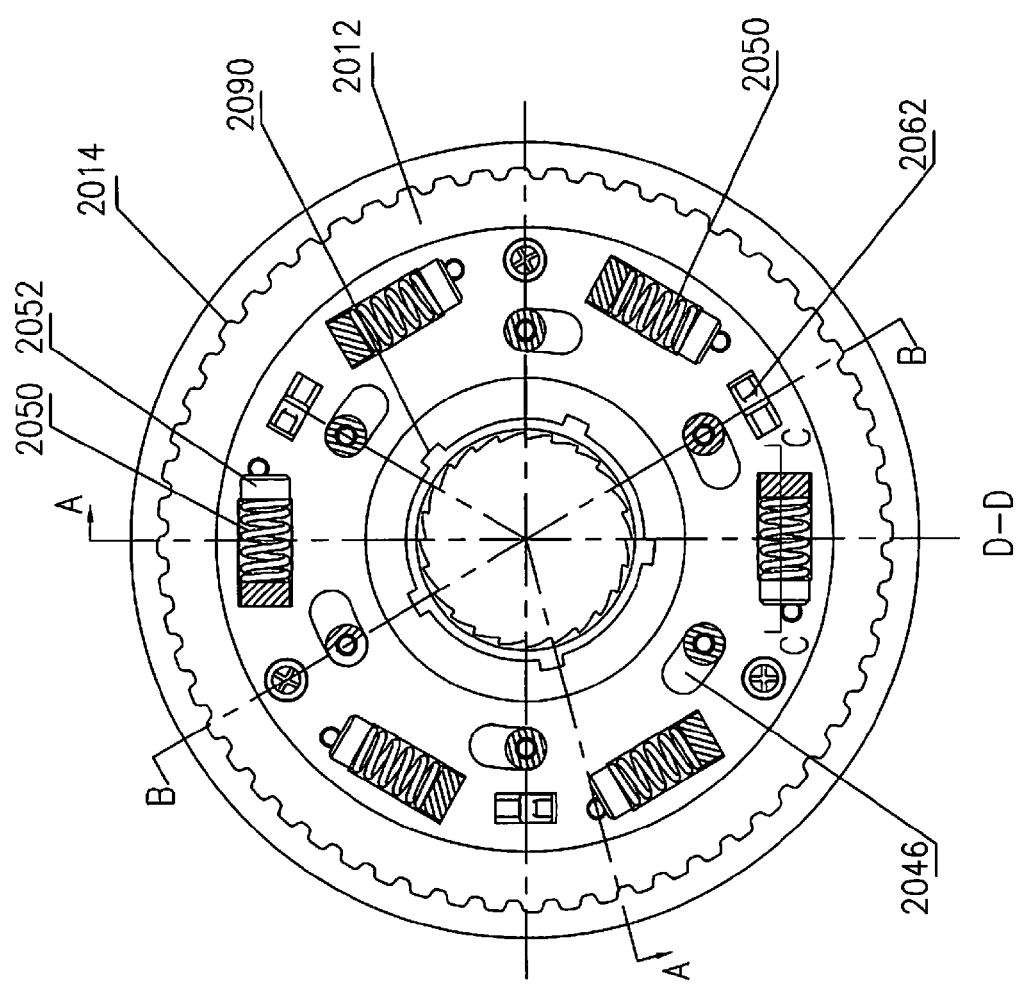
FIG. 21 is a front view of the drive sprocket assembly of FIG. 20.
Figure 22:
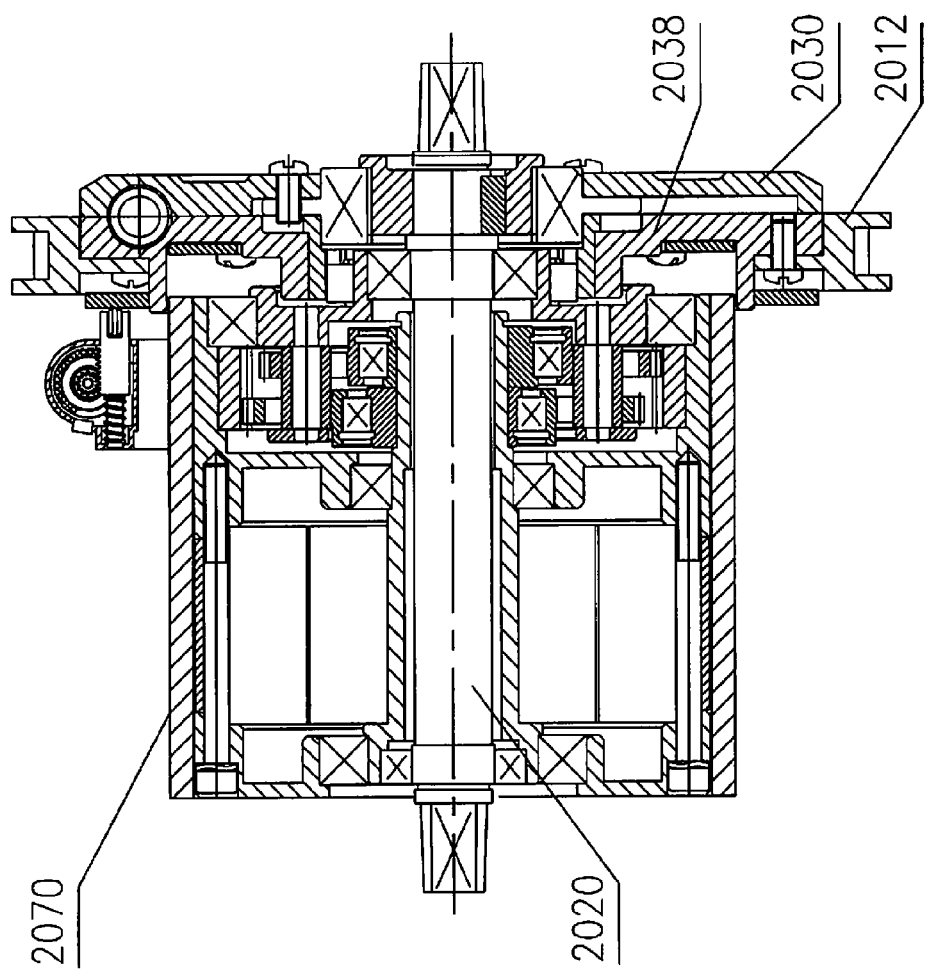
FIG. 22 is a side sectional view of the sprocket assembly of FIG. 20 combined with a motor unit including the control signal apparatus of FIG. 7.
Figure 23:
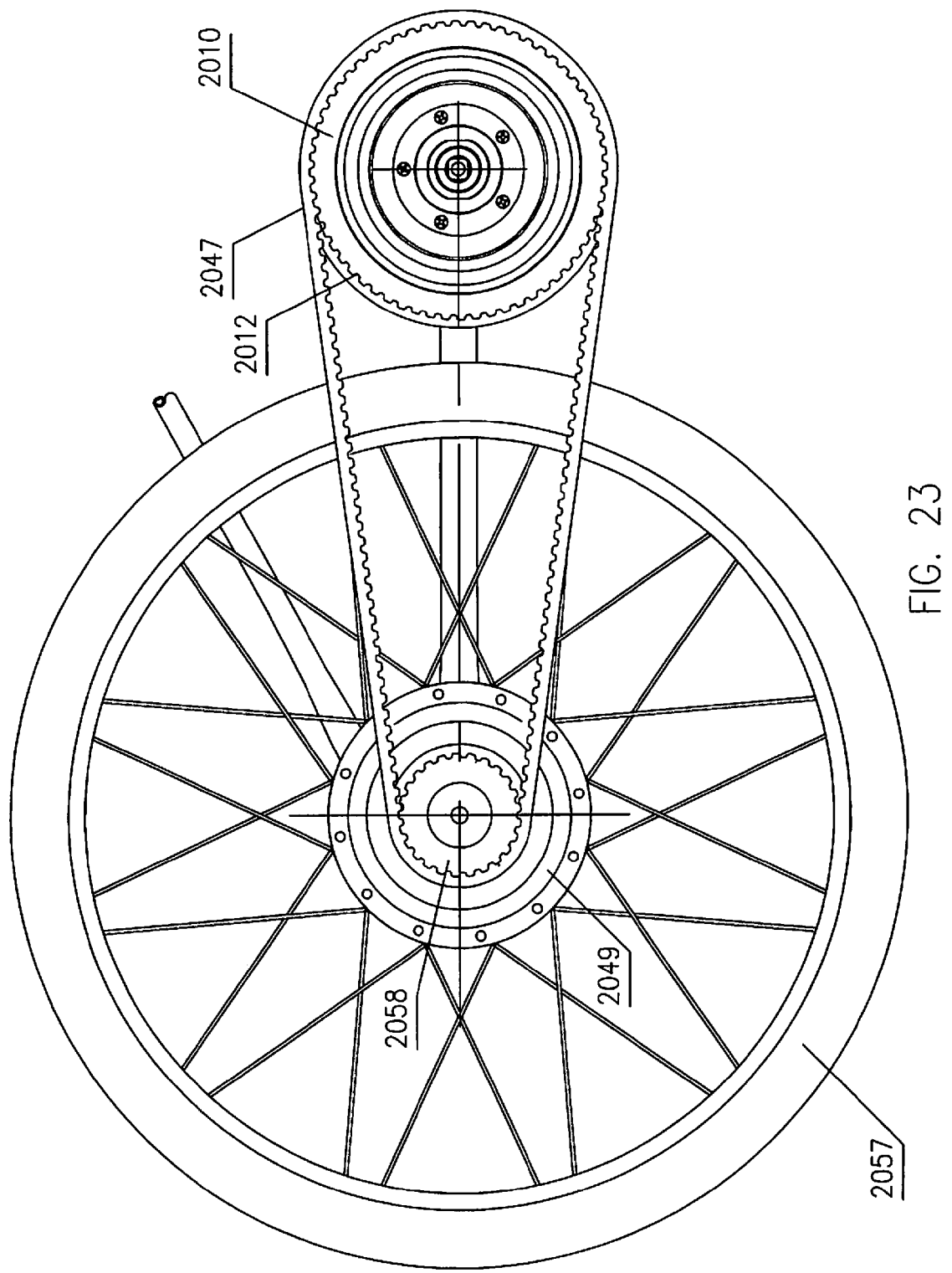
FIG. 23 is a side view of a rear portion of a bicycle according to the invention including the sprocket assembly of FIG. 20.

FIG. 20 is an exploded perspective view of a drive sprocket assembly 2010 for this embodiment of the invention with FIG. 21 and FIG. 22 being respectively a front view and a side section view of the drive sprocket assembly, although FIG. 22 also shows the sprocket assembly in combination with a motor unit 2070. FIG. 23 is a side view of a rear portion of the bicycle according to this embodiment with FIG. 24 being a top view of the rear portion of the bicycle.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

The sprocket assembly 2010 of FIG. 20 differs from that of FIG. 11 in that it does not include a toothed sprocket of the type configured to engage a chain drive as conventionally encountered in bicycles, but includes a belt drive. A belt drive pulley 2012 is mounted to the sprocket mounting member 2038 in a similar manner to the sprocket of the first embodiment (FIG. 11). The belt pulley 2012 has inwardly extending spines 2012a on its inner surface which locate within recesses 2038a provided in the rear surface of the sprocket mounting member 2038. The belt pulley 2012 is secured to the mounting member 2038 so as to be fixed for rotation therewith. The belt pulley 2012 partially fits over an outer circumferential surface of the sprocket mounting member 138 such that it covers the apertures 2068 for receiving the pins 2066 which pivotally mount the lever members 2062 to the sprocket mounting member 2038 thereby usefully securing said pins 2066 in place.

The belt pulley 2012 has rectangular shaped teeth which, in use, engage a complementary shaped toothed portion provided on an inner surface of a belt drive member 2047 (FIG. 23). The belt drive member 2047 drives a smaller belt pulley 2058 provided on a hub 2049 of a rear wheel 2057 of the partially shown bicycle as seen in FIG. 23. Otherwise, the sprocket assembly of FIGS. 20 to 24 operates to generate a control input in the manner described with respect to FIGS. 11 to 19, although the control input may be used for another purpose other than to control the motor 2070 as will be explained below.

Figure 24:
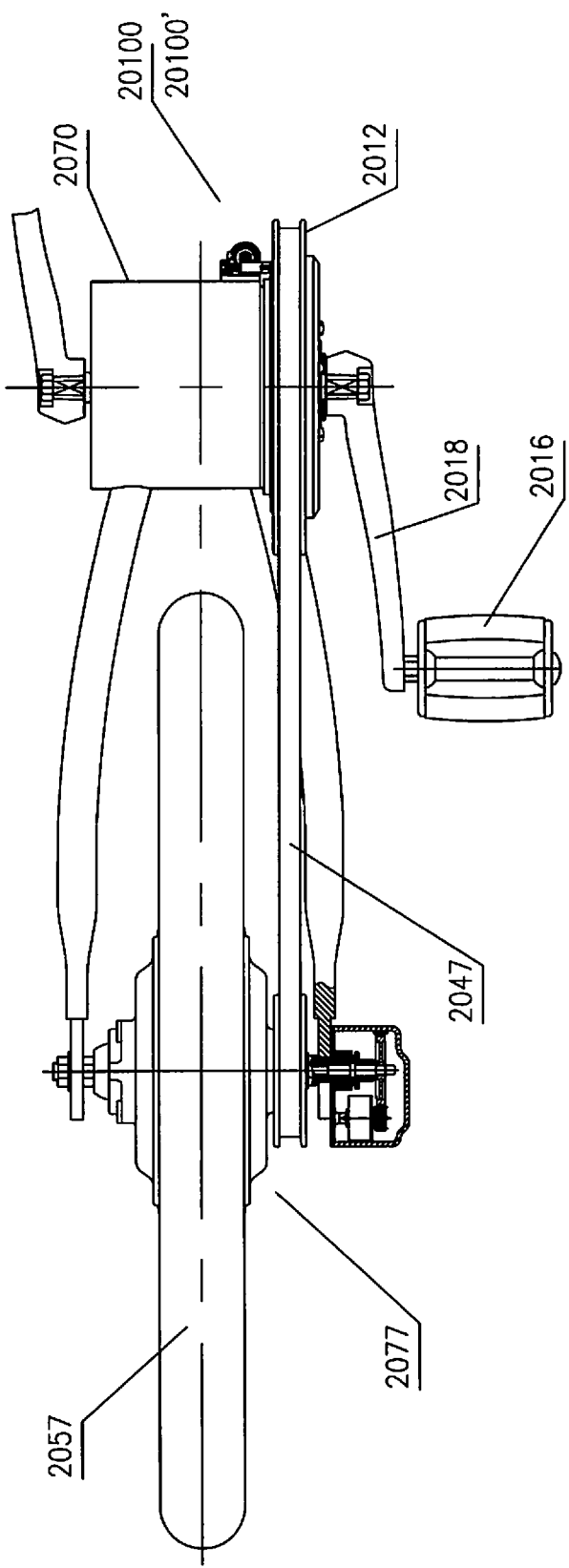
FIG. 24 is a top view of the rear portion of a bicycle of FIG. 23.

FIGS. 22 and 24 illustrate that the motor 2070 is mounted concentrically of the pedal spindle 2020, but it will be understood that this is not an essential feature of this embodiment. FIG. 22 illustrates that a rack and pinion assembly 20100, 20100' of the types depicted by FIGS. 16 to 19 is mounted to a housing of the motor 2070, although, where the motor 2070 is not arranged concentrically with the pedal spindle 2020, the rack and pinion mechanism 20100, 20100' may be mounted to the frame of the bicycle, for example. FIG. 24 illustrates that the bicycle of this embodiment is provided with a gearing ratio adjustment mechanism 2077 which will be more fully described below in connection with other embodiments of the invention.

Figure 25:
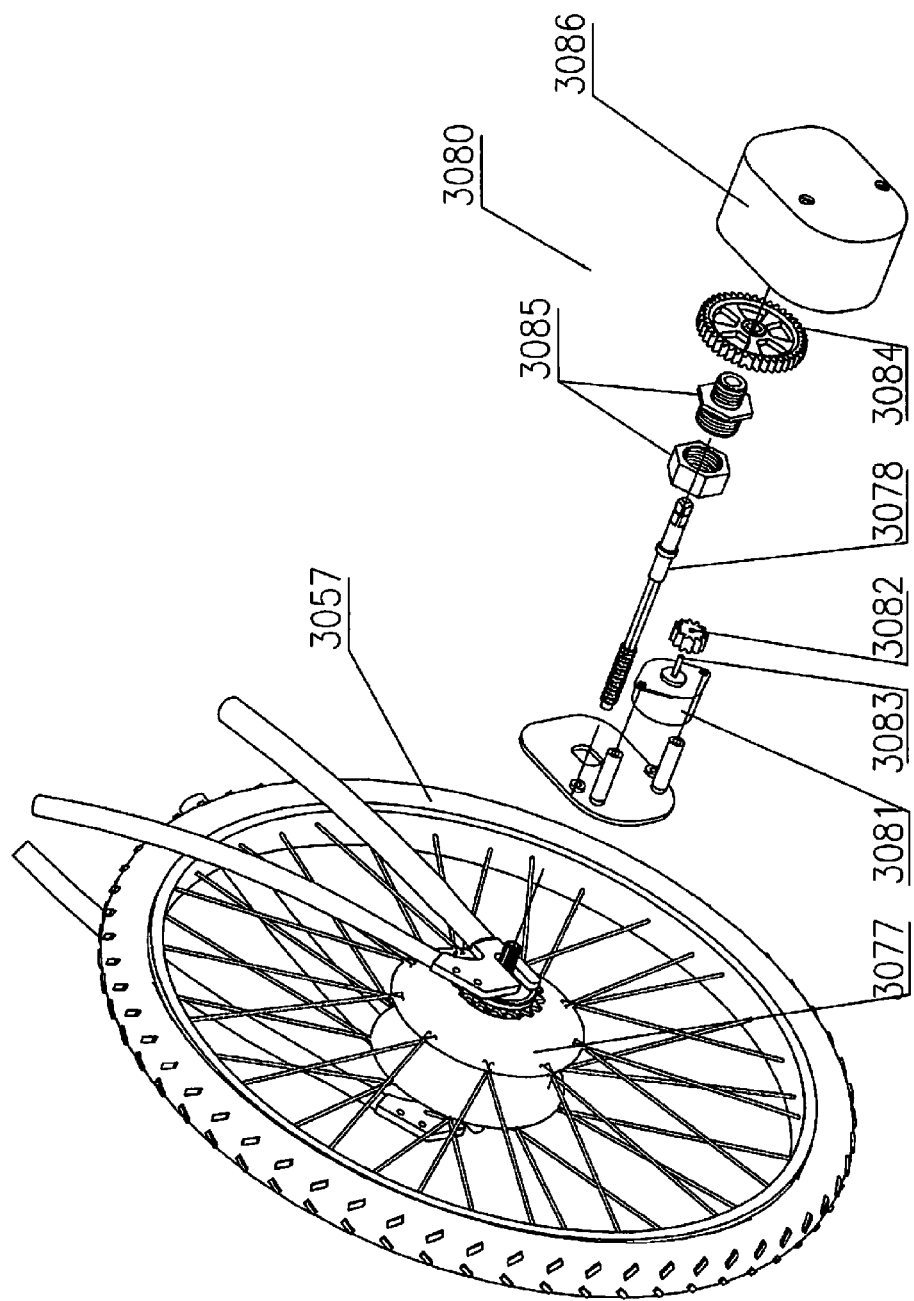
FIG. 25 is an exploded perspective view of a rear wheel assembly of a bicycle including a gear adjustment mechanism according to the invention.
Figure 26:
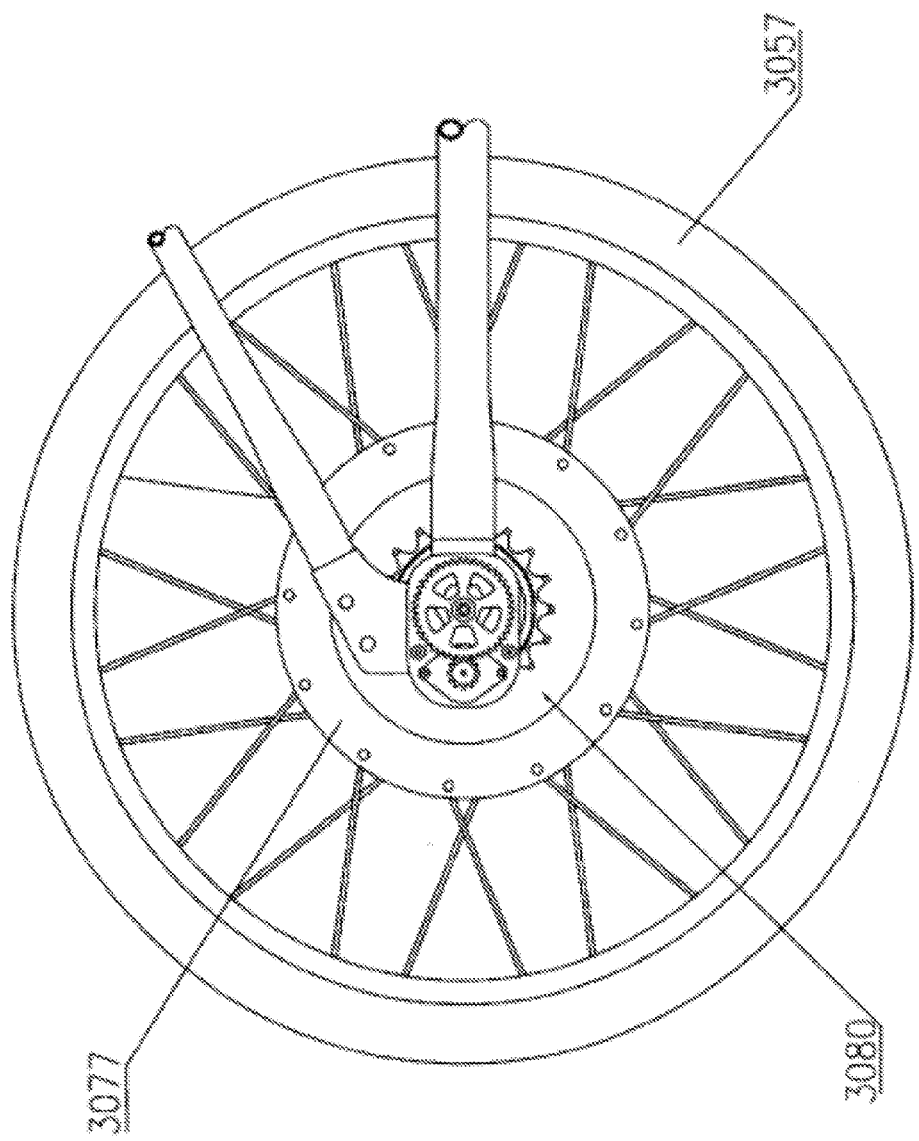
FIG. 26 is a side view of a rear portion of the bicycle of FIG. 25.
Figure 27:
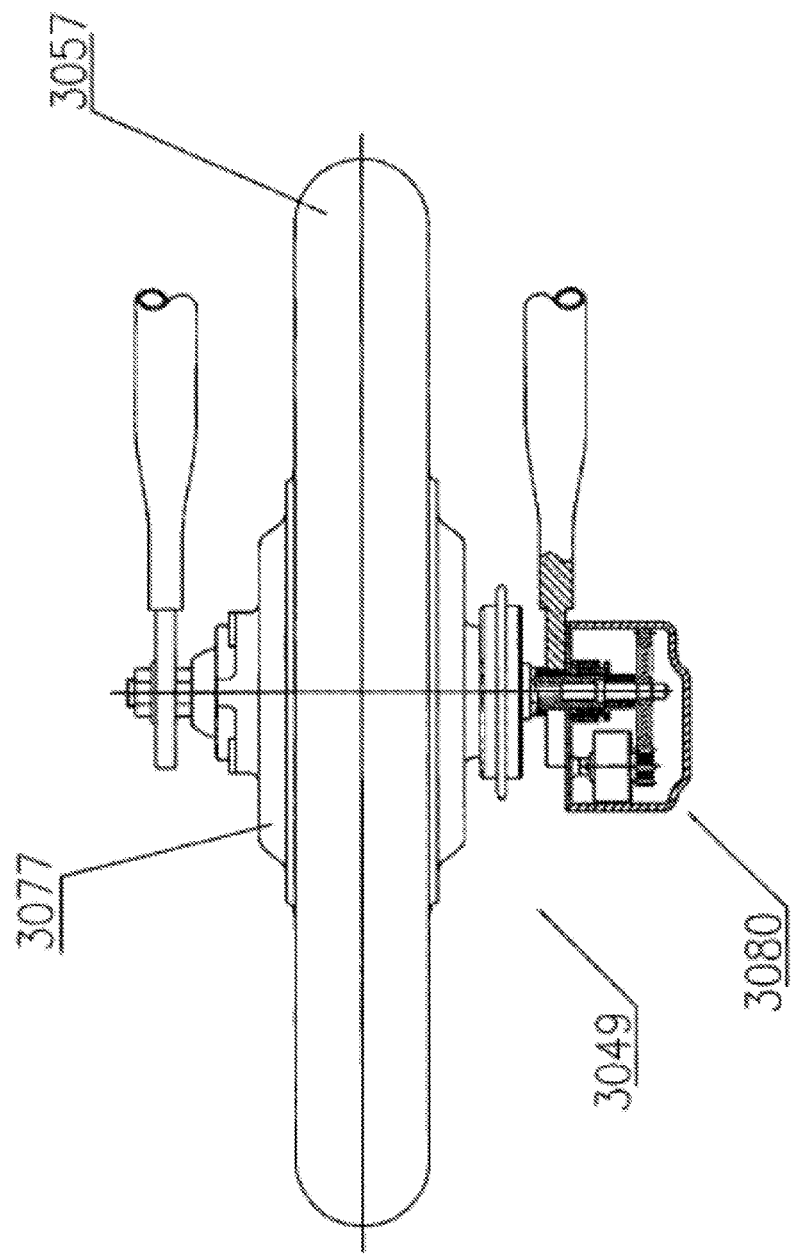
FIG. 27 is a top view of a rear portion of the bicycle of FIG. 25.

FIGS. 25 to 27 depict another embodiment of a bicycle according to the invention. In the following description like numerals as used in the description of FIGS. 11 to 19 and/or the description of FIGS. 20 to 24 preceded by an additional numeral "30" will be used to denote like parts with differences between the embodiments described for clarity.

FIG. 25 is an exploded perspective view of a rear wheel assembly of the bicycle of this embodiment of the invention including a gear adjustment mechanism 3077. FIG. 26 is a side view of said rear portion of the bicycle and FIG. 27 is a top view of said rear portion of the bicycle.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

Alternative to or in addition to a motor unit, the bicycle may include a gearing adjustment means. Said gearing adjustment means is configured to receive a control input from said converting means for causing said gearing adjustment means to effect a gearing change for the pedal driven apparatus. The gearing adjustment means may be associated with a rear wheel of the bicycle and is configured to receive the control input from the converting means to thereby effect a change in a gearing ratio applied to the rear wheel. The gearing adjustment means may comprise a continuous variable transmission (CVT) system having a continuously variable gearing ratio, said CVT system being configured to receive said input control signal and adjust the gearing ratio by an amount proportional to the movement detected by the movement detecting means. The CVT system may be configured to continuously vary the gearing ratio in response to said input control signal. Preferably, the CVT system has a servo-motor associated therewith which is configured to receive said input control signal whereby operation of the servo-motor in response to the input control signal effects a continuously variable change in the gearing ratio through movement of a control pin of the CVT system.

This embodiment may include a chain drive as per the first embodiment of FIGS. 11 to 19 or a belt drive as per the second embodiment of FIGS. 20 to 22. This embodiment may include a motor concentrically mounted with the pedal spindle or a motor mounted at another point on the bicycle to provide drive power for propelling the bicycle forwards. However, this embodiment may not include a motor to assist forward propulsion of the bicycle, but may be powered by only pedals in a conventional manner. This embodiment of a bicycle according to the invention must, however, include a sprocket assembly (not shown) of the type already described with respect to FIGS. 11 to 19 or FIGS. 20 to 24 having a means for detecting movement of a first member relative to the sprocket in a rotational direction of the sprocket and a means for converting said detected movement into a control input. The sprocket assembly having these means can therefore be according to any of the foregoing embodiments of the invention as hereinbefore described. In this embodiment, the control input indicative of an amount of movement of the first member relative to the sprocket is used in connection with the gearing adjustment mechanism 3077.

The gearing adjustment mechanism 3077 is mounted in association with a hub 3049 of the rear wheel 3057. Its function is to change a gearing ratio applied between the drive received by the hub 3049 and the rotation of the rear wheel 3057. The gearing adjustment mechanism 3077 may comprise a conventional gear shift mechanism whereby the gearing ratio is changed in discrete steps. Preferably, however, the gear adjustment mechanism 3077 comprises a continuously or constantly variable transmission (CVT). A continuously variable transmission (CVT) is a transmission which can change steplessly through an infinite number of effective gear ratios between maximum and minimum values. This contrasts with other mechanical transmissions that only allow a few different distinct gear ratios to be selected. The flexibility of a CVT allows the driving shaft to maintain a constant angular velocity over a range of output velocities.

The CVT 3077 may be of any know type of CVT transmission. However, in order to modify the CVT 3077 for use in the bicycle according to the invention, the CVT 3077 includes an adjusting mechanism 3080 which operates to adjust the position of an operating pin 3078 of the CVT 277. In use, movement of the pin 3078 inwardly towards or outwardly away from the CVT 3077 causes a change in the current gearing ratio of the CVT 3077. The operation of the pin is in a known manner. However, the modification provided in this embodiment of the invention is to modify the CVT 3077 to include the adjustment mechanism 3080 and to control the adjustment mechanism 3080 in response to the control input from the sprocket assembly.

The adjustment mechanism 3080 has components including a servo motor 3081 having a pinion gear 3082 on its output shaft 3083. In use, the servo motor pinion gear 3082 drives a large gear 3084 which, through an adjustment bolt and nut combination 3085, adjusts the position of the pin 3078 with respect to the CVT 277 thereby changing the gearing ratio of the CVT 3077. The components of the adjustment mechanism are contained in a housing 3086. Control circuitry (not shown) associated with the servo motor 3081 receives as an input a signal comprising the control input from the sprocket assembly which is indicative of an amount by which the plate member of the sprocket assembly has moved relative to the sprocket under manual pressure applied to at least a forward one of the pedals of the bicycle. Consequently, a cyclist wishing to change the gearing ratio is able to do so through application of pressure on at least the forward one of the bicycle's pedals whereby this causes relative rotational displacement between the plate member and the sprocket and whereby the rack and pinion mechanism associated with the sprocket assembly converts the detected movement into a control signal. In this embodiment, it is preferable that the control input comprises an electrical or electronic control signal that is used to control operation of the servo motor 3081 to thereby cause the adjustment mechanism 3080 to change the position of the pin 3078 inwardly or outwardly of the CVT 3077.

Figure 28:
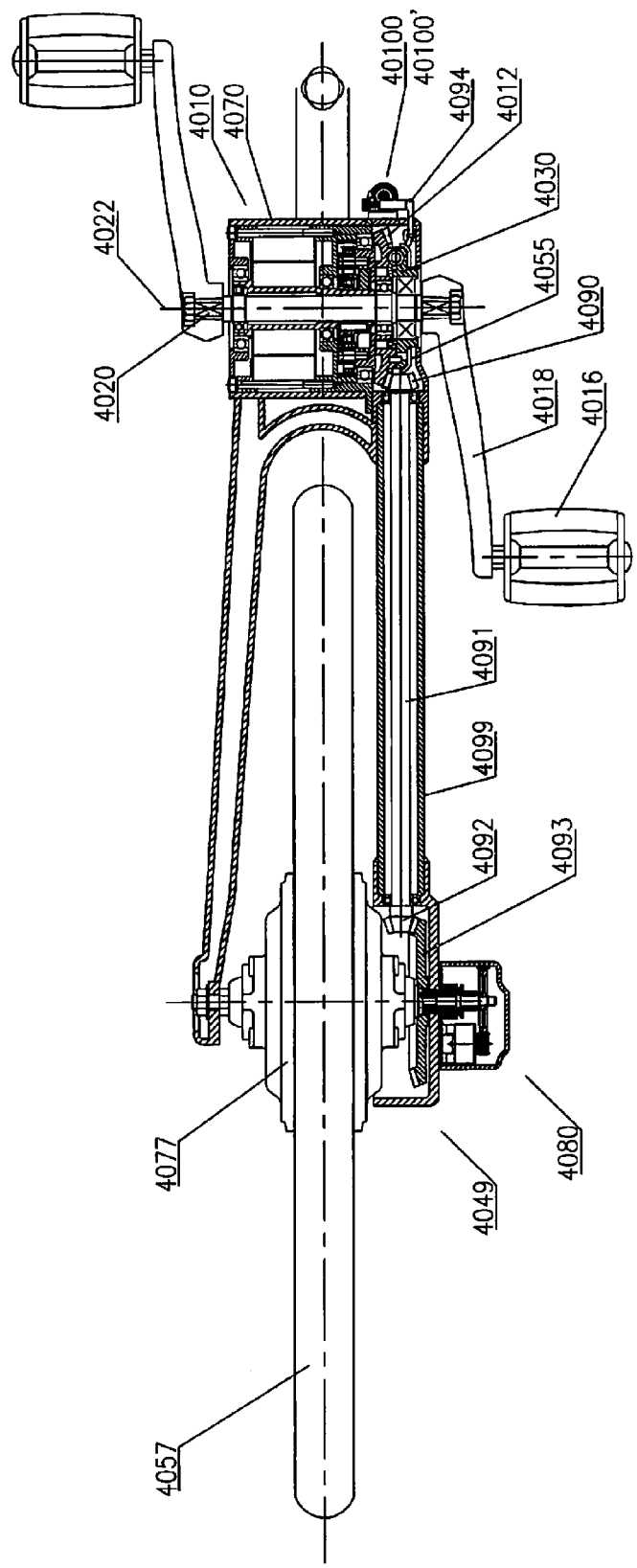
FIG. 28 is a partial sectional top view of a rear portion of a bicycle according to another aspect of the invention.

FIG. 28 depicts another embodiment of a bicycle according to the invention. In the following description like numerals as used in the description of FIGS. 11 to 19, the description of FIGS. 20 to 24 and/or the description of FIGS. 25 to 27 preceded by an additional numeral "40" will be used to denote like parts with differences between the embodiments described for clarity.

FIG. 28 is a partial sectional top view of a rear portion of a bicycle according to another aspect of the invention. This embodiment of a bicycle according to the invention may comprise a motor unit 4070 as shown concentrically mounted with the pedal spindle shaft 4020, but it will be appreciated that the motor may not be concentrically mounted with the pedal spindle shaft but instead mounted on another part of the bicycle. Furthermore, this embodiment may not include a motor and may, in common with the embodiment described with respect to FIGS. 25 to 27, use the control input provided by the sprocket assembly 4010 to control adjustment of a gearing ratio of a CVT 4077 provided in a rear hub 4049 of the rear wheel 4057 of the bicycle.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

This embodiment of a bicycle according to the invention differs from other embodiments in that the sprocket comprises a front gear wheel 4012. The front gear wheel 4012 has a beveled toothed portion around its circumference which engages a first bevel gear 4090 provided on a first end of a drive rod 4091. A complementary second bevel gear 4092 is provided on a second, opposite end of the drive rod 4091 and this second bevel gear 4092 in turn engages a rear beveled gear wheel 4093 mounted on the hub 4049 of the rear wheel 4057 of the bicycle. The drive rod is rotatably supported by bearings 4097, 4097'. The drive rod 4091 and first and second bevel gears 4090, 4093 may be accommodated in a housing 4099 which forms part of the frame of the bicycle, i.e. which forms one of two rear facing struts to which the rear wheel 4057 is rotatably mounted. In use, drive applied to the front gear wheel 4012 of the sprocket assembly 4010 is conveyed via the first and second bevel gears 4090, 4092, the drive rod 4091 and the rear gear wheel 4093 to a CVT 4077 provided in the hub 4049 of the rear wheel. In this manner, the bicycle according to this embodiment of the invention does not use a chain or belt drive, but uses a gear and drive rod combination for transferring drive from the front gear wheel sprocket 4012 to the rear wheel 4057 of the bicycle.

In addition to the above described difference, another difference between this embodiment and other embodiments of the invention is that the means for detecting movement of a first plate member 4030 of the sprocket assembly 4010 relative to the gear wheel sprocket 4012 includes an actuator ring member 4055 mounted adjacent a front face of the plate member 4030. The actuator ring member 4055 has a chamfered edge portion which engages a lever member 4094 to transfer axial movement of the actuator ring member 4055 away from the plate member 4030 to a rack and pinion mechanism 40100, 40100' of the type illustrated in FIGS. 16 to 19. In this embodiment as in other embodiments, the plate member 4030 is configured to have a limited amount of rotational displacement relative to the gear wheel sprocket 4012 under certain conditions when manual pressure is applied by a cyclist to at least a forward one of the pedals 4016. Generally speaking, the sprocket assembly 4010 of this embodiment works in largely the same manner as the sprocket assembly of FIGS. 11 to 19 save for the differences in structure described above. Furthermore, the CVT 4077 of this embodiment works in largely the same manner as the CVT 3077 described with respect to FIGS. 25 to 27.

FIGS. 29 to 35 depict another embodiment of a bicycle according to the invention. In the following description like numerals as used in the description of FIGS. 11 to 19, the description of FIGS. 20 to 24, the description of FIGS. 25 to 27 and/or the description of FIG. 28 preceded by an additional numeral "50" will be used to denote like parts with differences between the embodiments described for clarity.

Figure 29:
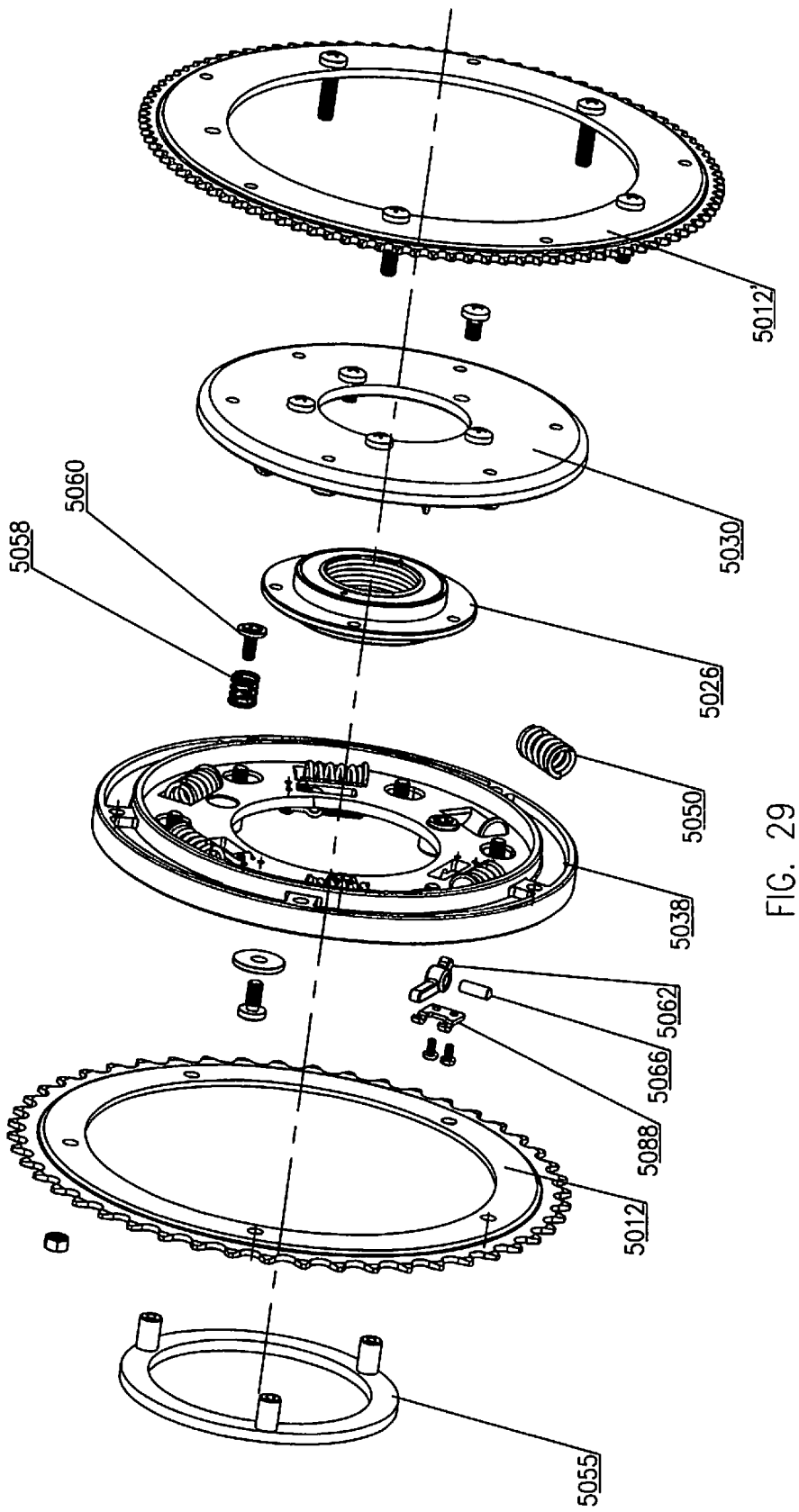
FIG. 29 is an exploded perspective view of a drive sprocket assembly in accordance with another embodiment of the invention.
Figure 30:
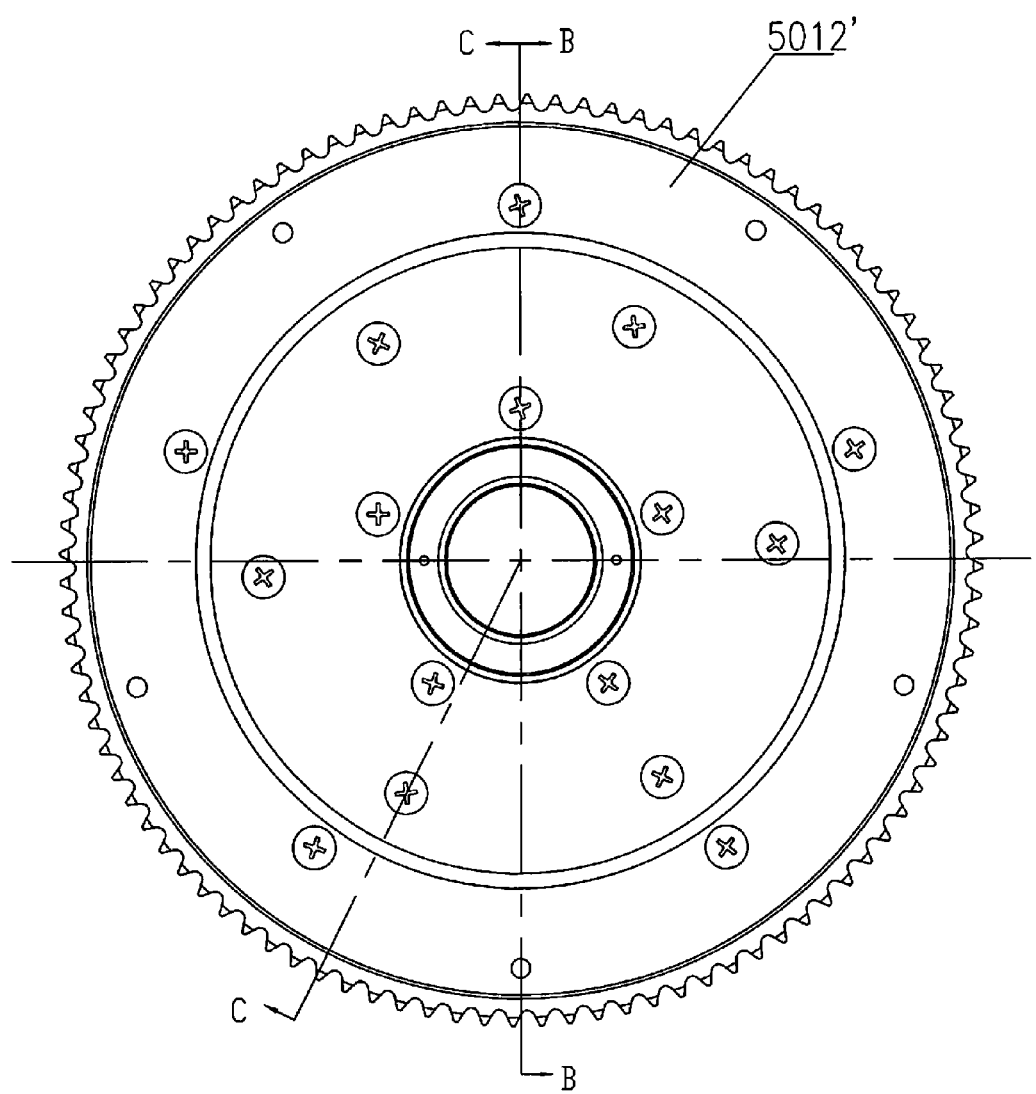
FIG. 30 is a front view of the sprocket assembly of FIG. 29.
Figure 31:
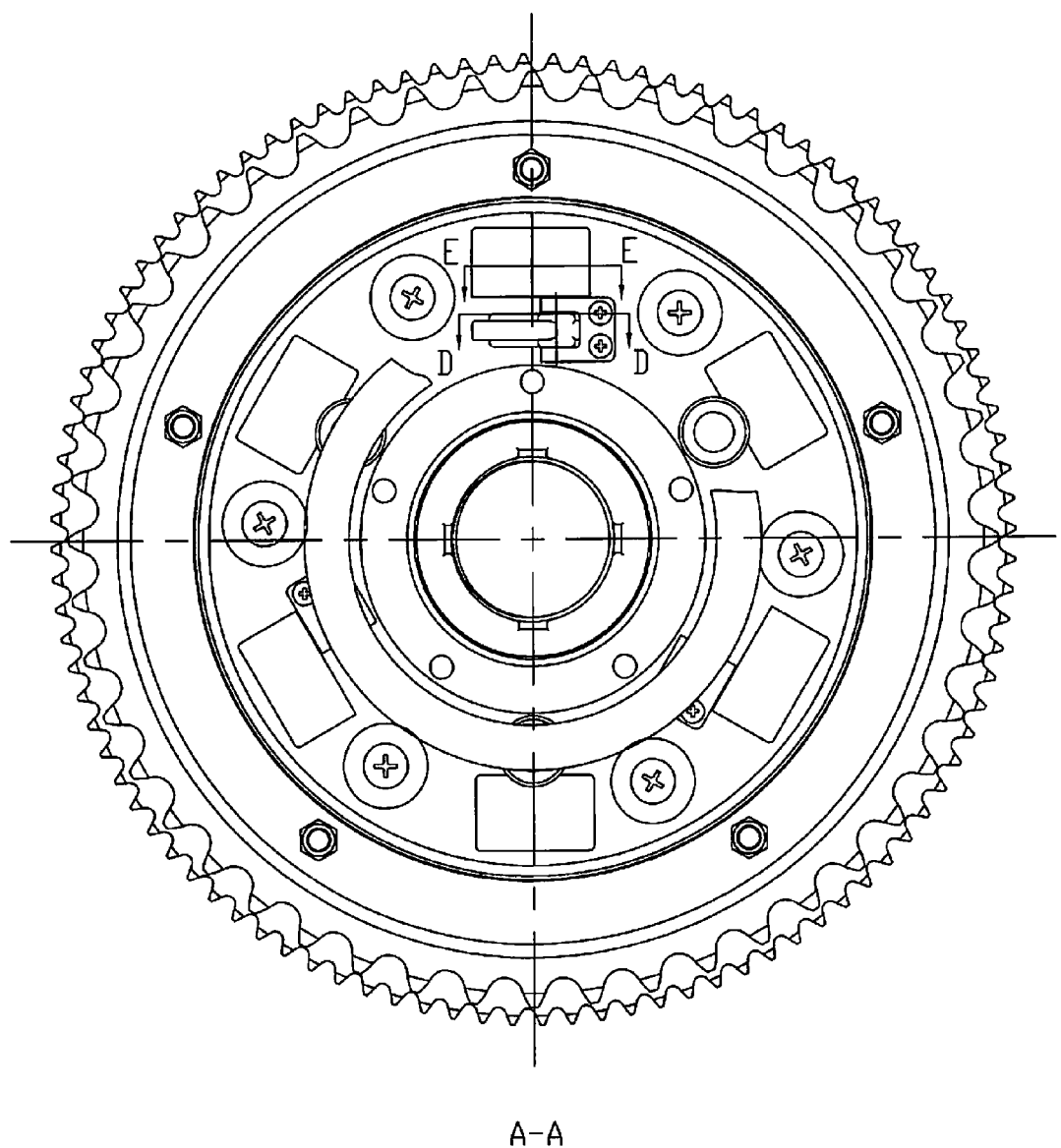
FIG. 31 is a rear view of the sprocket assembly of FIG. 29.
Figure 32:
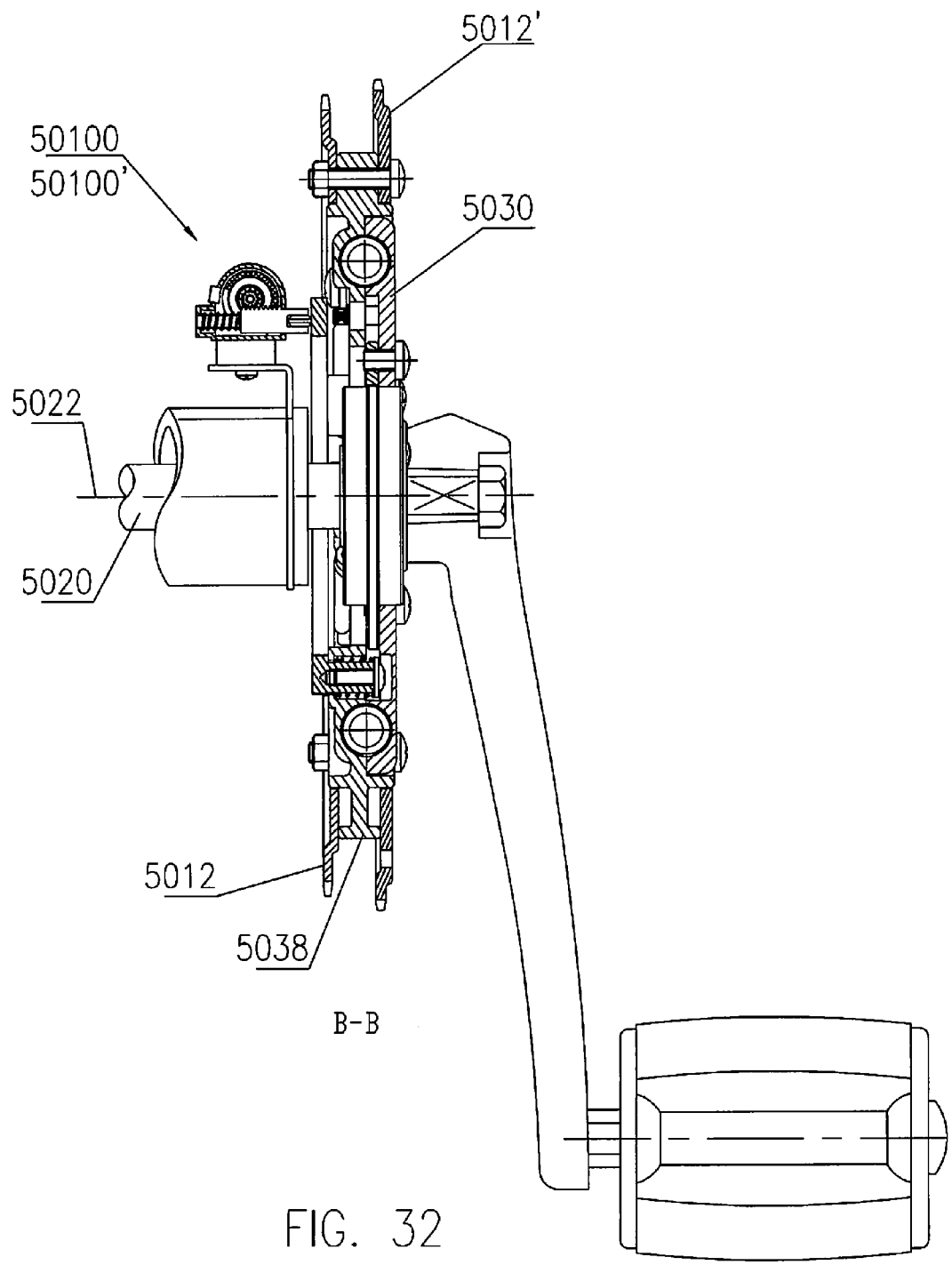
FIG. 32 is a side sectional view along line B-B of FIG. 29.
Figure 33:
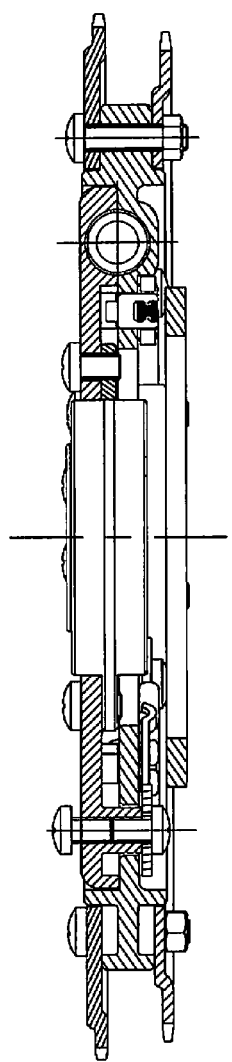
FIG. 33 is a side sectional view along line C-C of FIG. 29.
Figure 34:
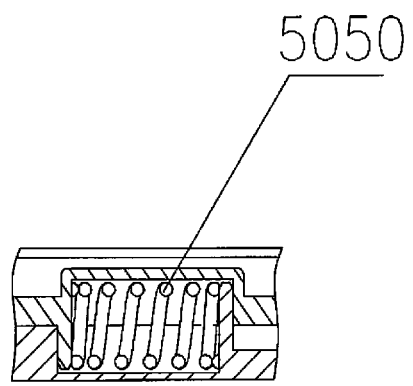
FIG. 34 is an enlarged side sectional view along line E-E of FIG. 31.
Figure 35:
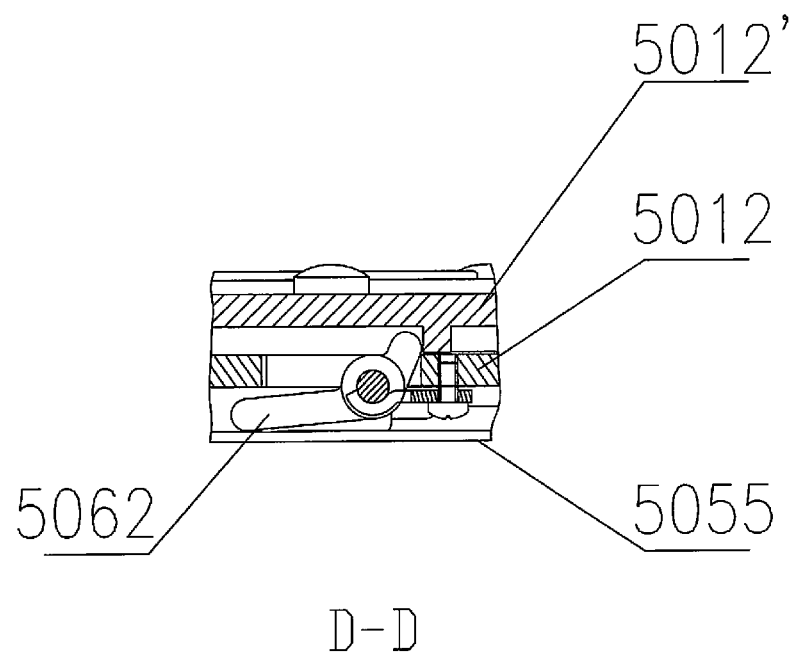
FIG. 35 is an enlarged side sectional view along line D-D of FIG. 31.

FIG. 29 is an exploded perspective view of a drive sprocket assembly in accordance with another embodiment of the invention. FIG. 30 is a front view of the sprocket assembly of FIG. 29 whereas FIG. 31 is a side sectional view along line B-B of FIG. 29 and FIG. 32 is a side sectional view along line C-C of FIG. 29. FIG. 33 is a rear view of the sprocket assembly of FIG. 29 whereas FIG. 34 is a side sectional view along line D-D of FIG. 33 and FIG. 35 is a side sectional view along line E-E of FIG. 33.

It will be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

The sprocket assembly 5010 of this embodiment comprises first and second sprockets 5012, 5012'. The first sprocket 5012 is fixed to the sprocket mounting member 5038 and, in use, drives a chain drive for transferring drive from the first sprocket 5012 to the rear wheel of the bicycle. The first sprocket 5012 of this embodiment does not includes inwardly depending spines in contrast to the sprocket of the embodiment of FIGS. 11 to 19 and the sprocket mounting member 5038 of this embodiment does not have a recessed rear surface. However, the sprocket 5012 is fixed to the sprocket mounting member 5038 to rotate therewith in like manner to the sprocket and sprocket mounting member of the embodiment of FIGS. 11 to 19 and thus functions in largely the same manner.

The second drive sprocket 5012' is also affixed to the sprocket mounting member 5038 for rotation therewith but on an opposite side to that of the first sprocket 5012 as can best be seen in FIGS. 31 and 33. The second sprocket 5012' is arranged to receive drive from a second chain drive (not shown). The second chain drive is driven by the motor unit (not shown) which in this embodiment is not mounted concentrically with the pedal spindle shaft but is mounted to another part of the frame of the bicycle. Consequently, this embodiment has two chain drives: a second chain drive for transferring drive from the motor unit to the second sprocket 5012'; and a first chain drive for transferring drive from the first sprocket 5012 to the rear wheel of the bicycle, where said drive is provided by a user manually operating the pedals and/or the motor unit through the second chain drive.

The sprocket assembly 5010 includes an actuator ring member 5055 of the type described with respect to the embodiment of FIGS. 11 to 19.

In this embodiment as in other embodiments, the first plate member 5030 is configured to have a limited amount of rotational displacement relative to the first sprocket 5012 sprocket mounting member 5038 and means 5062 for detecting this movement and means 50100, 50100' for converting the detected movement into a control input are provided in a like manner to other embodiments as can be seen in FIGS. 29 to 35. The levers 5062 of the movement detecting means are mounted to the sprocket mounting member 5038 using brackets 5088

Figure 36:
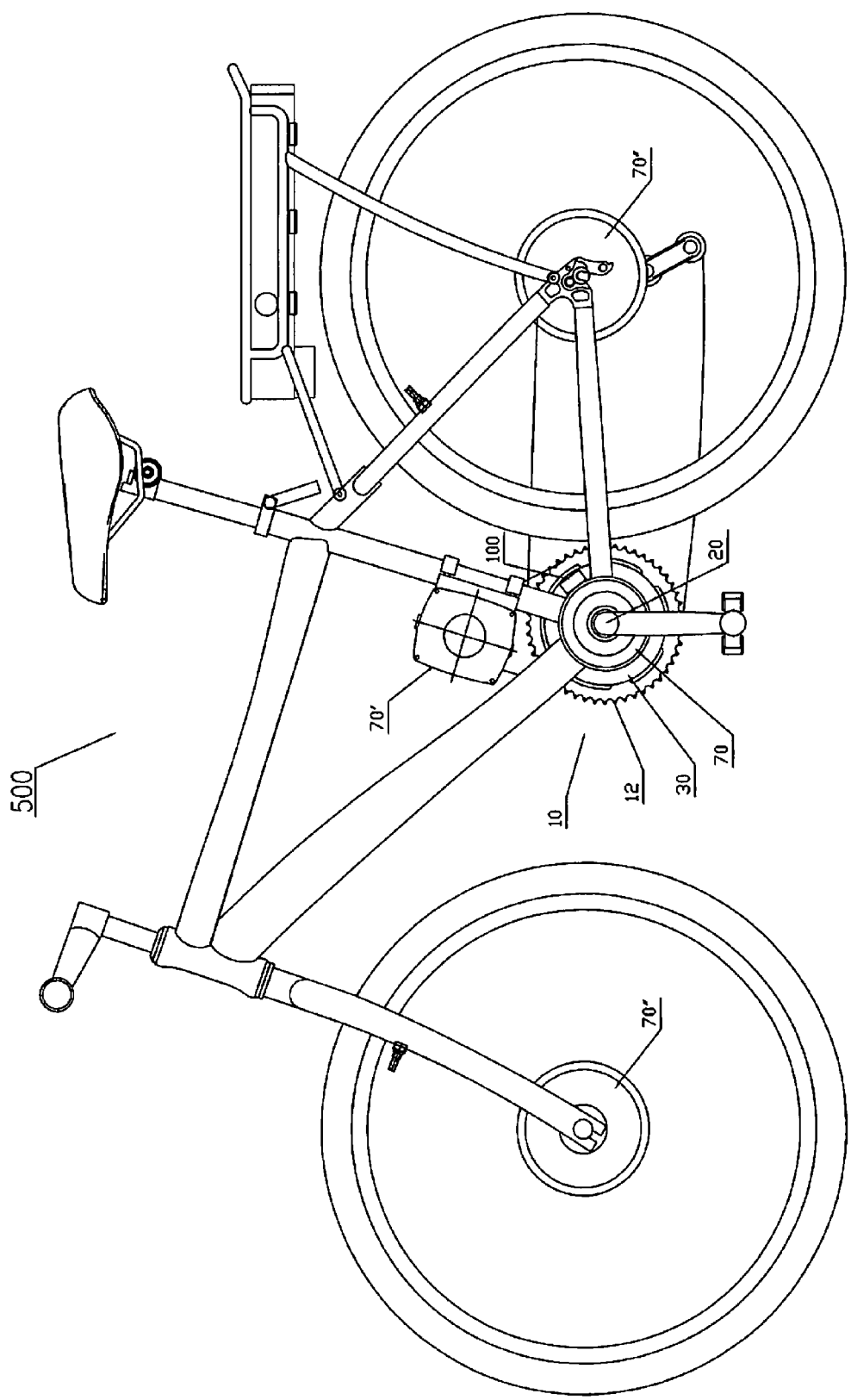
FIG. 36 is a schematic view of a pedal driven apparatus having a sprocket assembly, a control signal apparatus and a gear adjustment mechanism according to any of the embodiments of the invention.

FIG. 36 depicts a bicycle 500 having a sprocket assembly 10 with an associated means 100, 100' for detecting relative displacement of the plate member 30 with respect to the sprocket 12 according to any embodiments of the invention and a motor 70 with an associated power supply for assisting a cyclist in powering the bicycle in forward motion. By way of dotted lines in FIG. 12, some of a number of possible locations for the motor are illustrated. For example, the motor 70 may be mounted to engage one of the tyres or rims on the front or back wheel. Alternatively, the motor may be mounted such that it couples to a drive sprocket or axle of the rear wheel or an axle of the front wheel. Or, alternatively, it may be mounted in the novel manners disclosed herein in connection with some of the preferred embodiments whereby the motor rotor is mounted concentrically with the pedal spindle 20 or is remotely located from the pedal spindle and connected by a second chain drive or belt to a second sprocket.

FIGS. 37 to 40 depict another embodiment of the sprocket assembly according to the invention. In the following description like numerals as used in the description of FIGS. 11 to 19, the description of FIGS. 20 to 24, the description of FIGS. 25 to 27, the description of FIG. 28, the description of FIGS. 29 to 35 and/or the description of FIG. 36 preceded by an additional numeral "70" will be used to denote like parts with differences between the embodiments described for clarity.

This embodiment relates in general to a contactless means for converting a movement of a ring actuator member or push plate into a control signal for a component of the pedal driven apparatus such as a motor or a gear change mechanism. It will therefore be understood by one skilled in the art from the following description of this embodiment that the novel features of this embodiment are not limited to only this embodiment, but are applicable to other embodiments described herein. Furthermore, the novel features of other embodiments are applicable to this embodiment of the invention.

Figure 37:
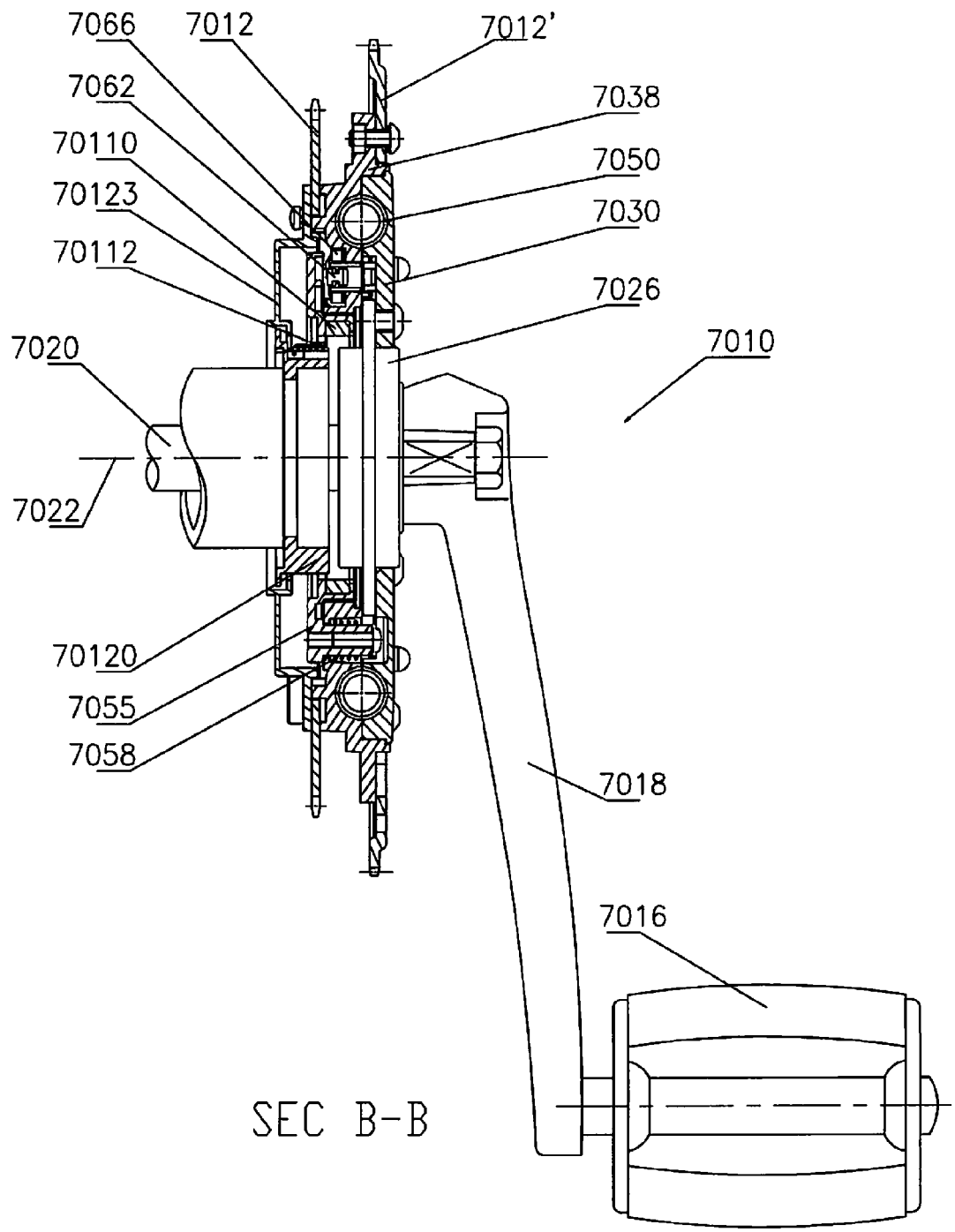
FIG. 37 is a side sectional view of a drive sprocket assembly in accordance with another embodiment of the invention along line B-B of FIG. 38.
Figure 38:
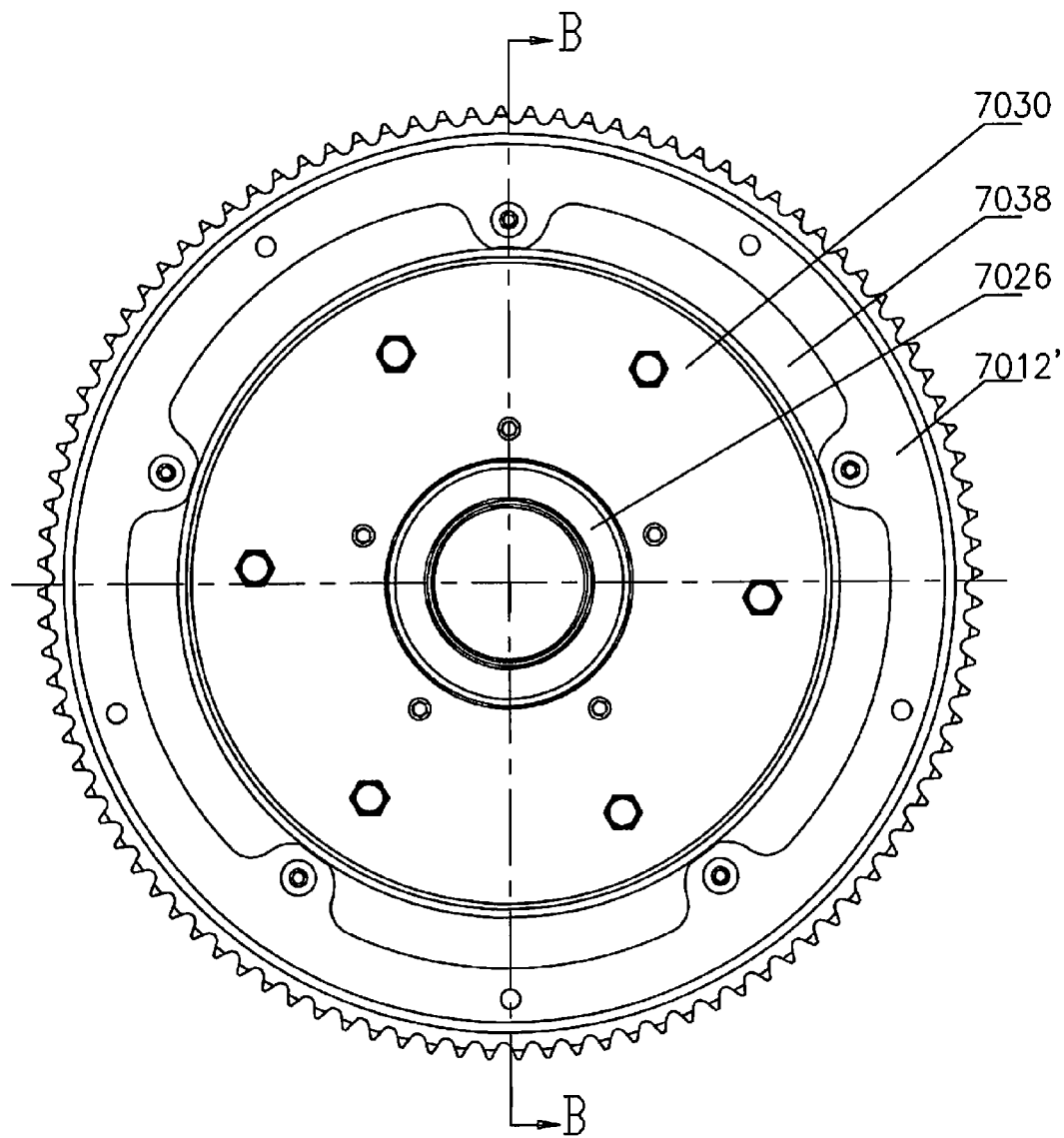
FIG. 38 is a front view of the sprocket assembly of FIG. 37.
Figure 39:
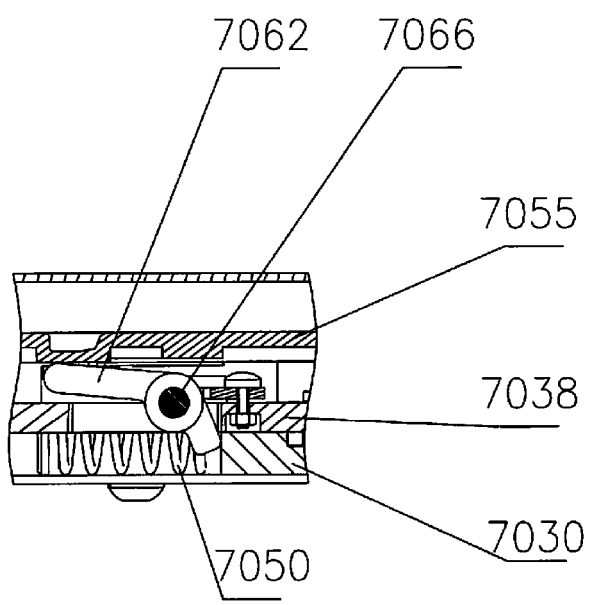
FIG. 39 is an enlarged partial sectional view of the plate member and sprocket mounting member of the sprocket assembly of FIGS. 37 and 38.
Figure 40:
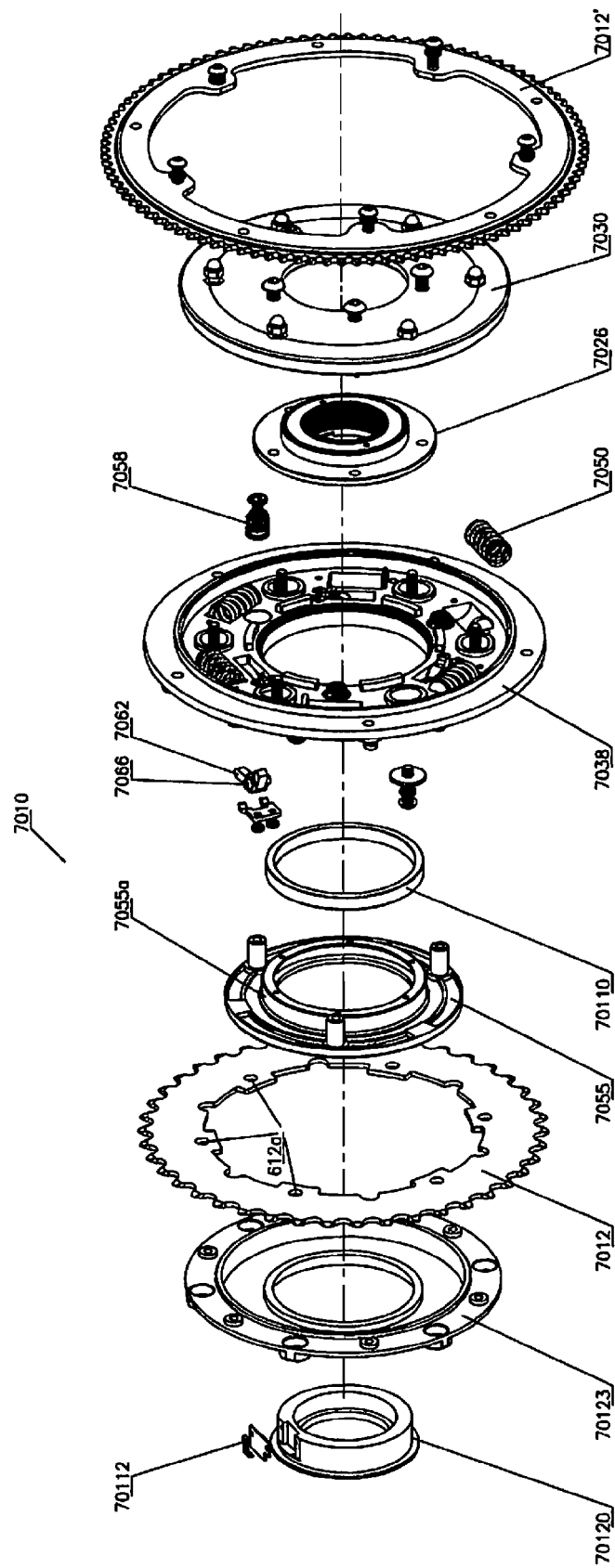
FIG. 40 is an exploded perspective view of the drive sprocket assembly of FIGS. 37 to 39.

FIG. 37 is a side sectional view of a drive sprocket assembly in accordance with another embodiment of the invention along line B-B of FIG. 38. FIG. 38 is a front view of the sprocket assembly of FIG. 37. FIG. 39 is an enlarged partial sectional view of the plate member and sprocket mounting member of the sprocket assembly of FIGS. 37 and 38. FIG. 40 is an exploded perspective view of the drive sprocket assembly of FIGS. 37 to 39.

The sprocket assembly 7010 of this embodiment comprises first and second sprockets 7012, 7012'. The first sprocket 7012 is fixed to the sprocket mounting member 7038 and, in use, drives a chain drive (not shown) for transferring drive from the first sprocket 7012 to, for example, a rear wheel of a bicycle in one arrangement, although it will be understood that the pedal driven apparatus may comprise other apparatuses other than bicycles. The first sprocket 7012 of this embodiment includes inwardly depending spines 7012a in common with the sprocket of the embodiment of FIGS. 11 to 19, although the inwardly depending splines 7012a do not extend as far inwardly as in the sprocket of the embodiment of FIGS. 11 to 19. The sprocket 7012 is fixed to the sprocket mounting member 7038 to rotate therewith in like manner to the sprocket and sprocket mounting member of the embodiment of FIGS. 11 to 19 and other embodiments and thus functions in a similar manner.

The second drive sprocket 7012' is also affixed to the sprocket mounting member 7038 for rotation therewith but on an opposite side to that of the first sprocket 7012 as can best be seen in FIG. 37. The second sprocket 7012' is arranged to receive drive from a second chain drive (not shown). The second chain drive is driven by a motor unit (not shown) which in this embodiment, in contrast to some of the other embodiments, is not mounted concentrically with the pedal spindle shaft but is mounted to another part of the frame of the bicycle. Consequently, this embodiment has two chain drives: a second chain drive for transferring drive from the motor unit to the second sprocket 7012'; and a first chain drive for transferring drive from the first sprocket 7012 to the rear wheel of the bicycle, where said drive is provided by a user manually operating the pedals and/or the motor unit through the second chain drive.

The sprocket assembly 7010 includes an actuator ring member or push plate 7055 of a type similar, but not exactly the same, to that described with respect to the embodiment of FIGS. 11 to 19. One exception in this embodiment is that the actuator ring member 7055 is configured to act in a contactless manner with respect to the means for converting a detected movement of the first plate member 7030 into a control input as will be described in more detail below.

In this embodiment as in other embodiments, the first plate member 7030 is configured to have a limited amount of rotational displacement relative to the first sprocket 7012 sprocket mounting member 7038 and means 7062 for detecting this movement and means 70110, 70120, 70112 for converting the detected movement into a control input are provided. The levers 7062 of the movement detecting means are mounted to the sprocket mounting member 7038 using brackets 7088 and pivot pins 7066.

As in other embodiments, when a user applies manual pressure to at least a forward one of the pedals, the first plate member 7030 is caused to be displaced rotationally with respect to the sprocket 7012 sprocket mounting member 7038 by an amount controlled by the biasing elements 7050. This rotational displacement causes the levers 7062 to be pivoted from their normal positions such that, as best seen in FIG. 39, distal ends of the levers 7062 engage the actuator ring member or push plate 7055 and cause it to move axially away from the sprocket 7012 sprocket mounting member 7038. The means 70110, 70120, 70112 for converting said detected axial movement of the push plate 7055 comprise a contactless means, namely the push plate 7055 does not physically contact said means 70110, 70120, 70112 in contrast to other embodiments of the invention where the actuator ring member/push plate does physically engage part of the converting means. In this embodiment, the means 70110, 70120, 70112 comprises a magnetized element 70110 carried on the push plate 7055 and a sensor 70112 such as a Hall effect sensor mounted on a collar 70120 whereby movement of the actuator member 7055 in said axial direction causes movement of the magnetized element 70110 relative to the sensor 70112. The sensor 70112 is mounted by means of a plate in a recess formed on a peripheral surface of the collar 70120. There could be more than one sensor, although only one sensor is illustrated in the figures depicting this embodiment. The collar 70120 is secured behind the sprocket assembly at a fixed axial position relative to the spindle 7020. The magnetized element may be carried on a collar portion 7055a of said actuator ring member 7055. The magnetized element 70110 may be arranged on the push plate 7055 such that, when the push plate moves axially away from the sprocket mounting member 7038, the magnetized or magnetic element moves towards the sensor 70112. The magnetized element 70110 may comprise a ring shaped magnetic element or it may comprise a plurality of separate, but spaced apart magnetic elements carried on the push plate 7055. Movement of the magnetic element 70110 relative to the sensor causes a variation in the magnetic field of the sensor which can be converted to a control input signal for another component such as the motor or gear change device of the pedal driven apparatus.

A further difference of this embodiment to other embodiments described herein is the provision of a protective cover 70123 behind the sprocket mounting plate 7038 which functions to prevent the ingress of water, dirt an/or other contaminants into the sprocket assembly 7010 and, more particularly, to the side of the sprocket assembly containing the push plate 7055, movement detection means 7062 and the means 70110, 70120, 70112 for converting a detected signal into a control input for another component of the pedal driven apparatus.

This embodiment has a number of advantages resulting from having a non-contact means for converting a movement of a ring actuator member or push plate into a control signal for a component of the pedal driven apparatus. One advantage is that the number of parts for implementing the converting means can be reduced. A further advantage is a reduction in wear through the avoidance of any contact between the push plate and any part of the converting means. A yet further advantage is that the non-contacting converting means can be made more sensitive than other embodiments where a physical engagement is required between the push plate and a part of the converting means.

In this and other embodiments, the plurality of biasing elements 7050 which bias the sprocket mounting member 7038 in its first position with respect to the first plate member 7030 when no manual pressure is being applied to at least a forward one of the pedals 7018 of the pedal driven apparatus, may be arranged such that at least one of said biasing elements 7050 is configured to be engaged prior to others of said biasing elements when manual pressure is applied to a forward one of said pedals 7018. Consequently, said at least one of said biasing elements 7050 controls movement of the first plate member 7030 with respect to the sprocket mounting member 7038 for a first portion of possible travel of said first plate member 7030 with respect to the sprocket mounting member 7038. The plurality of biasing elements 7050 may comprise a first set of biasing elements and a second set of biasing elements wherein said first set of biasing elements are configured to be engaged prior to the second set of biasing elements when manual pressure is applied to a forward one of said pedals. The first set of biasing elements thereby control movement of the first plate member 7030 with respect to the sprocket mounting member 7038 for a first portion of possible travel of the first plate member 7030 with respect to the sprocket mounting member 7038. The biasing elements, i.e. springs 7050, of the first set may be longer and softer springs that those comprising said second set of biasing elements. An advantage of this arrangement is that the sprocket assembly is more responsive to a user applying manual pressure to the pedals 7018 for an initial part of the possible rotational adjustment of the first plate member 7030 with respect to the sprocket mounting member 7038 than for a subsequent part of the possible rotational adjustment of the first plate member 7030 with respect to the sprocket mounting member 7038. Furthermore, the biasing element 7050 could be arranged into three or more sets of biasing elements, each set being shorter and harder (higher spring modulus) than the preceding set whereby the responsiveness of the sprocket assembly to user pressure on the pedals becomes progressively less sensitive as the manual pressure applied by a user increases.

Figure 41:
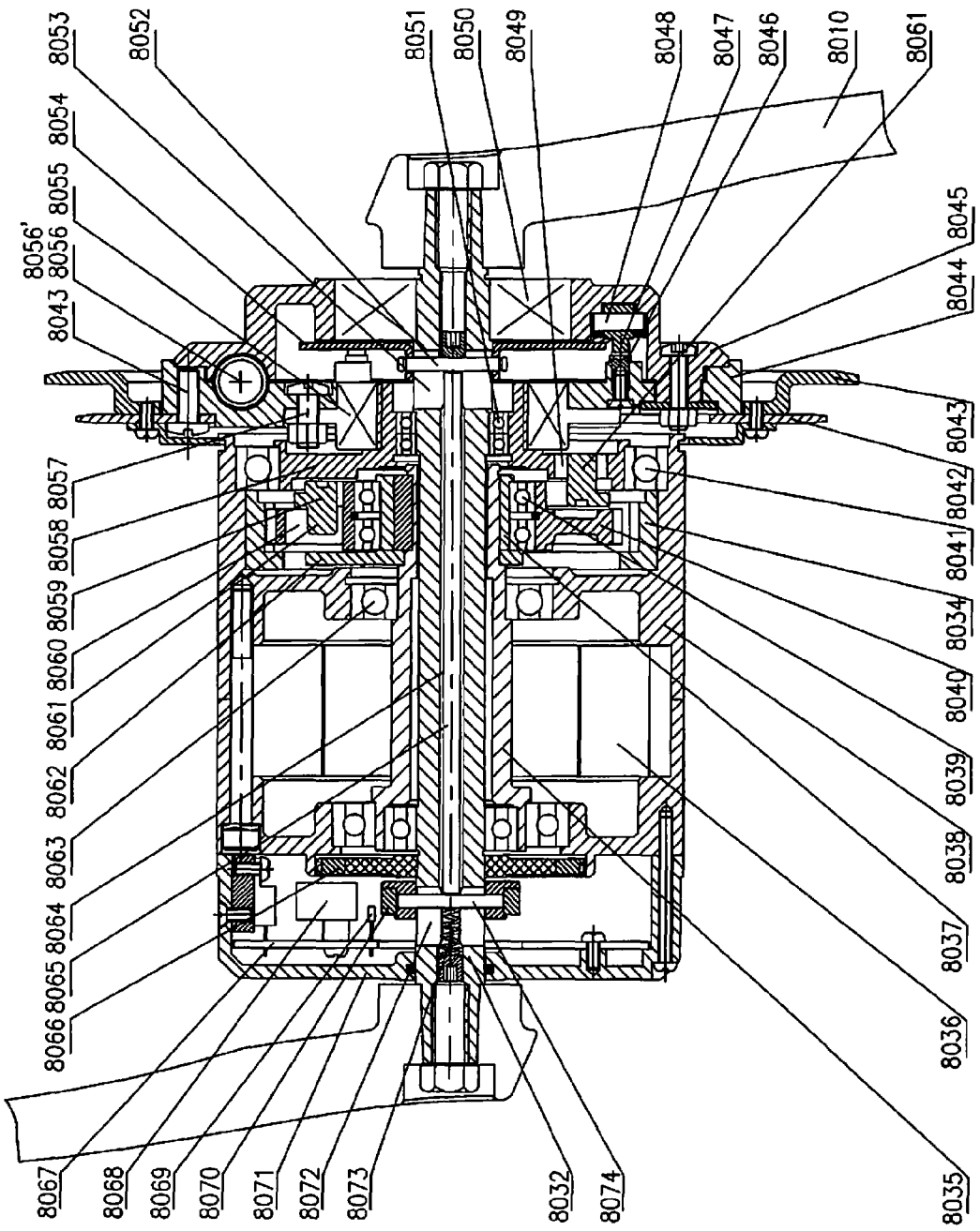
FIG. 41 is a side sectional view of a motor and drive sprocket assembly in accordance with another embodiment of the invention.
Figure 42:
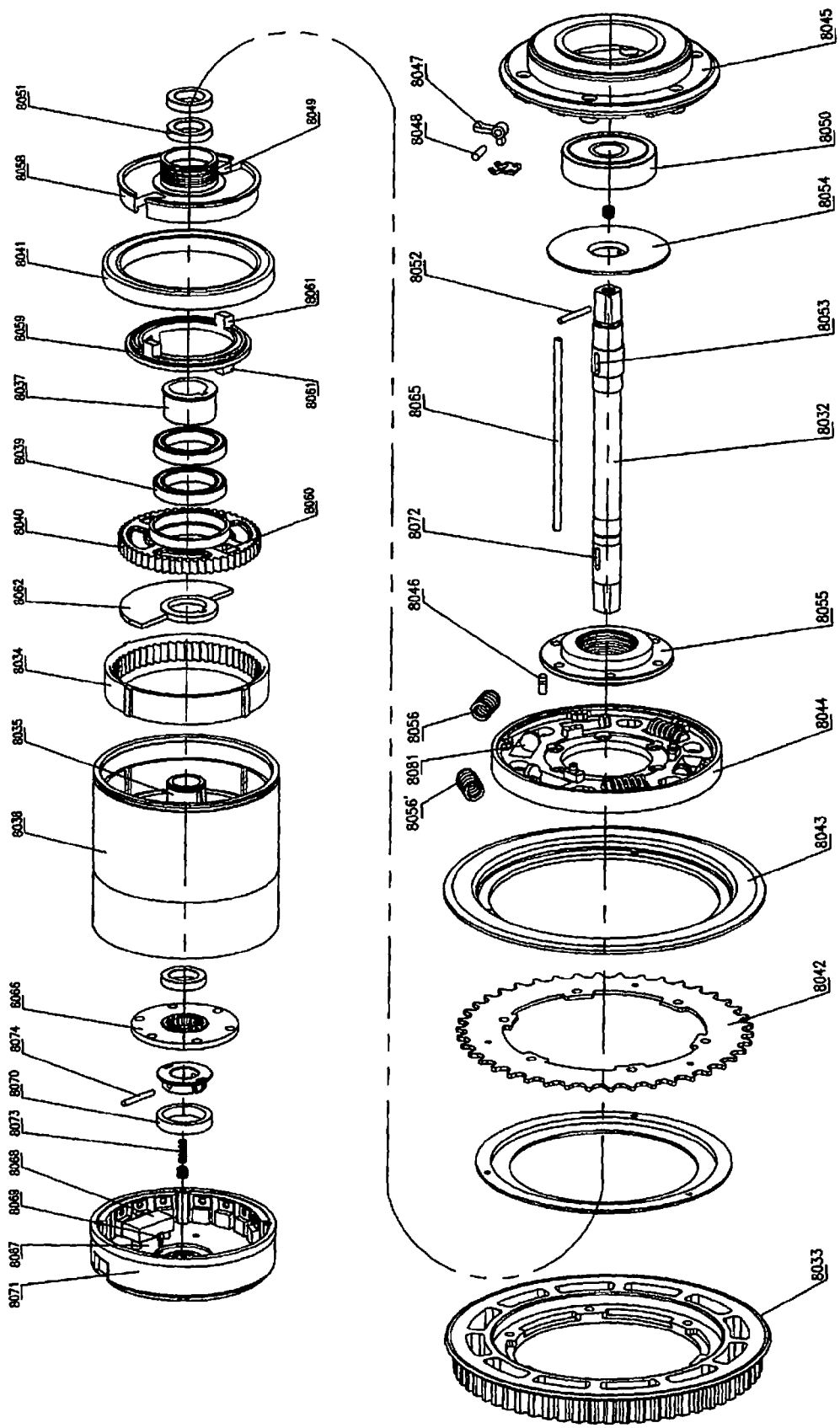
FIG. 42 is an exploded perspective view of the motor and drive sprocket assembly of FIG. 41.

FIGS. 41 and 42 depict another embodiment of a motor and sprocket assembly according to the invention. This embodiment is a combination of elements from some of the embodiments depicted by FIGS. 11 to 19, FIGS. 20 to 24, FIGS. 25 to 27, FIG. 28, FIGS. 29 to 35, FIG. 36 and FIGS. 37 to 40 and some new features. It will be understood by one of skilled in the art that the new features of this embodiment can be utilized with suitable modification in the other already described embodiments of the invention.

Referring to FIGS. 41 and 42, shown is an embodiment of a motor and drive mechanism assembly according to the invention. An apparatus such as a bicycle having said motor and drive mechanism assembly may comprise means in the form of manually operable pedals 8010 for applying an externally provided driving force to an auxiliary shaft 8032 of the motor, said auxiliary shaft 8032 comprising, for example, a pedal spindle of the bicycle. The pedals 8010 are fixed for rotation with said pedal spindle 8032 for receiving a manually provided driving force. The motor has a motor shaft 8035 for receiving a motor provided driving force. A first torque transmission path is provided for transferring the manually provided driving force to a drive mechanism comprising a sprocket 8042 of the pedal driven apparatus and a second torque transmission path is provided for transferring the motor provided driving force to said sprocket 8042 of the pedal driven apparatus. A first one way drive means 8050 is provided in the first torque transmission path between the pedal spindle 8042 and the sprocket 8042 such that, when the sprocket is being driven by the motor provided driving force through the second torque transmission path, the pedal spindle is able to freewheel.

An advantage of this arrangement is that it is not necessary to provide a freewheel sprocket on the rear wheel of the bicycle. This is because the first one way drive means 8050 provides this function in addition to enabling the pedal spindle 1 to freewheel when the motor drive is operating.

The first torque transmission path comprises at least the means for providing an external driving force, i.e. the manually operable pedals 8010, the auxiliary shaft 8032, i.e. the pedal spindle to which the pedals 8010 are affixed for rotation therewith, and the first one way drive means 8050. The first one way drive means 8050 mechanically couples the pedal spindle 8032 to the sprocket 8042 such that the first one way drive means 8050 transfers the manually provided driving force applied to the pedals 8010 to the sprocket 8042 to cause rotation of the sprocket. The first one way drive means 8050 also allows the pedal spindle to freewheel when the sprocket is being driven by the motor shaft 8035. The first one way drive means may comprise a freewheel device such as an over-running bearing 8050 or an over-running clutch or any device suitable for enabling drive to be applied through an output member of the one way drive means, but for an input member to freewheel when no drive is being transferred through said first one way drive means.

The second torque transmission path comprises at least the motor shaft 8035, a gear mechanism housed in a casing 8038 of the motor mechanically coupling the motor shaft 8035 to the sprocket 8042 and a second one way drive means 8055 between the gear mechanism and the sprocket. The gear mechanism has a reduction gear ratio and operates to transfer the motor provided driving force from the motor shaft to the drive mechanism, i.e. the sprocket at said reduction gear ratio. The gear mechanism may comprise a planetary gear mechanism having a planet gear 8040 whose axis of rotation is offset by a predetermined amount with respect to the axis of rotation of the motor shaft. The second one way drive means 8055 is arranged such that when the sprocket 8042 is being driven by the externally provided driving force on the pedal spindle 8032, the second one way drive means 8055 enables the motor shaft to remain stationary, i.e. not to be also driven by the manually applied driving force. The second one way drive means may comprise a freewheel device such as an over-running bearing or an over-running clutch or any device suitable for enabling drive to be applied through an output member of the one way drive means, but for an input member to freewheel when no drive is being transferred through said second one way drive means.

This allows a high speed motor to be employed whereby the gear mechanism applies a suitable reduction gear ratio to the output shaft of the motor to rotate the sprocket at high torque and low speed (relatively speaking when compared to the motor shaft speed of rotation).

As shown more explicitly in FIGS. 41 and 42, the motor and sprocket assembly comprises: the motor, the motor rotor hollow shaft 8035 supported by bearings 8063, an end cover 8071 at one end of the motor, i.e. the casing 8038 of the planetary gear mechanism, an internal gear ring 8034 fixed within the casing 8038 of the planetary gear mechanism; an eccentric wheel 8037 fixed around the hollow shaft 8035 of the motor, and a flat key disposed between the hollow shaft 8035 and the eccentric wheel 8037 for transmitting torque from the shaft 8035 to the eccentric wheel 8037. The planet gear 8040 is fitted around the outer circumference of the eccentric wheel 8037 by means of a pair of bearings 8039, for rotation with the eccentric wheel, and engaged with the teeth of the internal gear ring 8034, although in some embodiments only one bearing is used. A planet gear carrier 8058 is supported within the casing 8038 by means of a bearing 8051. A floating coupling flange 8059 is located between the planet gear 8040 and the planet gear carrier 8058. The planet gear has at least two opposing elongated apertures 8060 extending radially near its circumference. The planet gear carrier 8058 has two elongated inwardly depending open-ended slots 8049 formed at opposite edges of its circumference where the elongated slots 8049 of the planet gear carrier 11 are angularly spaced from the apertures 8060 of the planet gear by about 90 degrees. The floating coupling flange 8059 has pairs of slide blocks 8061 on each of its opposing faces where a first pair of said slide blocks on one face of the flange are angularly spaced by 90 degrees from a second pair of blocks formed on the opposite side face of the flange. The first pair of slide blocks is configured to slidably locate within the elongate apertures in the planet gear whereas the second pair of slide blocks is configured to located within the slots of the planet gear carrier. The function of the two pairs of slide blocks in the flange coupler 8059 in concert with the apertures in the planet gear and the slots in the planet gear carrier is to accommodate eccentric movement of the planet gear with respect to the axis of rotation of the motor shaft and to effect transfer of a motor driving force from the planet gear to the planet gear carrier and thus to the chain drive 8042. To effect the transfer of a motor driving force from the planet gear to the planet gear carrier 11, the planet gear carrier is coupled via the second one way drive means for rotation with the sprocket/chain drive 8042.

The pedal central spindle 8032 is freely disposed in the hollow shaft 8035 of the motor and is mounted coaxially with the motor shaft. The pedal central spindle is supported in the hollow shaft of the motor and the planet gear carrier by means of bearings. The pedal cranks 8010 are disposed at the ends of the pedal central spindle 8032. Associated with the pedal crank 8010 on a sprocket side of the assembly is the first one way drive means comprising a one-way freewheel 8050 fixed on said pedal spindle 8032.

As seen in FIGS. 41 and 42, structural members of a torque sensor mechanism are arranged on a right side of the casing of the motor and a controller designed to control a working state of the electric motor is arranged in a left end cap of the motor.

The torque sensor comprises a first annular plate type member in the form of a driving disk 8045 and a chain pulley or sprocket mounting member in the form of a driven disk 8044. A chain pulley or drive sprocket 8042 is fixed by bolts or screws to the outer edge of the driven disk 8044. A chain guard 8043 is arranged on an outer side adjacent to the chain pulley 8042 to prevent the cyclist from touching the running chain pulley and chain. Biasing elements in the form of compression spring 8056 are arranged tangentially to the circumference between the driving disk 8045 and the driven disk 8044. The driving disk 8045 is fixed to an outer race of the second one-way driving means which may comprise a one-way bearing, for example. An inner race of the one way bearing is fixed to the spindle centre shaft 8032. A number of lever members in the form of shift levers 8047 are arranged on an inner disk face of the driving disk 8045. The shift levers 8047 are fitted over respective shaft pins 8048 and can rotate around their shaft pins 8048 which are fixed to the inner disk face of the driving disk 8045. Respective lugs or pins 8046 are arranged on a coupling face between the driven disk 8044 and the driving disk 8045 corresponding to the shift levers 8047, so that, when the driving disk 8045 moves and creates an angular displacement relative to the driven disk 8044, the lugs 8046 will drive the shift levers 8047 to rotate around their shaft pins 8048. A push disk 8054 is arranged in a cavity of the driving disk 8045 and fits over the spindle shaft 8032. The push disk can slide axially along the spindle shaft. A push disk pin 8052 is mounted adjacent a center hole of the push disk 8054. A first slot hole 8053 is arranged on the spindle shaft 8032 and corresponds to the push disk pin 8052 such that the push disk pin 8052 passes through the first slot hole 8053 and can move in the same axial direction together with the push disk 8052 under the driving action of the shift levers 8047.

As already explained, the floating coupling flange 8059 is arranged between the planet gear 8040 and the planet gear carrier or output flange 8058. The two opposing apertures formed near the circumference of the planet gear comprise two generally rectangular through holes 8060 arranged on a disk face of the planet gear 8040. The two opened ended slots on the planet gear carrier or output flange comprise two generally rectangular through holes 8049 arranged on a disk face of the output flange 8058. Two raised rectangular slide blocks 8061 are arranged on each of the disk faces of the coupling flange 8059 at a 90 degree included angle between them around the flange's circumference. The rectangular slide blocks 8061 are inserted into the two rectangular through holes 8060 on the planet gear 8040 and the two rectangular through holes 8049 on the output flange 8058 respectively, by which means the power of the planet gear 8040 can be transferred to the output flange 8058. The second one way drive means is fixed to the output flange 8058 through a threaded connection. A one-way flywheel 8055 serves as the second one-way driving means, the outer edge of which is fixed by bolts 8057 to the driven disk 8044. The outer edge of the output flange 8058 is supported in the motor casing 8038 by a bearing 8041, and a further bearing 8051 is arranged in an inner hole of the output flange 8058 to support the spindle shaft 8032.

The spindle shaft 8032 has a center through-hole 8064. It also has a second slot hole 8072 on an opposite side to the first slot hole. A magnetic ring 8070 which is arranged on the spindle shaft 8032 corresponding to the second slot hole 8072 and can slide axially along the spindle shaft 8032. A magnetic ring pin 8074 is inserted radially in the magnetic ring 8070. A push rod 8065 is placed in the center hole 8064 of the spindle shaft 8032 in a movable manner. One end of the push rod 64 abuts against the push disk pin 8052 and the other end of the push rod 8064 engages the magnetic ring pin 8074. The push rod 8065 is designed to transfer axial movement of the push disk 8054 to the magnetic ring 8070 so that the magnetic ring 8070 can move in an axial direction along the spindle shaft synchronously with the push rod 8054. A return spring 8073 is arranged in the center hole 64 of the center shaft 8032 to keep the magnetic ring pin 8074 on the magnetic ring 8070 abutting against the push rod 8065 and thereby keep the push disk abutting against the shift lever 8047 via the push disk pin 8052. A magnetic disk 8066 is arranged adjacent to the magnetic ring 8070 and is fixed to the center shaft 8032 and can rotate with the center shaft 8032 synchronously.

An end cap 8071 is arranged on the left end of the motor casing. A circuit board 8067 on which suitable electronic components elements are installed for the controller is fixed to the inner side of the end cap 8071. In addition, a first Hall element 8069 to detect the pedal pressure on the pedal crank 8010 and a second Hall element 8068 to detect the angle of rotation of the pedal crank 10 are installed on the circuit board 8067.

In operation, when the cyclist begins to ride the bicycle by pushing alternatively on the pedals, the pedal pressure causes the spindle shaft 8032 via the crank 8010 to rotate. The first one way drive means comprising the one-way bearing 8050 drives the driving disk 8045 to rotate synchronously therewith. The driving disk 8045 compresses the compression springs 8056 to drive the driven disk 8044 to rotate with it. Consequently, the chain pulley 8042 fixed to the driven disk 8044 can drive the pedal driven apparatus, e.g. bicycle, via the chain to move forward. At the same time, the rotating torque applied by the cyclist on the driving disk 8045 compresses the compression springs 8056 to override the motion resistance experienced by the bicycle, and thereby an angular displacement is created between the driving disk 8045 and the driven disk 8044. The lugs 8046 on the driven disk 8044 then contact the shift levers 8047 on the driving disk 8045 and drive the shift levers 8047 to rotate around their shaft pins 8048 so that the end parts of the shift levers 8047 push the push disk 8054 to create axial movement thereof along the spindle shaft. The axial movement of the push disk 8054 drives the magnetic ring 8070 via the push disk pin 8052, push rod 8065, and magnetic ring pin 8074 to cause axial movement along the spindle shaft. At this point, the first Hall element 8069 connected to the circuit board 8067 detects a change in magnetic force as a result of the movement of the magnetic ring 8070 and provides a change signal to the control circuit. In response to the movement of magnetic ring 8070 detected by the first Hall element 8069, the control circuit begins to supply power to the electric motor 8036 to cause the electric motor 8036 to rotate. The output torque from the electric motor 8036 is combined with the torque applied by the cyclist on the pedals to form the driving force for the bicycle. The combined driving force is transferred by the chain pulley 8042 through the chain to the rear wheel of the bicycle.

The control circuit can regulate the supply current to the electric motor 8036 in response to the amount of movement of the magnetic ring 8070 detected by the first Hall element 8069. Therefore, the output torque from the electric motor 8036 is proportional to the magnitude of torque applied by the cyclist on the pedals.

When the torque applied by the cyclist on the pedals is reduced to a level that is not enough to compress the compression springs 8056, the control circuit will cut off power supply to the electric motor. To avoid the phenomenon of repeated switching ON/OFF of the electric motor when the cyclist rides by pressing the pedals alternatively with left and right feet, an element designed to detect rotation of the spindle shaft 8032 is arranged on the control circuit. A magnetic disk 8066 is provided at a side adjacent to the magnetic ring 8070 and fixed with respect to the spindle shaft 8032 in order to rotate with therewith. In this situation, i.e., the compression springs 8056 are not compressed while the spindle shaft 8032 is still rotating, the second Hall element 8068 on the circuit board 8067 detects the rotation of the magnetic element on the magnetic disk 8066 and provides a signal to the control circuit so that the control circuit will continue supplying power to the electric motor for several seconds to avoid frequent switching ON/OFF of the power supply thereby preventing an inconvenient experience for the cyclist of intermittent power boosting from the electric motor. This feature of continued power supply is especially favorable during slope climbing. The magnetic disk 8066 and Hall sensor 8068 can also provide a speed signal for the apparatus through a determination of how quickly the magnetic disk 8066 is rotating.

The coupling flange 8059 arranged between the planet gear 8040 and the output flange 8058 forms a three part set of components comprising a slide block-driven shaft coupler. When the planet gear 8040 is driven by the hollow motor spindle 8035 of electric motor, the slide blocks 8061 at one side of the coupling flange 8059 are driven by the rectangular slots 8060 on the disk face of the planet gear 8040 and therefore the coupling flange 8059 rotates with the planet gear 8040. Whereas, at the other side of the coupling flange 8059, the slide blocks 8061 are inserted in the rectangular slots on the disk face of the output flange 8058 which causes the output flange 8058 to rotate therewith. Since the output flange 8058 is supported in the casing 8038 by the bearing 8041 and the planet gear 8040 is supported on the eccentric wheel 8037 which is mounted on the hollow spindle 8035 of the electric motor by the bearing 8039, the planet gear 8040 rotates in accordance with the offset provided by the eccentric wheel 8037 to engage the internal gear ring 8034. The coupling flange 8059 connects the planet gear 8040 and output flange 8058 through different axial lines and transfers output power between them because the slide blocks 8061 at both sides of the coupling flange 8059 can slide in the rectangular slots 8060 on the planetary gear 8040 and the rectangular slots 8049 on output flange 8058. A counter balance element may be 8062 arranged adjacent to the planetary gear 8040 to balance out the centrifugal forces produced by the eccentric rotation of the planet gear 8040. In other embodiments, balancing may be achieved by a second planet gear arranged 180 degrees out of rotational phase with the (first) planet gear.

In contrast to embodiments where the torque sensor and controller are arranged outside of the motor and sprocket assembly, it is advantageous to move these into the casing of the assembly such that the entire assembly is built as an integral assembly. Furthermore, the components that were originally exposed outside of the assembly are now protected by the casing of the assembly now thereby eliminating any intrusion of sand, dust, or rain. In addition, exposure of wiring or the like is reduced and damage through wear or attrition can be reduced or avoided.

In contrast to other embodiments, the original pin/sleeve power transmission structure between the planet gear and output flange coupler is changed to a slide block-type shaft coupling power transmission structure. Thus, the structure can transfer higher torque and work more stably and reliably.

A further improvement is shown in FIG. 42. In this improvement, spring slots 8081 for accommodating the compression springs are arranged on the coupling faces of the driving disk 8045 and driven disk 8044. Compression springs 8056 and short compression springs 8056' are arranged in respective spring slots 8081. The length of the short spring 8056' is shorter than that of the normal spring slot 8081 formed after the driving disk 8045 is coupled with the driven disk 44. Therefore, in the initial state, the short springs 8056' are in a free state (i.e. uncompressed), and the following working condition is established: when the cyclist begins to ride with the pedals, the driving disk 8045 only compresses the normal compression springs 8056 first which causes a start up the electric motor via the torque sensor and the controller; as the cyclist increases the pedal pressure, the relative angular displacement between the driving disk 8045 and the driven disk 8044 further increases, and the driving disk 8045 begins to contact with and compresses also the short pressure springs 8056; at this point, both the normal spring 8056 and the short springs 8056' are compressed, and the control circuit increases the power output to the electric motor in response to the signal from the torque sensor as the relative angular displacement between the driving disk 8045 and the driven disk 8044 increases.

In this improvement, the normal springs 8056 and the short springs 8056' can be chosen to have specific length, rigidity, and number as required in combination, to achieve a desired power boosting effect by the motor.

The power boosting performance of the resulting apparatus can be improved as follows: when the apparatus runs on a level road, appropriate boosting power can be obtained even if the pressure applied by the cyclist on the pedals is not high, since the running resistance is initially low; when climbing a slope or starting under heavy load, higher pressure has to be applied on the pedals, at this point, the electric motor can be controlled to provide higher output, so that the cyclist can obtain enough boosting power.

Figure 43:
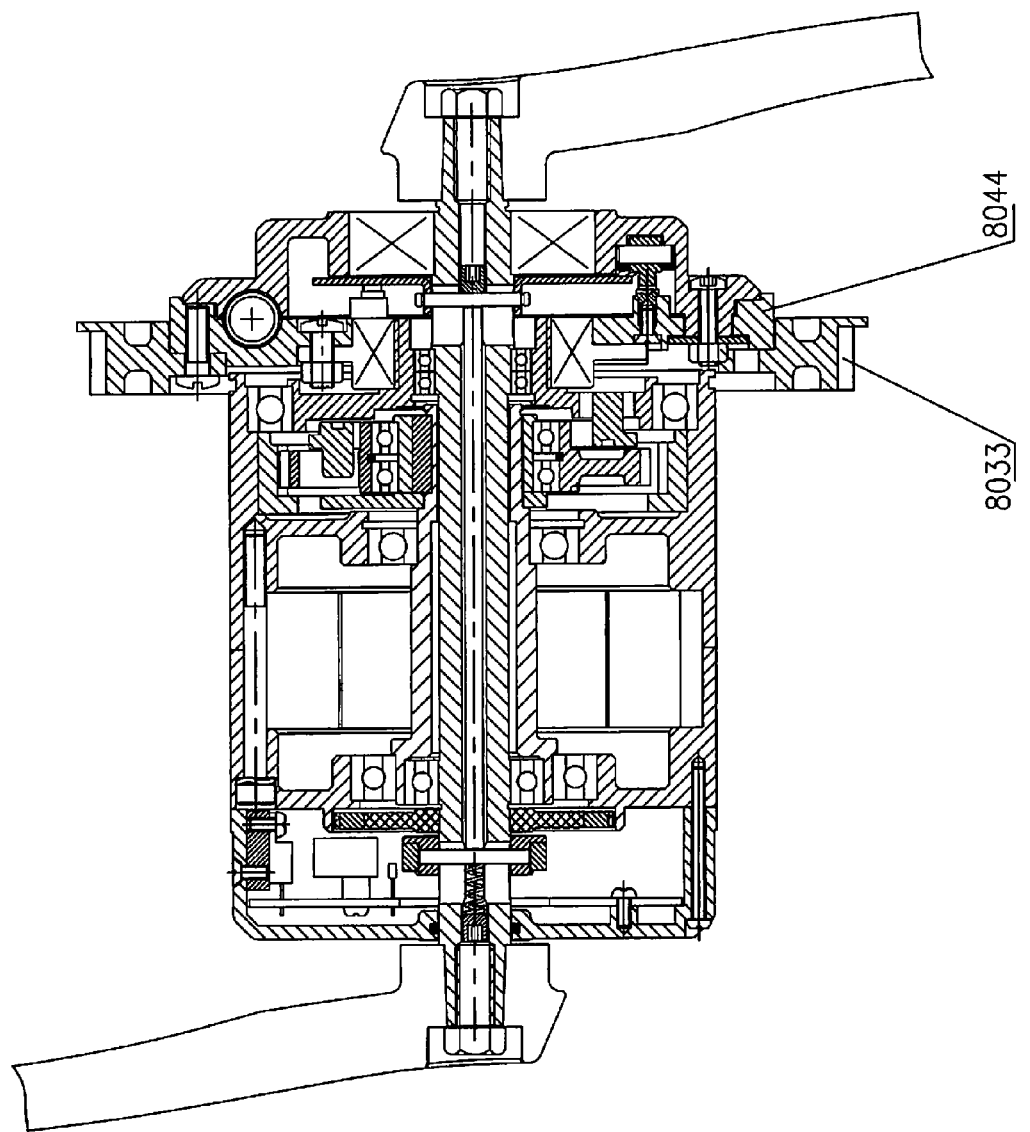
FIG. 43 is a side sectional view of the motor and drive sprocket assembly of FIG. 41, but with a belt pulley instead of a chain drive.

As shown in FIG. 43, the chain pulley 8042 and chain guard 8043 fixed to the driven disk 8044 can be replaced with a belt wheel 8033 such that the chain that drives the apparatus can be replaced with a belt so as to reduce the weight of the apparatus and reduce noise during operation/motion of the apparatus.

Figure 44:
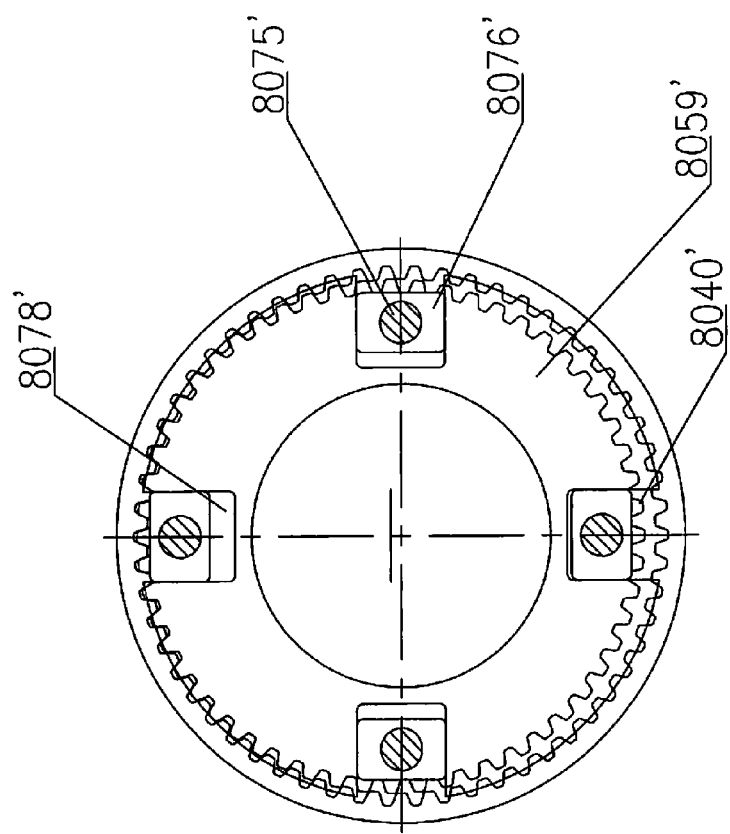
FIG. 44 is a front view of an alternative slide block-driven shaft coupler for use in the motor and drive sprocket assemblies of FIGS. 41 and 43.
Figure 45:
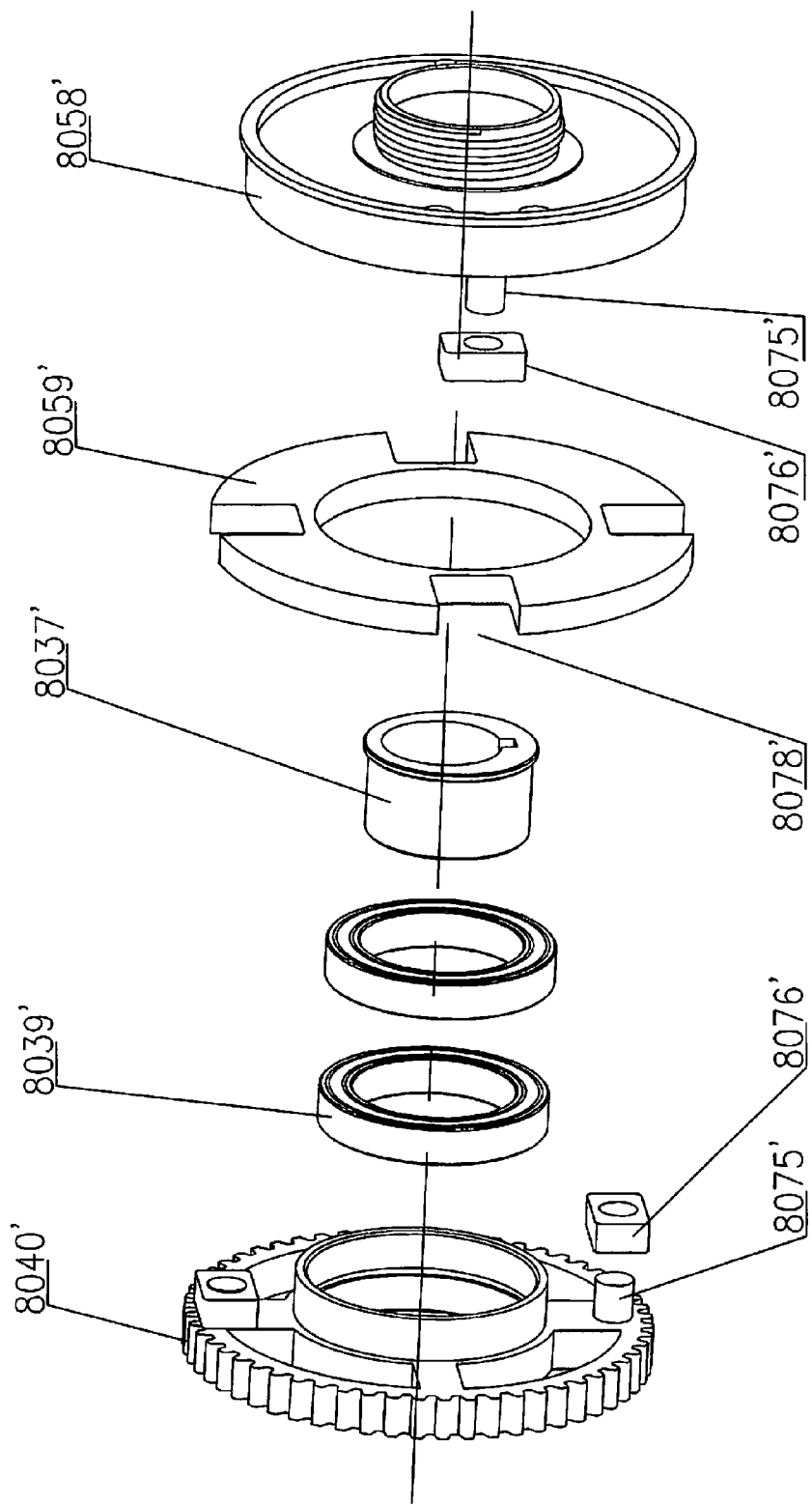
FIG. 45 is an exploded perspective view of the alternative slide block-driven shaft coupler of FIG. 44.

As shown in FIGS. 44 and 45, the three part set of components comprising a slide block-driven shaft coupler consisting of the coupling flange 8059 arranged between the planet gear 8040 and the output flange 8058 can be replaced by a coupling flange 8059' that has four slots 8078' arranged around its circumference. The planet gear 8040' no longer has apertures to accommodate slide blocks, but instead has a pair of opposing pins 8075' on which are mounted slide blocks 8077' which, in use slidably locate in respective ones of the slots 8078' in the coupling flange 8059'. Similarly, the output flange also has a pair of opposing pins 8075' on which are mounted slide blocks 8077' where the pair of pins on the output flange are 90 degrees out of rotational phase with the pair of pins on the planet gear. The operation of this three part set of components is essentially the same as that as described with reference to the embodiment of FIGS. 41 and 42, but of a simpler construction.

Figure 46:
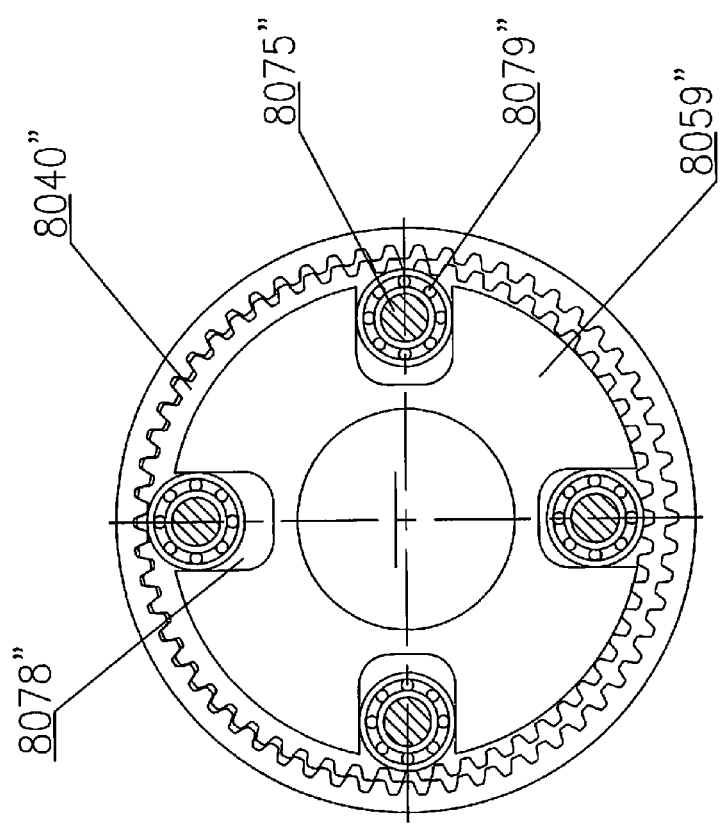
FIG. 46 is a front view of another alternative slide block-driven shaft coupler for use in the motor and drive sprocket assemblies of FIGS. 41 and 43.
Figure 47:
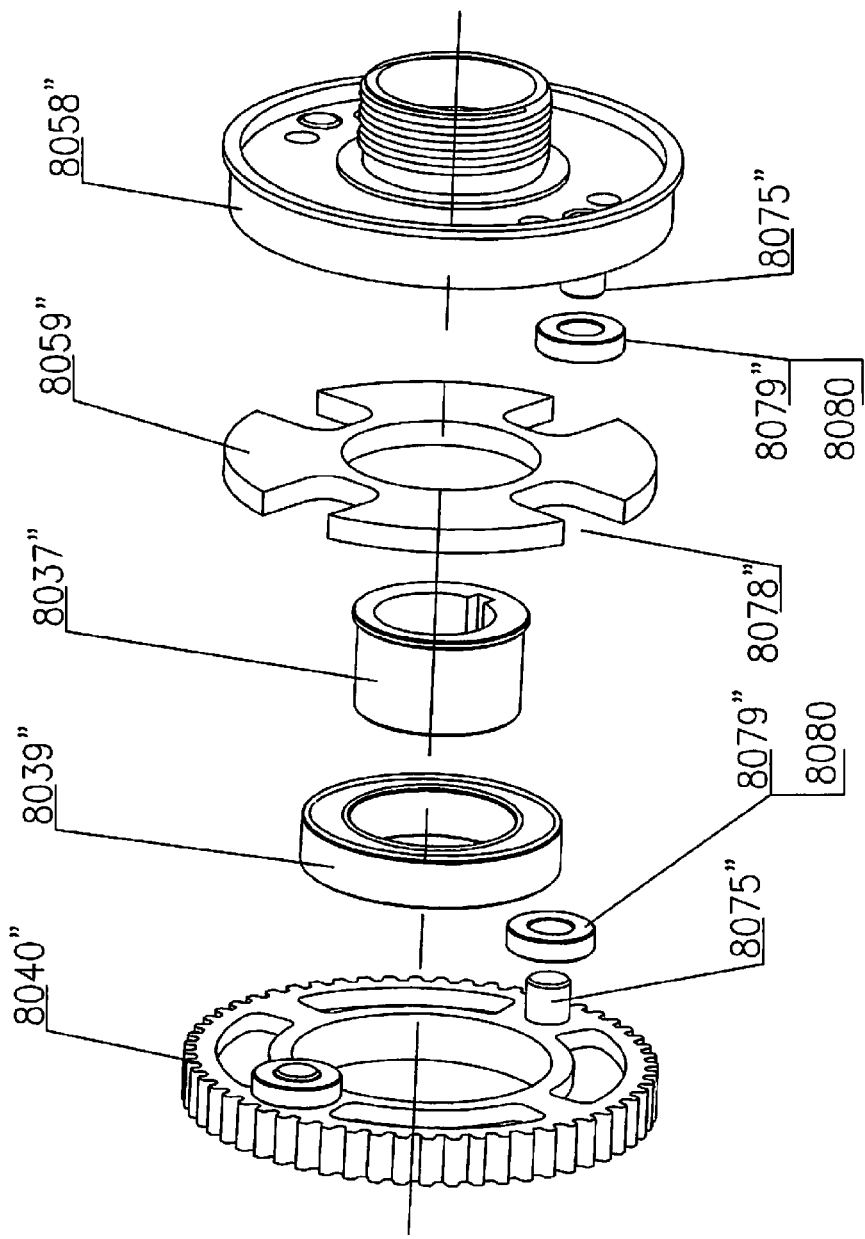
FIG. 47 is an exploded perspective view of the alternative slide block-driven shaft coupler of FIG. 46.
Figure 48:
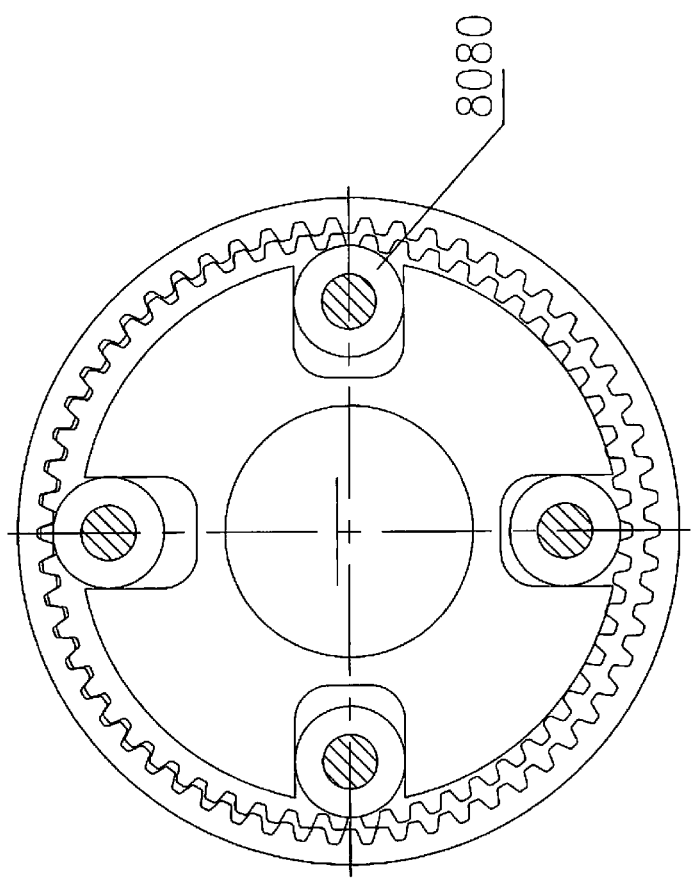
FIG. 48 is a front view of another alternative slide block-driven shaft coupler for use in the motor and drive sprocket assemblies of FIGS. 41 and 43, but using bushings instead of roller bearings.

FIGS. 46 and 47 show another three part set of components comprising a slide block-driven shaft coupler in which the coupling flange 8059" is similar to that of FIGS. 44 and 45 save for the fact that the slots 8078" have a curved root to accommodate a roller bearing or a bushing rather than a pin mounted slide block. The planet gear is provided with a pair of pins 8075", but mounted on the pins are roller bearings 8079" (FIGS. 46 and 47) or bushings 8080 (FIGS. 47 and 48). The use of roller bearings 8079" or bushings 8079 is favoured over slides blocks in being less wearing on other components. Roller bearings 8079" are favoured over bushings 8080, although bushings are a less expensive option.

In all embodiments, the motor may be a direct current (DC) brushless motor.

As compared with known motor assisted bicycles, the invention has at least the following advantages:

(1) The present invention uses a specially designed motor having a hollow shaft which is directly connected with a reduction planetary gear mechanism and which, due to the fact that the planet gear has fewer teeth or a smaller diameter than the ring gear, a sufficient transmission ratio can be obtained with the smallest space size. Therefore all of the parts together with the pedal central spindle can be constituted as a coaxial driving assembly, so that the structure is compact, the bicycle is light in weight, and its operation is more flexible;

(2) The present invention can be used in combination with a standard external transmission or internal transmission installed on the rear wheel of a bicycle, for either pedal driving or motor driving. The speed ratio can be varied during the riding of the bicycle so that the bicycle can be operated at the best driving efficiency with various ranges of speed on either hills or flats;

(3) The present invention is very practical, and can be directly installed on an existing bicycle after having the central spindle thereof modified slightly;

(4) With driving modes based on the above structure, it can reduce a rider's effort during riding;

(5) The present invention can be partially modified so as to become an exercise bicycle having a power generation function and other functions such as the battery can be charged by the inertial moment of the bicycle when going downhill or by the user pedaling; and (6) The present invention is novel in structure, simple in profile, and can be applied to various types of electric bicycles or electric assisted bicycles.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A motor unit comprising:
a housing for housing a motor;
a motor shaft for receiving a driving force provided by the motor;
a torque sensor mechanism for detecting torque;
a controller for controlling power to the motor in response to a detected amount of torque to change an amount of motor provided driving force provided to the motor shaft; and
an actuator coupling the torque sensor to a sensor of the controller;
wherein the actuator is configured to move relative to the controller sensor thereby causing the sensor to produce a signal indicative of the detected level of torque and wherein the controller is contained within the housing of the motor.

2. The motor unit of claim 1, wherein the controller is located within one end of the motor housing and the torque sensor connected to an opposite end of the motor housing.

3. The motor unit of claim 1, wherein the actuator coupling the torque sensor to a sensor of the controller is accommodated in a hollow bore of the motor shaft to thereby couple the torque sensor at one end of the motor housing to the controller at another end of the motor housing.

4. The motor unit of claim 1, wherein a second one way drive means is provided in the second torque transmission path between the motor shaft and the drive mechanism such that when the drive mechanism is being driven by the externally provided driving force through the first torque transmission path, the motor shaft is not caused to rotate.

5. The motor unit of claim 4, wherein the second one way drive means comprises at least one ratchet member moveably disposed on the planet gear carrier and arranged to engage a rack of a ratchet wheel fixed to rotate with the drive mechanism.

6. The motor unit of claim 5, wherein the at least one ratchet member has associated therewith means for resiliently biasing a free end of said ratchet member outwardly from a surface of the planet gear carrier such that said free end of the ratchet member engages a tooth in the rack of the ratchet wheel.

7. The motor unit of claim 3, wherein it further comprises:
an auxiliary shaft for receiving an externally provided driving force:
a first torque transmission path for transferring the externally provided driving force to a drive mechanism;
a second torque transmission path for transferring the motor provided driving force to said drive mechanism;
wherein a first one way drive means is provided in the first torque transmission path between the auxiliary shaft and the drive mechanism such that when the drive mechanism is being driven by the motor provided driving force through the second torque transmission path, the auxiliary shaft is able to freewheel.

8. The motor unit of claim 7, wherein the motor unit comprises a part of a pedal driven apparatus.

9. The motor unit of claim 7, wherein the motor unit is an electric motor powered by a battery pack carried on a pedal driven apparatus.

10. The motor unit of claim 7, wherein the torque sensor comprises:
a first driving member mounted for rotation about an axis of rotation of the motor shaft;
a second driven member mounted for rotation about said axis of rotation of the motor shaft;
means for detecting movement of said first driving member relative to said second driven member in a rotational direction of said driven member about said motor shaft axis of rotation; and
wherein the actuator comprises a means for conveying said detected movement to the sensor of the controller.

11. A pedal driven apparatus having a motor unit according to claim 7, wherein said externally provided driving force is a manually provided driving force provided by manually operable pedals of said apparatus which are fixed for rotation with the auxiliary shaft, said auxiliary shaft comprising a pedal spindle; and wherein said drive mechanism comprises a sprocket, said first torque transmission path being arranged to transfer the manually provided driving force to said sprocket and said second torque transmission path being arranged to transfer the motor provided driving force to said sprocket; and wherein the first one way drive means is provided in the first torque transmission path between the pedal spindle and the sprocket such that when the sprocket is being driven by the motor provided driving force through the second torque transmission path, the pedal spindle is able to freewheel.

12. The motor unit of claim 7, wherein the motor shaft is arranged concentrically around the auxiliary shaft such that the auxiliary shaft is freely accommodated through a hollow bore of the motor shaft and such that their axes of rotation are parallel.

13. The motor unit of claim 12, wherein the auxiliary shaft and the motor shaft share the same axis of rotation.

14. The motor unit of claim 7, wherein the first torque transmission path comprises the auxiliary shaft for receiving an externally provided driving force and the first one way drive means, wherein the first one way drive means mechanically couples the auxiliary shaft to the drive mechanism such that the first one way drive means transfers the externally provided driving force to the drive mechanism and wherein the first one way drive means allows the auxiliary shaft to freewheel when the drive mechanism is being driven by the motor shaft.

15. The motor unit of claim 14, wherein the first one way drive means comprises a freewheel device.

16. The motor unit of claim 7, wherein the second torque transmission path comprises the motor shaft and a gear mechanism mechanically coupling the motor shaft to the drive mechanism, wherein the gear mechanism has a reduction gear ratio and operates to transfer the motor provided driving force from the motor shaft to the drive mechanism at said reduction gear ratio.

17. The motor unit of claim 16, wherein the gear mechanism comprises a planetary gear mechanism having a planet gear whose axis of rotation is offset by a predetermined amount with respect to the axis of rotation of the motor shaft.

18. The motor unit of claim 17, wherein the planetary gear mechanism includes a counterbalance member which is configured to counterbalance an imbalance of weight caused by the offsetting of the planet gear with respect to the axis of rotation of the motor shaft.

19. The motor unit of claim 18, wherein the counterbalance member comprises a generally semi-circular weighted member which is arranged to rotate with the planet gear so as to counterbalance the planet gear when the planet gear is rotating.

20. The motor unit of claim 17, wherein the planetary gear mechanism does not include a weighted counterbalance member, but comprises first and second identical planet gears arranged half a revolution out of phase with each other such that said first and second planet gears counterbalance each other on rotation.

21. The motor unit of claim 20, wherein the first and second planet gears are located for rotation half a revolution out of phase with each other within a common, single internal ring gear.

22. The motor unit of claim 20, wherein each of the first and second planet gears are supportably mounted on respective first and second eccentric wheels.

23. The motor unit of claim 17, wherein the planet gear is rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centred on the axis of rotation of the motor shaft, said circle having a radius equal to the predetermined offset amount.

24. The motor unit of claim 23, wherein the planet gear has a smaller diameter than an internal ring gear within which it locates for rotation therewithin, the internal ring gear being fixed in position and having a central axis co-incident with the axis of rotation of the motor shaft, the planet gear having a smaller number of teeth than the internal ring gear.

25. The motor unit of claim 24, wherein the planet gear is rotatably supported on the eccentric wheel by a bearing.

26. The motor unit of claim 24, wherein a planet gear carrier of the planetary gear mechanism is configured to transfer the motor provided driving force to the drive mechanism.

27. The motor unit of claim 26, wherein the planet gear carrier is affixed to the drive mechanism for rotation therewith.

28. The motor unit of claim 27, wherein the planet gear carrier is also affixed to an output member of the first one way drive means for rotation therewith, whereby the externally provided driving force is transferred via the first torque transmission path to the motor shaft through the planetary gear mechanism as well as to the drive mechanism.

29. The motor unit of claim 16, wherein the gear mechanism comprises a toothless planetary gear mechanism having a toothless planet gear whose axis of rotation is offset by a predetermined amount with respect to the axis of rotation of the motor shaft and wherein the reduction gear ratio of the toothless planetary gear mechanism is defined by a relationship between the respective diameters of the toothless planet gear and a toothless internal ring gear within which the planet gear is located for rotation, the toothless planet gear having a smaller diameter than the toothless internal ring gear.

30. The motor unit of claim 29, wherein the toothless planetary gear mechanism includes a counterbalance member which is configured to counterbalance an imbalance of weight caused by the offsetting of the toothless planet gear with respect to the axis of rotation of the motor shaft.

31. The motor unit of claim 30, wherein the counterbalance member comprises a generally semi-circular weighted member which is arranged to rotate with the toothless planet gear so as to counterbalance the toothless planet gear when the toothless planet gear is rotating.

32. The motor unit of claim 29, wherein the toothless planetary gear mechanism does not include a weighted counterbalance member, but comprises first and second identical toothless planet gears arranged half a revolution out of phase with each other such that said first and second toothless planet gears counterbalance each other on rotation.

33. The motor unit of claim 32, wherein the first and second toothless planet gears are located for rotation half a revolution out of phase with each other within a common, single toothless internal ring gear.

34. The motor unit of claim 32, wherein each of the first and second toothless planet gears are supportably mounted on respective first and second eccentric wheels.

35. The motor unit of claim 32, wherein the first and second toothless planet gears are rotatably supported respectively on the first and second eccentric wheels with their axes of rotation offset by a predetermined amount with respect to the axis of rotation of the motor shaft and located within a common, single toothless internal ring gear for rotation half a revolution out of phase with each other to engage a toothless inner ring gear surface by heating the toothless internal ring gear and shrink fitting it over the first and second toothless planet gears.

36. The motor unit of claim 29, wherein the toothless planet gear is rotatably supported on an eccentric wheel whereby the toothless planet gear is made to rotate as the eccentric wheel rotates and whereby the position of the axis of rotation of the toothless planet gear changes relative to the axis of rotation of the motor shaft as the toothless planet gear rotates such that the varying position of the axis of rotation of the toothless planet gear defines a circle centred on the axis of rotation of the motor shaft, said circle having a radius equal to the predetermined offset amount.

37. The motor unit of claim 36, wherein the toothless planet gear is rotatably supported on the eccentric wheel with its axis of rotation is offset by a predetermined amount with respect to the axis of rotation of the motor shaft and located within the toothless internal ring gear to engage a toothless inner ring gear surface by heating the toothless internal ring gear and shrink fitting it over the toothless planet gear.

38. The motor unit of claim 36, wherein the toothless internal ring gear is fixed in position and has a central axis co-incident with the axis of rotation of the motor shaft.

39. The motor unit of claim 38, wherein the toothless planet gear is rotatably supported on the eccentric wheel by a bearing.

40. The motor unit of claim 38, wherein a planet gear carrier of the toothless planetary gear mechanism is configured to transfer the motor provided driving force to the drive mechanism.

41. The motor unit of claim 40, wherein the planet gear carrier is affixed to the drive mechanism for rotation therewith.

42. The motor unit of claim 36, wherein the planet gear carrier is also affixed to an output member of the first one way drive means for rotation therewith, whereby the externally provided driving is transferred via the first torque transmission path to the motor shaft through the toothless planetary gear mechanism as well as to the drive mechanism.

* * * * *